(12) United States Patent
Iwaki et al.

(10) Patent No.: US 7,647,770 B2
(45) Date of Patent: *Jan. 19, 2010

(54) HYDRAULICALLY DRIVEN WORKING VEHICLE AND HYDRAULIC TRANSAXLE

(75) Inventors: Koji Iwaki, Hyogo (JP); Shiro Ueno, Hyogo (JP); Norihiro Ishii, Hyogo (JP); Hideaki Okada, Hyogo (JP); Fumitoshi Ishino, Hyogo (JP); Hiroshi Sugimoto, Hyogo (JP); Shinichi Hirose, Hyogo (JP); Hironori Sumomozawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/178,252

(22) Filed: Jul. 23, 2008

(65) Prior Publication Data

US 2008/0283324 A1  Nov. 20, 2008

Related U.S. Application Data

(63) Continuation of application No. 11/402,101, filed on Apr. 12, 2006, now Pat. No. 7,415,823.

(30) Foreign Application Priority Data

Apr. 12, 2005 (JP) .............................. 2005-114412
Jun. 29, 2005 (JP) .............................. 2005-190788

(51) Int. Cl.
*B60K 7/00* (2006.01)
*B62D 11/18* (2006.01)

(52) U.S. Cl. ........................................ 60/487; 180/305

(58) Field of Classification Search .................... 60/487, 60/488; 91/487; 180/305, 307
See application file for complete search history.

(56) References Cited

U.S. PATENT DOCUMENTS

| 4,552,282 | A | 11/1985 | Nishida |
| 5,069,037 | A | 12/1991 | Sakigawa et al. |
| 5,317,936 | A | 6/1994 | Shiba et al. |
| 6,732,828 | B1 | 5/2004 | Abend et al. |
| 6,845,837 | B2 | 1/2005 | Ohashi et al. |

(Continued)

FOREIGN PATENT DOCUMENTS

EP  1 410 938  4/2004

(Continued)

OTHER PUBLICATIONS

Partial European Search Report for European Application No. EP 0600 7576, European Patent Office, mailed Sep. 25, 2007, 3 pgs.

(Continued)

*Primary Examiner*—Thomas E Lazo
(74) *Attorney, Agent, or Firm*—Sterne, Kessler, Goldstein & Fox P.L.L.C.

(57) ABSTRACT

In a hydraulic four-wheel drive vehicle, a rear transaxle incorporates a hydraulic motor for driving rear wheels, a front transaxle incorporates a hydraulic motor for driving front wheels, and hydraulic pressure fluid pipes interposed between the front and rear transaxles are extended along at least one of left and right side plates of a frame of the vehicle.

17 Claims, 33 Drawing Sheets

U.S. PATENT DOCUMENTS

| | | |
|---|---|---|
| 6,889,793 B2 | 5/2005 | Okada et al. |
| 7,082,759 B1 | 8/2006 | Tsukamoto et al. |
| 7,415,823 B2 | 8/2008 | Iwaki et al. |
| 2004/0045288 A1 | 3/2004 | Takada et al. |
| 2005/0070390 A1 | 3/2005 | Irikura et al. |

FOREIGN PATENT DOCUMENTS

| | | |
|---|---|---|
| EP | 1 584 510 | 10/2005 |
| WO | WO 2004/062956 A | 7/2004 |

OTHER PUBLICATIONS

European Search Report for European Patent Application No. EP 0600 7576, dated Jan. 15, 2008, 2 pgs.

(a)

(b)

(a)

(b)

HYDRAULICALLY DRIVEN WORKING VEHICLE AND HYDRAULIC TRANSAXLE

CROSS-REFERENCE TO RELATED APPLICATIONS

The present application is a Continuation of application Ser. No. 11/402,101, filed Apr. 12, 2006, which is hereby incorporated in its entirety herein by reference thereto.

BACKGROUND OF THE INVENTION

1. Field of the Invention

The invention relates to a hydraulically driven working vehicle, especially, a four-wheel drive working vehicle, equipped with front wheels and rear wheels driven by respective hydraulic motors, and relates to a hydraulic transaxle including the hydraulic motor applicable to the vehicle. An example of the hydraulically driven working vehicle according to the invention is a lawn tractor equipped at the middle body portion thereof with a mower unit. The transaxle according to the invention can supply fluid to hydraulic equipments equipped on the hydraulically driven vehicle, e.g., a hydraulic power steering system, in addition to the hydraulic motor for driving an axle.

2. Related Art

Conventionally, there are well-known hydraulic four-wheel drive working vehicles, each of which is equipped with front and rear hydraulic motors for driving front wheels and rear wheels. A hydraulic four-wheel drive working vehicle, as disclosed in International Publication No. 2004/062956, is provided with a rear transaxle including a hydraulic motor for driving left and right rear wheels, and with a front transaxle including a pair of left and right hydraulic motors for driving respective left and right front steerable wheels. This type of hydraulic four-wheel drive working vehicle is equipped at a middle portion thereof between the front and rear transaxles with a traveling power transmission system for transmitting power from a prime mover to the rear transaxle, and with a working power transmission system for transmitting power from the prime mover to a working device. In this situation, the front and rear transaxles are fluidly connected to each other via pipes for driving the front and rear wheels (axles), and the axle-driving pipes have to be disposed at the middle portion without interfering with the traveling power transmission system and the working power transmission system.

To miniaturize the hydraulic four-wheel drive working vehicle, the pipes are requested to be disposed within a space inside a vehicle body frame. However, the space is mainly occupied by the traveling power transmission system and the working power transmission system. Further, the vehicle may be equipped under the fore-and-aft middle portion of the vehicle body frame with a working device, such as a mower unit.

The axle-driving pipes have to be disposed in the space between the front and rear transaxles without interfering with the traveling power transmission system and the working power transmission system, and the working device at need. Further, to facilitate assembly works, the pipes are desirably disposed so as to require no device to be detached during the piping work of the pipes, and to require no pipe to be detached during attachment of other devices. On the other hand, in order to reduce internal pressure resistance in the pipes, the pipes are requested to have reduction of bent portions therein and to have rigid pipe portions as long as possible. Especially, the pipes have to be prevented at portions thereof adjacent to a center pivot of the front transaxle with being excessively twisted or bent, and prevented at portions thereof connected to ports from having an oil leak or being damaged.

If the hydraulic four-wheel drive vehicle includes a hydraulic power steering system, hydraulic fluid pipes for the power steering system must be disposed so as to solve the same problems as the axle-driving pipes.

Further, if the vehicle is provided with a reservoir tank for supplying fluid to the hydraulic motors in the front and rear transaxles, it is requested that the reservoir tank is disposed so as to be prevented from interfering with the traveling power transmission system and the working power transmission system, to have easy oiling and maintenance, and to effectively supply fluid into the housings of the front and rear transaxles. Especially, when the front transaxle housing is swingably supported onto the vehicle body frame via a center pivot, the reservoir tank is requested to prevent fluid therein from being contaminated with air by tilt of the fluid level surface according to the swing of the front transaxle housing, and to prevent hydraulic pressure fluid pipes between the reservoir tank and the transaxles from being twisted by the swing of the front transaxle housing.

SUMMARY OF THE INVENTION

A first object of the invention is to provide a hydraulic four-wheel drive working vehicle with a simple hydraulic pressure piping structure solving the above problems.

To achieve the first object, in a first aspect of the invention, a hydraulically driven working vehicle comprises: a frame including a pair of left and right side plates extended in the fore-and-aft direction of the vehicle; a first transaxle supported by one of front and rear portions of the frame, the first transaxle including a hydraulic pump, a first hydraulic motor fluidly connected to the hydraulic pump, a first axle driven by the first hydraulic motor, and a first transaxle housing incorporating the hydraulic pump, the first hydraulic motor and the first axle, wherein the first transaxle housing is provided with a pair of outwardly opened first ports fluidly connected to the hydraulic pump and the first hydraulic motor, respectively; a second transaxle supported by the other rear or front portion of the frame, the second transaxle including a second hydraulic motor fluidly connected to the hydraulic pump, a second axle driven by the second hydraulic motor, and a second transaxle housing swingably supported on the rear or front portion of the frame through a center pivot, and incorporating the second hydraulic motor and the second axle, wherein the second transaxle housing is provided with a pair of second ports fluidly connected to the second hydraulic motor; a prime mover supported by the frame between the first and second transaxles; a traveling power transmission system supported by the frame between the prime mover and the first transaxle so as to drivingly connect the hydraulic pump to the prime mover; a working device disposed under the frame between the first and second transaxles; a working power transmission system supported by the frame between the prime mover and the working device so as to drivingly connect the working device to the prime mover; and a pair of axle-driving hydraulic pressure fluid pipes interposed between the pair of first ports and the pair of second ports so as to fluidly connect the second hydraulic motor to the hydraulic pump. The pipes include respective fore-and-aft extended portions which are extended in the fore-and-aft direction of the vehicle between an inside surface of at least one of the left and right side plates of the frame and the traveling and working power transmission systems.

In the vehicle according to the first aspect, the axle-driving hydraulic pressure fluid pipes are disposed so as not to be exposed sideward from the frame vehicle, thereby being protected from external obstacles. Consequently, the traveling performance of the vehicle can be safely maintained. Further, the vehicle has good appearance because of the hidden pipes.

In the vehicle according to the first aspect, preferably, the fore-and-aft extended portions of both of the pipes are extended along the inside surface of one of the left and right side plate. Due to the simple arrangement of the pipes in the narrow space along the inside surface of the side plate, the vehicle can be minimized while ensuring prevention of the pipes from interfering with the traveling and working power transmission systems and the working device. Further, the piping work for this arrangement of the pipes can be easy.

Alternatively, in the vehicle according to the first aspect, preferably, the fore-and-aft extended portion of one of the pipes is extended along the inside surface of one of the left and right side plates, and the fore-and-aft extended portion of the other pipe is extended along the inside surface of the other right or left side plate. Due to the simple arrangement of the pipes in the narrow spaces along the inside surfaces of the side plates, the vehicle can be minimized while ensuring prevention of the pipes from interfering with the traveling and working power transmission systems and the working device. Further, the piping work for this arrangement of the pipes can be easy.

Further preferably, at least one of the pipes includes: a first rigid pipe portion connected to one of the first ports; a second rigid pipe portion connected to one of the second ports; and a flexible pipe portion interposed between the first and second rigid pipe portions. The flexible hose is extended along one of the left and right side plates of the frame. Therefore, the flexible hose can be bent or curved so as to absorb stress on the pipe according to the swing of the second transaxle around the center pivot. Consequently, the at least one pipe can be durable against the frequent swing of the second transaxle.

Alternatively, preferably, at least one of the pipes includes: a rigid pipe portion connected to one of the first ports and extended along one of the left and right side plates of the frame; and a flexible pipe portion interposed between the rigid pipe portion and one of the second ports. Consequently, the main portion of the at least one pipe is the rigid pipe portion whose internal pressure resistance is small so as to ensure good fuel efficiency.

In either of the above two cases where the at least one pipe uses the rigid pipe portion, preferably, a stay is supported on either the first transaxle housing or one of the left and right side plates of the frame so as to support the rigid pipe portion connected to the first port. Therefore, the stay prevents warp of the pipe caused by the swing of the second transaxle around the center pivot from being transmitted to the end of the pipe connected to the corresponding first port, thereby preventing the pipe end and the first port from having an oil leak and from being damaged.

Further preferably, the first transaxle housing includes a boss connected to the frame, and the stay is mounted onto the boss. Consequently, due to the support by the stay on the first transaxle housing, the pipe end and the first port connected to each other are further surely prevented from moving relative to each other causing the oil leak and damage. The boss ordinarily formed on the first transaxle housing serves as a fixture portion onto which the stay is fixed, thereby requiring no additional fixture member and saving costs.

Further preferably, the at least one of the pipes further includes a swivel joint disposed between the flexible pipe portion and at least one of the first and second rigid pipe portions. The swivel joint absorbs twist of the pipe caused by the swing of the second transaxle around the center pivot, thereby inexpensively providing the pipe having high durability against the swing of the second transaxle.

Alternatively, in the vehicle according to the first aspect, preferably, the pair of first ports are disposed at one of left and right sides of the vehicle, and the pair of second ports are disposed at the other right or left side of the vehicle. The fore-and-aft extended portion of at least one of the pipes is extended along one of the left and right side plates of the frame and connected to the second port. The at least one of the pipes further includes a laterally extended portion which is extended in the lateral direction of the vehicle between the first port and the fore-and-aft extended portion of the at least one of the pipe. A stay is fixed on the first transaxle housing so as to support the laterally extended portion of the at least one of the pipes.

Therefore, in the case that the pair of first ports and the pair of second ports are opened laterally opposite to each other, the limited spaces along the left and right side plates are used for piping of the axle-driving pipes without interfering with another equipment, thereby miniaturizing the vehicle. Further, the stay prevents warp of the corresponding pipe caused by the swing of the second transaxle wound the center pivot from being transmitted to the end of the pipe connected to the corresponding first port, thereby preventing the pipe end and the first port from having an oil leak and from being damaged.

Further preferably, the first transaxle housing includes a boss connected to the frame, and wherein the stay is mounted onto the boss. Consequently, due to the support by the stay on the first transaxle housing, the pipe end and the first port connected to each other are further surely prevented from moving relative to each other causing the oil leak and damage. The boss ordinarily formed on the first transaxle housing serves as a fixture portion onto which the stay is fixed, thereby requiring no additional fixture member and saving costs.

Further preferably, the at least one of the pipes includes: a first rigid pipe portion connected to one of the first ports and serving as the laterally extended portion of the at least one of the pipes; a second rigid pipe portion connected to one of the second ports; and a flexible pipe portion interposed between the first and second rigid pipe portions, wherein the flexible hose is extended along one of the left and right side plates of the frame. Therefore, the flexible hose can be bent or curved so as to absorb stress on the pipe according to the swing of the second transaxle around the center pivot. Consequently, the at least one pipe can be durable against the frequent swing of the second transaxle.

Alternatively, further preferably, the at least one of the pipes includes: a rigid pipe portion connected to one of the first ports and extended along one of the left and right side plates of the frame so as to serve as the fore-and-aft extended portion; and a flexible pipe portion interposed between the rigid pipe portion and one of the second ports. Consequently, the main portion of the at least one pipe is the rigid pipe portion whose internal pressure resistance is small so as to ensure good fuel efficiency.

In either of the above two cases where the at least one pipe includes the rigid pipe portion and the flexible pipe portion, the at least one of the pipes further includes a swivel joint disposed between the flexible pipe portion and the first rigid pipe portion. The swivel joint absorbs twist of the pipe caused by the swing of the second transaxle around the center pivot, thereby inexpensively providing the pipe having high durability against the swing of the second transaxle.

In the pipe arrangement when the pair of first ports and the pair of second ports are laterally offset, preferably, the fore-and-aft extended portions of both of the pipes are extended along one of the left and right side plates of the frame and connected to the respective second ports. Both of the pipes include the respective laterally extended portions interposed between the respective first ports and the respective fore-and-aft extended portions thereof The stay supports the laterally extended portions of both of the pipes. Therefore, both of the fore-and-aft extended portions of the pipes are juxtaposed in the limited space along the side plate so as to minimize the vehicle. Further, the stay prevents warp of both of the pipes caused by the swing of the second transaxle around the center pivot from being transmitted to the ends of the pipes connected to the respective first ports, thereby preventing the pipe ends and the first ports from an having oil leak and from being damaged.

In the pipe arrangement when the pair of first ports and the pair of second ports are laterally offset, alternatively, preferably, a first pipe of the pipes is extended in the fore-and-aft direction of the vehicle from the corresponding first port along one of left and right side plates of the frame, and a second pipe of the pipes includes the fore-and-aft extended portion extended along the other right or left side plate and connected to the corresponding second port, and includes the laterally extended portion connected to the corresponding first port and supported by the stay. Therefore, the fore-and-aft extended portions of the pipes are disposed in the limited spaces along the respective left and right side plates so as to minimize the vehicle. Further, the stay prevents warp of the second pipe caused by the swing of the second transaxle around the center pivot from being transmitted to the end of the second pipe connected to the first port, thereby preventing the end of the second pipe and the first port from having oil leak and from being damaged.

Further preferably, a stay is fixed onto the one of the left and right side plates so as to support the first pipe. The stay on the side plate prevents warp of the first pipe, which is not supported by the stay on the first transaxle housing, caused by the swing of the second transaxle around the center pivot from being transmitted to the end of the first pipe connected to the first port, thereby preventing the end of the first pipe and the first port from having oil leak and from being damaged.

In the vehicle according to the first aspect, preferably, the first transaxle housing is provided with a pair of outwardly opened third ports, a hydraulic power steering valve is disposed on the frame between the first and second transaxles, and a pair of power steering hydraulic pressure fluid pipes are interposed between the hydraulic power steering valve and the pair of third ports and extended along at least one of the axle-driving hydraulic pressure fluid pipes. Therefore, the space required for piping the pair of axle-driving hydraulic pressure fluid pipes and the pair of power steering hydraulic pressure fluid pipes and the at least one axle-driving hydraulic pressure pipe is saved.

In the vehicle according to the first aspect, preferably, the pair of first ports and the pair of third ports are disposed on the same side surface of the first transaxle housing. Consequently, the pair of power steering hydraulic pressure fluid pipes and the at least one axle-driving hydraulic pressure fluid pipe are compactly collected in the vicinity of the first transaxle so as to be connected to the respective third ports and the corresponding first port.

In the vehicle according to the first aspect, the first transaxle further includes a center section disposed in the first transaxle housing and interposed between the hydraulic pump and the first hydraulic motor. The center section is provided with a pair of first and second pump ports fluidly connected to the hydraulic pump, a pair of first and second motor ports fluidly connected to the first hydraulic motor, and a passage interposed between the first pump port and the first motor port. The pair of first ports are fluidly connected to the second pump port and the second motor port, respectively. Due to the center section, the component devices such as the hydraulic pump and the first hydraulic motor and the passage for connection of the hydraulic pump, the first hydraulic motor and the first ports are compactly assembled together so as to minimize the first transaxle housing and expand the space for piping.

Further preferably, the first transaxle further includes a charge pump disposed in the first transaxle housing so as to be driven together with the hydraulic pump by the power from the prime mover through the traveling power transmission system. One of the third ports is fluidly connected to the charge pump, and the other third port is fluidly connected to a fluid-suction side of the hydraulic pump. Due to the charge pump, no additional device for supplying fluid to a hydraulic power steering actuator is required so as to expand an area in the limited space for piping the axle-driving and power steering hydraulic pressure fluid pipes, and save costs.

Further preferably, the first transaxle further includes a charge pump casing incorporating the charge pump. The charge pump casing is disposed in the first transaxle housing and connected to the center section. The charge pump casing is provided with a passage directly connected to the pair of third ports. Due to the charge pump casing, the charge pump and associated equipments are compactly collected so as to minimize the first transaxle housing, thereby expanding the space for piping the axle-driving and power steering hydraulic pressure fluid pipes.

Further preferably, the charge pump casing is provided with another passage directly connected to the pair of first ports so as to fluidly connect the passage in the center section to the pair of first ports. Therefore, the inside portion of the charge pump casing is used for forming the passage directly connected to the first ports disposed on the same side surface of the first transaxle housing with the third pods, so as to reduce a space in the first transaxle housing for a passage interposed between the third ports and the first ports, i.e., minimizing the first transaxle housing, thereby expanding the space for piping the axle-driving and power steering hydraulic pressure fluid pipes.

Further preferably, an adapter is attached onto the center section and provided therein with a passage through which the pair of first ports are fluidly connected to the center section. Due to the easily removable adapter, the passage directly connected to the first ports disposed on the same side surface of the first transaxle housing with the third ports can be easily formed, and a space in the first transaxle housing for a passage interposed between the third ports and the first ports is reduced, that is, the first transaxle housing is minimized, thereby expanding the space for piping the axle-driving and power steering hydraulic pressure fluid pipes.

A second object of the invention is to provide a hydraulic four-wheel drive working vehicle equipped with a reservoir tank which prevents fuel therein from being contaminated with air so as to solve the above problems.

To achieve the second object, in a second aspect of the invention, a hydraulically driven working vehicle comprises: a frame extended in the fore-and-aft direction of the vehicle; a first transaxle supported by one of front and rear portions of the frame, the first transaxle including a hydraulic pump, a first hydraulic motor fluidly connected to the hydraulic pump, a first axle driven by the first hydraulic motor, and a first transaxle housing incorporating the hydraulic pump, the first hydraulic motor and the first axle, wherein the first transaxle is formed therein with a first fluid sump, and wherein the first transaxle housing is provided with a pair of outwardly opened first ports fluidly connected to the hydraulic pump and the first hydraulic motor, respectively; a second transaxle supported by the other rear or front portion of the frame, the second transaxle including a second hydraulic motor fluidly connected to the hydraulic pump, a second axle driven by the second hydraulic motor, and a second transaxle housing incorporating the second hydraulic motor and the second axle, wherein the second transaxle is formed therein with a second fluid sump, and wherein the second transaxle housing is provided with a pair of second ports fluidly connected to the second hydraulic motor; a pair of hydraulic pressure fluid pipes interposed between the pair of first ports and the pair of second ports; a prime mover supported by the frame between the first and second transaxles; a traveling power transmission system supported by the frame between the prime mover and the first transaxle so as to drivingly connect the hydraulic pump to the prime mover; a working device disposed under the frame between the first and second transaxles; a working power transmission system supported by the frame between the prime mover and the working device so as to drivingly connect the working device to the prime mover; and a reservoir tank fluidly connected to the hydraulic pump and the first and second hydraulic motors. The reservoir tank is disposed so that a fluid level in the reservoir tank is higher than levels of the first and second fluid sumps. Therefore, fluid flowing from the reservoir tank to the first or second transaxle housing is prevented from being contaminated with air.

In the vehicle according to the second aspect, preferably, the reservoir tank is disposed just behind a rear end surface of the frame. Therefore, the reservoir tank exposed on the frame can be easily attached or detached onto and from the frame, and easily subjected to maintenance. Further, the reservoir tank can be disposed behind rear wheel tires so that the rear wheel tires do not hinder the attachment, detachment and maintenance of the reservoir tank, and the damage of the reservoir tank by mud and stones stuck on the tire is reduced.

Alternatively, in the vehicle according to the second aspect, preferably, a breather provided on a top of the reservoir tank, which also serves as a fluid-supply opening of the reservoir tank, is disposed behind a driver's seat of the vehicle. Therefore, the top of the breather disposed outward of the vehicle facilitates fluid-supply to the reservoir tank.

In the vehicle according to the second aspect, preferably, a fuel tank is joined to the reservoir tank. Therefore, the number of required component parts is reduced so as to facilitate assembling work of the vehicle.

Further preferably, a driver's seat is disposed above the first transaxle, so that the fuel tank and the reservoir tank are disposed between the seat and the first transaxle. Therefore, the space between the first transaxle and the seat above the first transaxle is effectively used for arranging the reservoir tank so as to reduce a dead space, thereby minimizing the vehicle.

Further preferably, a breather provided on a top of the reservoir tank, which also serves as a fuel-support opening of the reservoir tank, is disposed behind the seat. Therefore, fuel can be easily supplied to the reservoir tank.

Alternatively, in the vehicle according to the second aspect, the reservoir tank is disposed between a first wheel provided onto the first axle and a second wheel provided onto the second axle. This arrangement of the heavy reservoir tank improves the weight balance of the vehicle in the fore-and-aft direction.

Further preferably, a bonnet incorporating the prime mover also incorporates the reservoir tank. Therefore, the inner space of the bonnet is effectively used for arranging the reservoir tank so as to minimize the vehicle. Further, the cooling wind for the prime mover in the bonnet can also cool the reservoir tank, thereby requiring no additional device for cooling the reservoir tank.

Further preferably, a breather provided on a top of the reservoir tank, which also serves as a fluid-supply opening of the reservoir tank, is disposed behind the seat. A dashboard of the vehicle is provided with an opening, which faces the top of the breather and is covered with a removable lid. Due to such a simple structure, fuel can be easily supplied through the dashboard into the reservoir tank.

A third object is to provide a hydraulic transaxle, which can serve as a main transaxle of a hydraulic four-wheel working vehicle, adapted to prevent pipes therearound from being complicated.

To achieve the third object, in a third aspect of the invention, a transaxle comprises: a transaxle housing supported by one of front and rear portions of a vehicle body frame; a hydraulic pump disposed in the transaxle housing so as to be driven by power from a prime mover through a traveling power transmission system; a charge pump disposed in the transaxle housing so as to be driven by the power from the prime mover through the traveling power transmission system; an axle disposed in the transaxle housing so as to be driven by the hydraulic motor; a pair of first ports provided on a side surface of the transaxle housing so as to be fluidly connected to the hydraulic pump and the hydraulic motor respectively; and a pair of second ports provided on the same side surface of the transaxle housing with the first ports. One of the second ports is fluidly connected to the charge pump, and the other second port is fluidly connected to a fluid-suction side of the hydraulic pump.

Therefore, hydraulic pressure fluid pipes for driving an auxiliary device (such as a power steering actuator) connected to the second ports can be compactly collected together with hydraulic pressure fluid pipes for driving the axle of the first transaxle connected to the pair of first ports. Further, due to the charge pump, the auxiliary device (such as the power steering actuator) requires no additional fluid-supply device so as to save a space, i.e., to expand the space for the pipes, and to save the number of parts and costs.

In the transaxle according to the third aspect, preferably, a center section is disposed in the transaxle housing and interposed between the hydraulic pump and the hydraulic motor. The center section is provided with a pair of first and second pump ports fluidly connected to the hydraulic pump, a pair of first and second motor ports fluidly connected to the hydraulic motor, and a passage interposed between the first pump port and the first motor port. The pair of first ports are fluidly connected to the second pump port and the second motor port, respectively. Due to the center section, the component devices such as the hydraulic pump and the first hydraulic motor and the passage for connection of the hydraulic pump, the first hydraulic motor and the first ports are compactly assembled together so as to minimize the transaxle housing and expand the space for pipes connected to the first ports and the second ports.

In the transaxle according to the third aspect, preferably, a charge pump casing incorporating the charge pump is disposed in the transaxle housing and connected to the center section. The charge pump casing is provided with a passage directly connected to the pair of second ports. Due to the charge pump casing, the charge pump and associated equipments are compactly collected so as to minimize the transaxle housing, thereby expanding the space for pipes connected to the first ports and the second ports.

Further preferably, the charge pump casing is provided with another passage directly connected to the pair of first ports so as to fluidly connect the passage in the center section to the pair of first ports. Therefore, the inside portion of the charge pump casing is used for forming the passage directly connected to the first ports disposed on the same side surface of the transaxle housing with the second ports, so as to reduce a space in the transaxle housing for a passage interposed between the second ports and the first ports, i.e., minimize the transaxle housing, thereby expanding the space for pipes connected to the first ports and the second ports.

Alternatively, further preferably, an adapter is attached onto the center section and provided therein with a passage through which the pair of first ports are fluidly connected to the center section. Due to the easily removable adapter, the passage directly connected to the first ports disposed on the same side surface of the transaxle housing with the second ports can be easily formed, and a space in the transaxle housing for a passage interposed between the second ports and the first ports is reduced, that is, the transaxle housing is minimized, thereby expanding the space for pipes connected to the first ports and the second ports.

In the transaxle according to the third aspect, preferably, a pair of third ports is provided for fluidly connecting the pair of first ports to a second hydraulic motor for driving another axle. Due to this arrangement, a vehicle equipped with the transaxle can be provided with compactly collected hydraulic pressure fluid pipes, thereby being minimized.

These, further and other objects, features and advantages will appear more fully from the following description with reference to the accompanying drawings.

DETAILED DESCRIPTION OF THE INVENTION

First Embodiment

Figure 1:
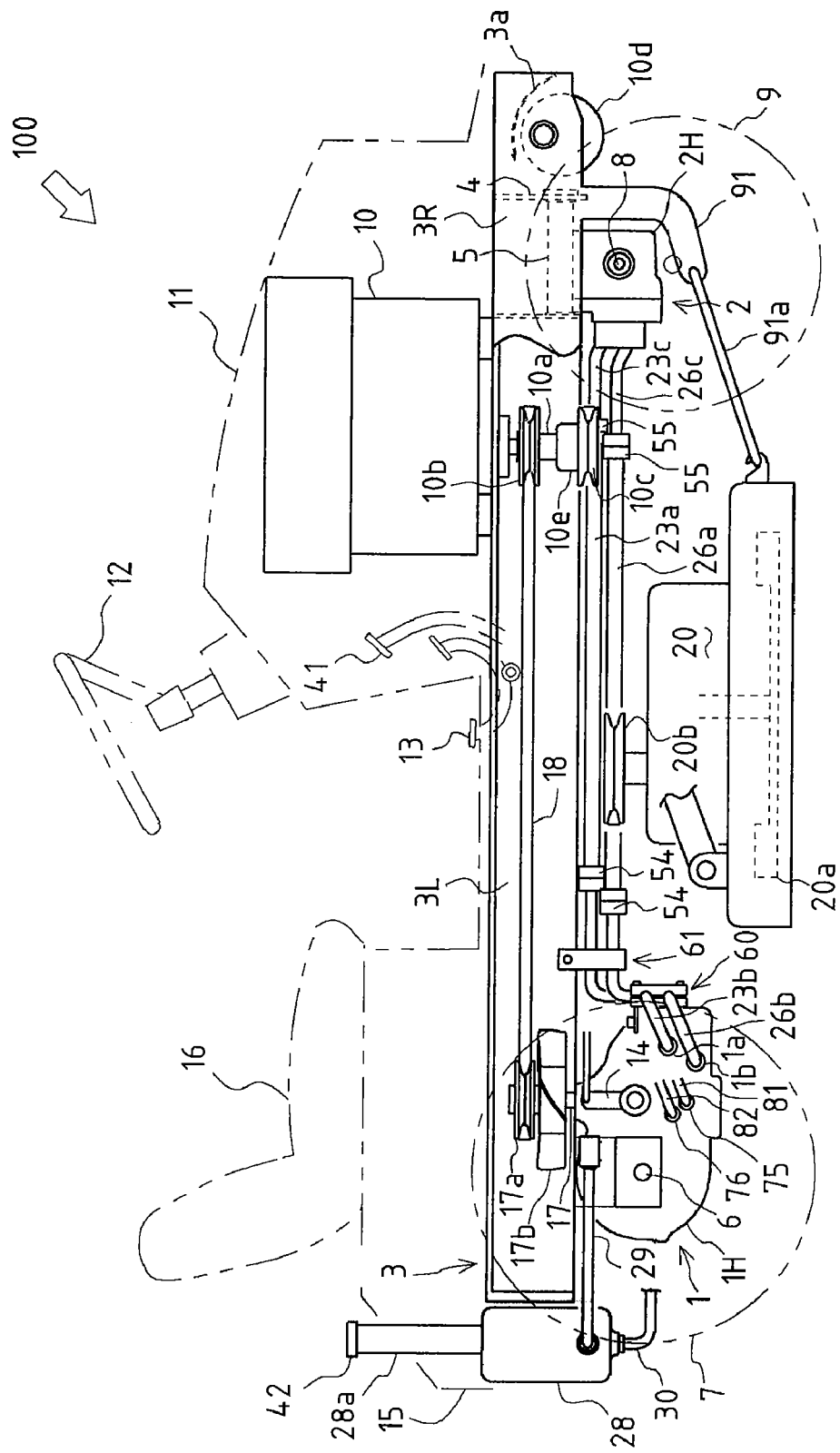
FIG. 1 is a sectional side view of a hydraulic four-wheel drive working vehicle according to a first embodiment of the invention.
Figure 2:
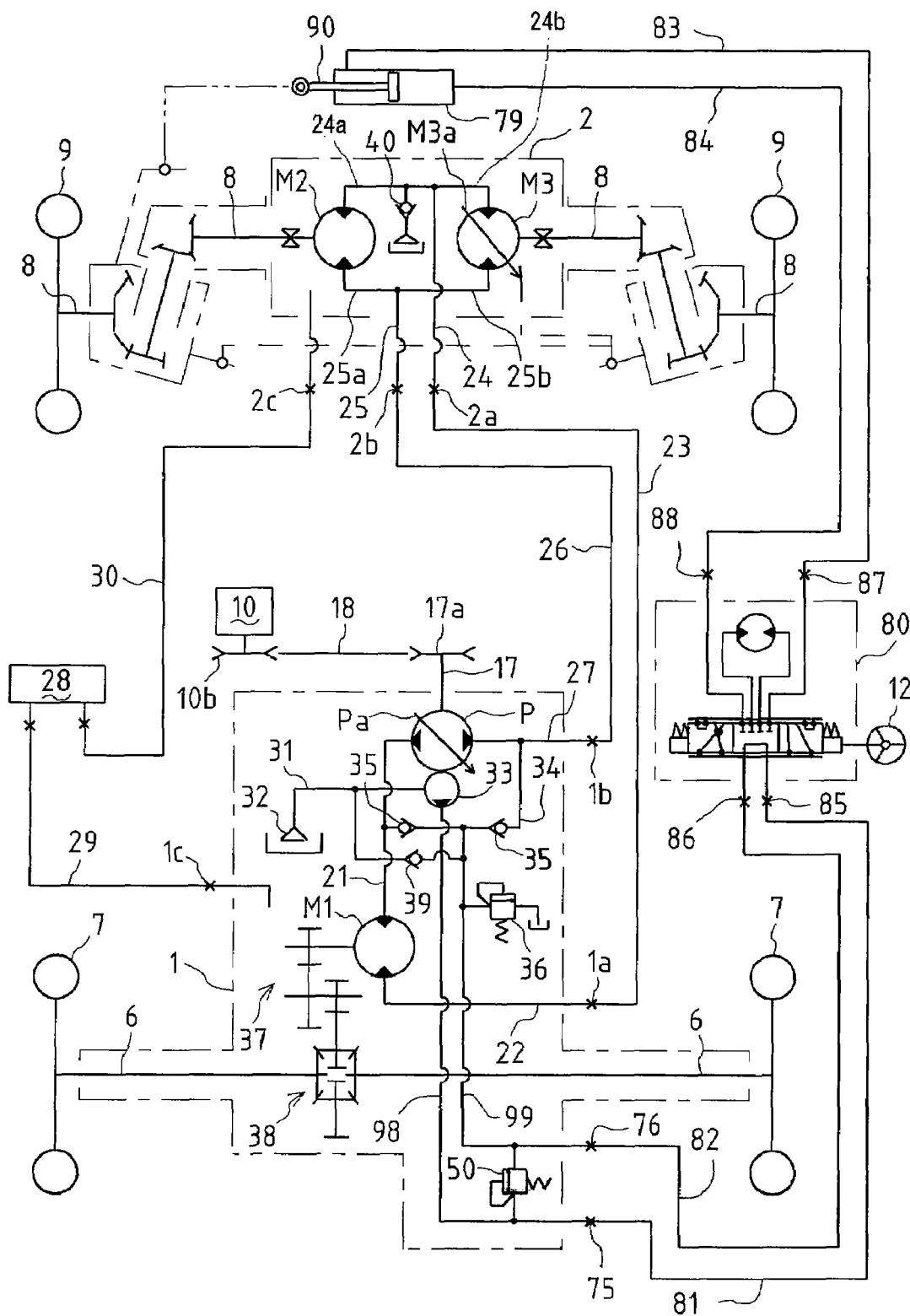
FIG. 2 is a hydraulic circuit diagram of the hydraulic four-wheel drive working vehicle according to the invention.
Figure 3:
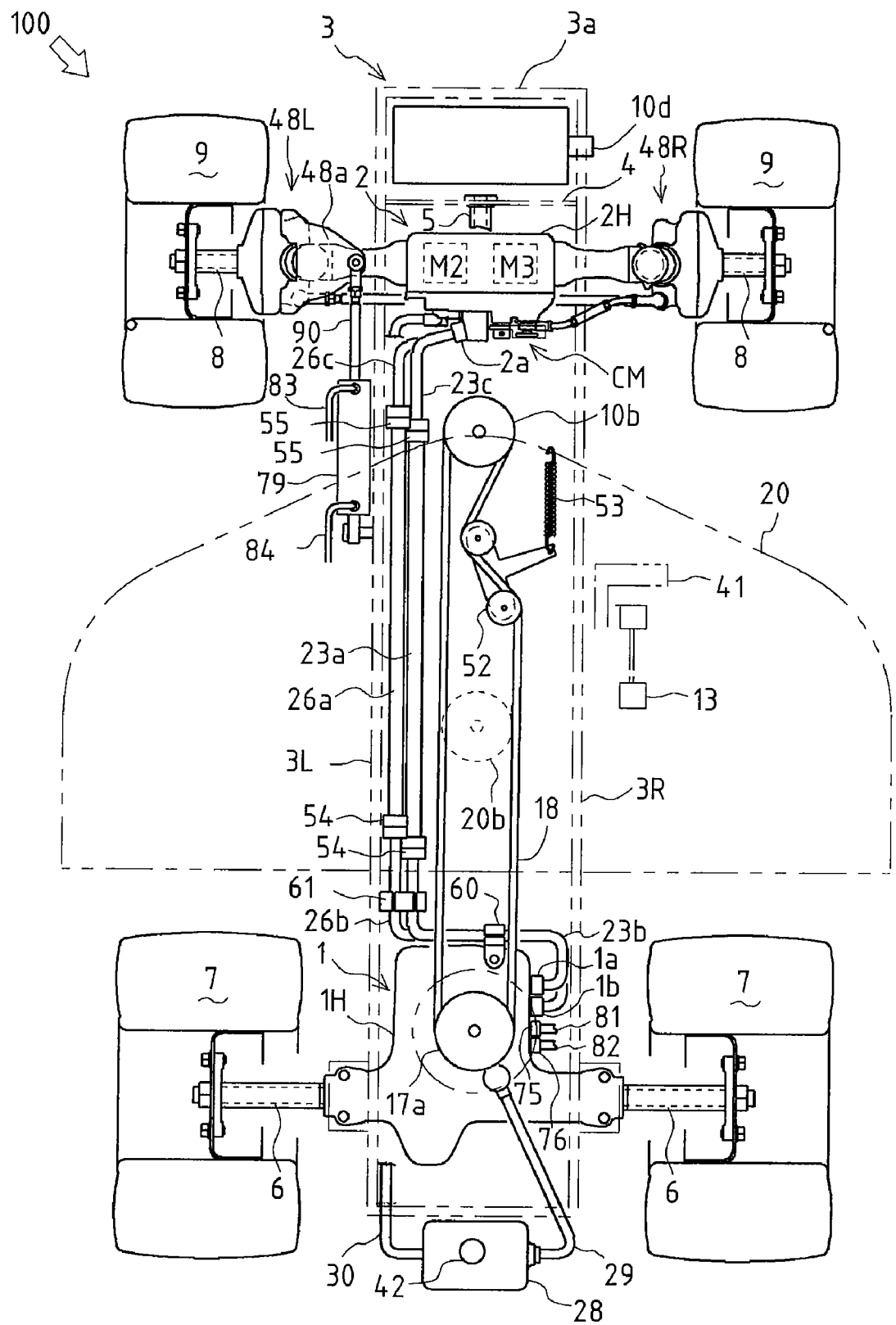
FIG. 3 is a sectional plan view of the hydraulic four-wheel drive working vehicle according to the first embodiment, provided with an arrangement of hydraulic pressure fluid pipes.

Referring to FIGS. 1 to 3, a hydraulic four-wheel drive working vehicle 100 according to a first embodiment of the invention will be described. Vehicle 100 is an Ackerman type steered lawn tractor, comprising: a frame 3; a rear transaxle 1; a front transaxle 2; an engine 10; a traveling power transmission system; a mower unit 20; and a mower driving power transmission system. Frame 3 includes parallel left and right side plates 3L and 3R extended in the fore-and-aft direction of vehicle 100.

Rear transaxle 1 is supported by a rear portion of frame 3. Rear transaxle 1 includes a rear transaxle housing 1H, incorporating a hydraulic pump P, a hydraulic motor M1 (serving as a first hydraulic motor) fluidly connected to hydraulic pump P, left and right rear wheel axles 6 (serving as a first axle), and a deceleration gear train 37 and a differential gear unit 38 (see FIG. 2) interposed between hydraulic motor M1 and axles 6. Rear transaxle housing 1H is outwardly opened by a pair of traveling hydraulic fluid supply-and-delivery ports 1a and 1b, which are connected to hydraulic pump P and hydraulic motor M1, respectively.

Front transaxle 2 is supported by a front portion of frame 3. Front transaxle 2 includes a front transaxle housing 2H swingably supported onto frame 3 through a center pivot 5. Front transaxle housing 2H incorporates a pair of hydraulic motors M2 and M3, and left and right front wheel axles 8 driven by respective hydraulic motors M2 and M3. Front transaxle housing 2H is outwardly opened by a pair of traveling hydraulic fluid supply-and-delivery ports 2a and 2b, which are fluidly connected to respective hydraulic motors M2 and M3, so as to fluidly connect hydraulic motors M2 and M3 to hydraulic pump P in rear transaxle 1.

Engine 10 is supported by frame 3 between rear and front transaxles 1 and 2. The traveling power transmission system for drivingly connecting hydraulic pump P to engine 10 is supported by frame 3 between engine 10 and rear transaxle 1.

Mower unit 20 is disposed under frame 3 between rear and front transaxles 1 and 2. The mower driving power transmission system for drivingly connecting mower unit 20 to engine 10 is supported by frame 3 between engine 10 and mower unit 20.

Vehicle 100 is provided with a pair of axle-driving hydraulic pressure fluid pipes 23 and 26 interposed between the pair of ports 1a and 1b and the pair of ports 2a and 2b so as to fluidly connect hydraulic motors M2 and M3 to hydraulic pump P. In this embodiment, ports 1a and 1b of rear transaxle housing 1H are disposed rightward of vehicle 100, and ports 2a and 2b of front transaxle housing 2H are disposed leftward of vehicle 100. Pipes 23 and 26 are extended laterally (in the left-and-right direction) from respective ports 1a and 1b, and extended in the fore-and-aft direction along an inside surface of left side plate 3L of frame 3 in a gap between the inside surface of left side plate 3L and the traveling power transmission system and the mower-driving power transmission system, so as to be connected to respective ports 2a and 2b.

The laterally extended portions of pipes 23 and 26 are supported by a clamping stay 60 fixed on rear transaxle housing 1H. More specifically, rear transaxle housing 1H is formed with a boss to be attached to frame 3, and clamping stay 60 is fixed onto the boss.

Pipes 23 and 26b includes rigid pipes 23b and 26b connected to ports 1a and 1b, and rigid pipes 23c and 26c connected to ports 2a and 2b, respectively. Rigid pipes 23b, 23c, 26b and 26c are made of metal, for instance. Flexible hoses 23a and 26a are extended in the fore-and-aft direction along the inside surface of left side plate 3L so as to be interposed between rigid pipes 23b and 23c and between rigid pipes 26b and 26c, respectively. Flexible hoses 23a and 23b are made of rubber withstanding pressure, for instance. Rigid pipes 23b and 26b serve as the laterally extended portions of pipes 23 and 26 connected to first ports 1a and 1b. Rigid pipes 23b and 26b are connected to flexible hoses 23a and 26a through swivel joints 54, respectively, and rigid pipes 23c and 26c to flexible hoses 23a and 26a through swivel joints 55, respectively.

A hydraulic power steering valve 80 shown in FIG. 2 is disposed on frame 3 between rear and front transaxles 1 and 2. Rear transaxle housing 1H is rearwardly outwardly opened by auxiliary device driving hydraulic fluid supply-and-delivery ports 75 and 76. A pair of power steering hydraulic pressure fluid pipes 81 and 82 are interposed between ports 75a and 76 and valve 80 along pipes 23 and 26.

In this embodiment, a reservoir tank 28 is disposed just behind a rear end surface of frame 3 so as to be fluidly connected to hydraulic pump P and hydraulic motors M1, M2 and M3. Reservoir tank 28 is disposed so that a fluid level in reservoir tank 28 is higher than fluid levels of the fuel sumps in respective transaxle housings 1H and 2H. Reservoir tank 28 is formed with an upright cylindrical fluid-supply portion 28a. A breather 42, which also serves as a fluid-supply opening, is disposed on the top of fluid-supply portion 28a behind a driver's seat.

Various sections in vehicle 100 will be more detailed. With respect to the support of front transaxle 2 by the front portion of frame 3, as shown in FIGS. 1 to 3, a bracket 4 is fixed on the front portion of frame 3, and front transaxle housing 2H is swingably supported by bracket 4 through fore-and-aft horizontal center pivot 5, so that left and right ends of front transaxle housing 2H are vertically swingable.

Left and right axles 6 are extended laterally outward from rear transaxle housing 1H, and fixed at distal ends thereof to center portions of unsteerable rear wheels 7, respectively. Left and right axles 8 are extended laterally outward from front transaxle housing 2H, and drivingly connected at distal ends thereof to steerable front wheels 9, respectively.

Engine 10 is vibro-isolatingly supported on an upper front portion of frame 3 through vibro-isolating rubbers or the like, and covered with a bonnet. A steering wheel 12 is disposed upwardly rearward from the rear end of bonnet 11, and a speed control pedal 13 is disposed at a bottom portion of the rear end of bonnet 11. In seesaw-like shaped speed control pedal 13, a front portion is depressed for controlling forward traveling speed of vehicle 100, and a rear portion is depressed for controlling backward traveling speed of vehicle 100. A speed control lever 14 pivoted on rear transaxle housing 1H interlocks with speed control pedal 13. A brake pedal 41 is disposed in front of speed control pedal 13. A rear cover 15 is mounted on an upper rear portion of frame 3, and a driver's seat 16 is disposed on the top of rear cover 15.

Engine 10 is provided with a downward vertical output shaft 10a. A pulley 10b is fixed on output shaft 10a, and a pulley 10c is provided on a lower portion of output shaft 10a below pulley 10b through an electromagnetic clutch 10e. Rear transaxle 1 is provided with an input shaft 17, which serves as a common pump shaft for hydraulic pump P and a charge pump 33, projecting upward from rear transaxle housing 1H. A pulley 17a is fixed on input shaft 17. A belt is looped over pulleys 10b and 17a so as to constitute the traveling power transmission system for drivingly connecting hydraulic pump P in rear transaxle 1 to engine 10. A cooling fan 17b is fixed on input shaft 17 so as to blow cooling wind to rear transaxle housing 1H.

As shown in FIG. 3, twin tension pulleys 52 guide an intermediate portion of belt 18. Either of pulleys 52 has a pivot extended downward from frame 3. A spring 53 for applying tension is hooked at one end thereof onto an arm supporting pulleys 52, and connected at the other end thereof to frame 3.

As shown in FIG. 1, mower unit 20 incorporating rotary blades 20a is vertically movably suspended under frame 3 between front wheels 9 and rear wheels 7. Mower unit 20 is provided at the top thereof with an input pulley 20b. A mower-driving belt (not shown) is looped over pulleys 10c and 20b so as to constitute the mower-driving power transmission system for drivingly connecting rotary blades 20a in mower unit 20 to engine 10. Electromagnetic clutch 10e interposed between pulley 10c and engine output shaft 10a is clutched on for transmitting power of engine 10 to mower unit 20, and clutched off for isolating mower unit 20 from the power of engine 10.

Rear transaxle housing 1H incorporates hydraulic pump P and hydraulic motor M1 for driving rear wheels 7 (axles 6), front transaxle housing 2H incorporates hydraulic motors M2 and M3 for driving respective front wheels 9 (axles 8), and pipes 23 and 26 are interposed between transaxle housings 1H and 2H, so as to constitute a hydrostatic transmission (HST) circuit HC1 including hydraulic pump P and hydraulic motors M1, M2 and M3.

HST circuit HC1 of vehicle 100 will be described with reference to FIG. 2. As mentioned above, pipe 23 is interposed between port 1a of rear transaxle housing 1H and port 2a of front transaxle housing 2H, and pipe 26 is interposed between port 1b of rear transaxle housing 1H and port 2b of front transaxle housing 2H. In rear transaxle housing 1H, a passage 21 is interposed between hydraulic pump P and hydraulic motor M1, a passage 27 is interposed between hydraulic pump P and port 1b, and a passage 22 is interposed between hydraulic motor M1 and port 1a.

In rear transaxle housing 2H, fixed displacement hydraulic motor M2 and variable displacement hydraulic motor M3 are connected to port 2a through a passage 24 in parallel, and connected to port 2b through a passage 25 in parallel. Passage 24 is bifurcated into a passage 24a connected to hydraulic motor M2 and a passage 24b to hydraulic motor M3, and passage 25 is bifurcated into a passage 25a connected to hydraulic motor M2 and a passage 25b connected to hydraulic motor M3.

In HST circuit having the above structure, hydraulic motor M1 of rear transaxle 1 and the pair of hydraulic motors M2 and M3 of front transaxle 2 are fluidly connected in series to hydraulic pump P. Hydraulic motors M2 and M3 in front transaxle 2 are fluidly connected in parallel with each other to hydraulic pump P so as to be differentially driven in correspondence to difference of load between left and right front wheels 9.

Regarding to circulation route in HST circuit HC1, when vehicle 100 travels forward, fluid delivered from hydraulic pump P flows to hydraulic motors M2 and M3 through passage 27, port 1b, pipe 26, port 2b and passage 25, and then flows to hydraulic motor M1 through passage 25, port 2a, pipe 23, port 1a and passage 22, and returns to hydraulic pump P through passage 21. In other words, when vehicle travels forward, hydraulic pump P supplies fluid to hydraulic motors M2 and M3 of front transaxle 2 prior to hydraulic motor M1 of rear transaxle 1. When vehicle 100 travels backward, fluid flow delivered from hydraulic pump takes a route opposite to the above route during forward traveling of vehicle 100, so as to be supplied to hydraulic motor M1 of rear transaxle 1 prior to hydraulic motors M2 and M3 of front transaxle 2.

A drive mode switching valve (not shown) for setting vehicle 100 into either a two-wheel drive mode or a four-wheel drive mode may be interposed between transaxles 1 and 2 across pipes 23 and 26. When the valve is set at the four-wheel drive mode position, pipes 23 and 26 are entirely passed through the valve between ports 1a and 2a and between 1b and 2b, respectively, thereby circulating fluid from hydraulic pump P through hydraulic motor M1, M2 and M3. The valve when set at the two-wheel drive mode position makes a closed circuit between hydraulic pump P and hydraulic motor M isolated from ports 2a and 2b, so as to supply fluid from hydraulic pump P to hydraulic motor M1, thereby driving rear wheels 7 (axles 6), and the valve also makes a closed circuit between hydraulic motors M2 and M3 independent of the circuit between hydraulic pump P and hydraulic motor M1, so as to allow circulation of fluid between hydraulic motors M2 and M3, thereby allowing free differential rotation of front wheels 9.

Transaxle housings 1H and 2H are filled with fluid so as to make respective fluid sumps therein. Rear transaxle housing 1H is formed with a drain port 1c connected to reservoir tank 28 through a drainpipe 29. Front transaxle housing 2H is formed with a drain port 2c connected to reservoir tank 28 through a drainpipe 30. Therefore, reservoir tank 28 absorbs fluid excessively expanded in the respective fluid sumps in transaxle housings 1H and 2H.

Charge pump 33 is disposed in rear transaxle housing 1H so as to supply fluid to HST circuit HC1, and preferably driven by input shaft 17 which also serves as the pump shaft of hydraulic pump P. In rear transaxle housing 1H, a suction line 31 is interposed between a fluid filter 32 submerged in the fluid sump and charge pump 33 so as to supply fluid to charge pump 33. Alternatively, charge pump 33 may suck fluid from reservoir tank 28 disposed outside rear transaxle housing 1H.

A charge fluid passage 34 is extended from charge pump 33 and bifurcates to be connected to passages 21 and 27 with hydraulic pump P therebetween. A pair of check valves 36 are disposed on the bifurcating portions of charge fluid passage 34 connected to respective passages 21 and 27. Due to this structure, fluid delivered from charge pump 33 is introduced through corresponding check valve 36 into one of passages 21 and 27 which is pressurized lower than the other passage 27 or 21.

A check valve 39 for preventing cavitation is connected in parallel with charge pump 33 to suction line 31, and connected to charge fluid passage 34 between charge check valves 35 through a later-discussed power steering hydraulic fluid circuit. When one of pipes 21 and 27 is hydraulically depressed, check valve 39 introduces fluid from suction line 31 to depressed passage 21 or 27 so as to assist the fluid supply from charge pump 33.

In rear transaxle housing 1H, differential gear unit 38 differentially connects axles 6 to each other, and deceleration gear train 37 is interposed between a motor shaft of hydraulic motor M1 and differential gear unit 38. Due to this structure, the output force of hydraulic motor M1 driven by hydraulic pump P is transmitted to rear wheels 7 on axles 6 through deceleration gear train 37 and differential gear unit 38. Variable displacement hydraulic pump P is provided with a movable swash plate Pa interlocking with speed control lever 14 (see FIG. 1), which is pivoted on rear transaxle housing 1H and operatively connected to speed control pedal 13. Due to the depression amount and direction of speed control pedal 13, the tilt angle of swash plate Pa is controlled so as to determine the fluid delivery amount and direction from hydraulic pump P, thereby determining the rotary speed and direction of rear wheels 7 (and front wheels 9 in the four-wheel drive mode).

A manner of setting peripheral speeds of rear wheels 7 and front wheels 9 according to the output rotation speed of hydraulic motor M1 and hydraulic motors M2 and M3, and a mechanism for setting the peripheral speeds will now be described. In an ordinary manner, the peripheral speeds of rear wheels 7 and front wheels 9 are set so that the peripheral speed of rear wheels 7 is equal to the peripheral speed of front wheels 9 when vehicle 100 travels straight. However, the strict equalization of peripheral speed between rear wheels 7 and front wheels 9 causes frequent reverse of large and small peripheral speed relation between rear wheels 7 and front wheels 9 depending on the ground condition. More specifically, during traveling of vehicle 100, the state that the peripheral speed of rear wheels 7 exceeds the peripheral speed of front wheels 9 (i.e., front wheels 9 rotate following rear wheels 7, because front wheel or wheels 9 are loaded by the ground so that the peripheral speed of front wheels 9 becomes lower than the proper peripheral speed thereof corresponding to the set output of hydraulic motors M2 and M3) alternates with the state that the peripheral speed of front wheels 9 exceeds the peripheral speed of rear wheels 7 (i.e., rear wheels 7 rotate following front wheels 9, because rear wheel or wheels 7 are loaded by the ground so that the peripheral speed of rear wheels 7 becomes lower than the proper peripheral speed thereof corresponding to the set output of hydraulic motor M1). Consequently, vehicle 100 travels in uncomfortable stiff movement.

To solve the problem, in present vehicle 100, the output speeds of hydraulic motor M1 and motors M2 and M3 are set so that the peripheral speed of rear wheels 7 becomes slightly higher than the peripheral speed of front wheels 9 during straight traveling of vehicle 100. In other words, a front assist ratio (a degree of assisting the rotation of rear wheels 7 by the rotation of front wheels 9, i.e., a ratio of the set peripheral speed of front wheels 9 to the set peripheral speed of rear wheels 7) is set to be smaller than 1.0. Consequently, during straight traveling of vehicle 100, front wheels 9 almost rotate following rear wheels 7. Even if rear wheel or wheels 7 are loaded and slowed down to some degree so that the peripheral speed of rear wheels 7 becomes lower than the proper peripheral speed thereof corresponding to the set output speed of hydraulic motor M1, the peripheral speed of rear wheels 7 is still higher than or equal to the peripheral speed of front wheels 9, i.e., the state that the rotation of rear wheels 7 assists the rotation of front wheels 9 is still maintained. In other words, during straight traveling of vehicle 100 with hydraulic motors M1, M2 and M3 set as the above, it rarely occurs that the peripheral speed of front wheels 9 abnormally exceeds the peripheral speed of rear wheels 7. Therefore, vehicle 100 can comfortably travel without stiff movement.

However, due to the output rotary speed setting of hydraulic motors M1, M2 and M3 for making the peripheral speed of rear wheels 7 exceed the peripheral speed of front wheels 9, the rotation of front wheels 9 follows the rotation of rear wheels 7 so as to cause a counter driving force from axles 8 to hydraulic motors M2 and M3, whereby hydraulic motors M2 and M3 act as pumps so as to hydraulically depress the suction ports of motors M2 and M3, thereby causing cavitation in HST circuit HC1 and causing hunting of vehicle 100. This phenomenon remarkably occurs when vehicle 100 turns, especially sharply turns.

To solve the problem, a check valve is connected to a portion of HST circuit HC1, which serves as a suction part of hydraulic motors M2 and M3 (the series of passages 22, 23 and 24 (24a and 24b) between hydraulic motor M1 and the pair of hydraulic motors M2 and M3 during forward traveling of vehicle 100, or the series of passages 21, 27, 26 and 25 (25a and 25b) between hydraulic motor M1 and the pair of hydraulic motors M2 and M3 through hydraulic pump P during backward traveling of vehicle 100), so as to supply fluid into HST circuit HC1 from the outside of HST circuit HC1. In the embodiment of FIG. 2, a check valve 40 is disposed in front transaxle 2 so as to introduce fluid from the fluid sump in front transaxle housing 2H into the suction part of hydraulic motors M2 and M3 during forward traveling of vehicle 100, and a check valve 39 is disposed in rear transaxle 1 so as to introduce fluid from the fluid sump in rear transaxle housing 1H into the suction part of hydraulic motors M2 and M3 during backward traveling of vehicle 100.

Incidentally, as mentioned above, during forward traveling of vehicle 100, in vehicle 100, fluid is supplied to front hydraulic motors M2 and M3 prior to rear hydraulic motor M1. This fluid circulation route is advantageous for forward descending a slope. When vehicle 100 travels forward on a downhill, the weight of vehicle 100 applied on front wheels 9 is larger than that applied on rear wheels 7, so that power required for driving front wheels 9 is larger than that for driving rear wheels 7. The fluid circulation route smoothens forward traveling of vehicle 100 on a downhill.

However, when vehicle 100 travels forward on an uphill, the weight of vehicle 100 applied on rear wheels 7 is larger than that applied on front wheels 9, so that power required for driving rear wheels 7 is larger than that for driving front wheels 9. To correspond to this case, alternatively, the fluid circulation route may be reversed so as to supply fluid to rear hydraulic motor M1 prior to front hydraulic motors M2 and M3, thereby smoothening forward traveling of vehicle 100 on an uphill.

Vehicle 100 can be equipped with various working devices, such as a front blade, a front snowplow, a rear tiller and a plow, as well as mower unit 20. The diameter ratio between front tires and rear tires varies according to the weight and position of the working device equipped on vehicle 100. The variation of diameter ratio means variation of the front assist ratio. Vehicle 100 is provided on front transaxle 2 with an adjustable cam mechanism CM for setting the front assist ratio into a range between 0.7 and 1.0 in correspondence to the target working device.

Figure 8:
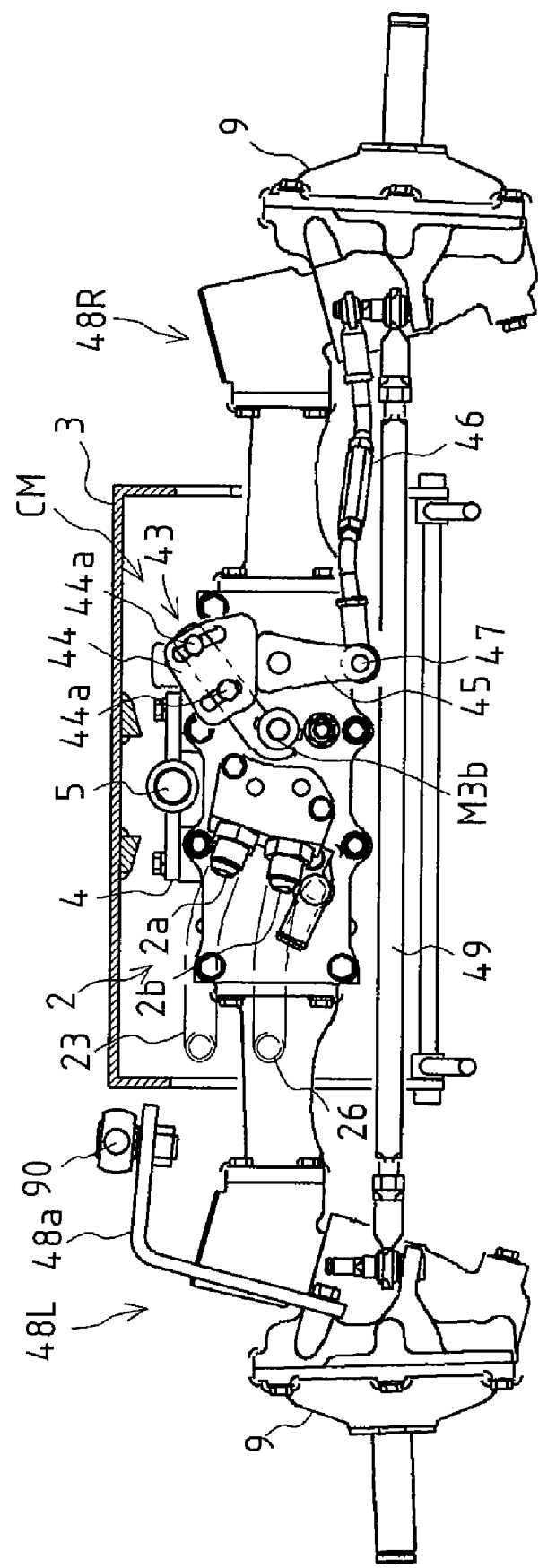
FIG. 8 is a rear view of a front transaxle.

Cam mechanism CM will now be described with reference to FIG. 8 and others. Cam mechanism CM is disposed on the rear portion of front transaxle 2. When steering wheel 12 is rotated from a neutral position (straight traveling position), a piston rod 90 of a power steering cylinder 79 is telescoped through the later-discussed power steering hydraulic circuit. The movement of piston rod 90 is transmitted to a left front wheel support unit 48L so as to laterally turn left front wheel 9 with left front wheel support unit 48L. The lateral turn of left front wheel 9 is transmitted to a right front wheel support unit 48R through a tie rod 49 so as to laterally turn right front wheel 9 with right front wheel support unit 48R in the same direction with left front wheel 9. The lateral turn of right front wheel support unit 48R is transmitted to cam mechanism CM through a control link 46. Cam mechanism CM comprises: a control lever 45 pivotally connected to control link 46 through a pin 47; a control arm 43; and a swash plate pivot shaft M3$b$ serving as a rotary axis of a movable swash plate M3a of hydraulic motor M3. Cam mechanism CM converts the movement of control link 46 into rotational movement of swash plate pivot shaft M3b so as to tilt swash plate M3a at a target angle for reducing the displacement of hydraulic motor M3, thereby accelerating front wheels 9 during turning of vehicle 100.

Control arm 43 is fixed at one end thereof onto a portion of swash plate pivot shaft M3b projecting rearward from front transaxle housing 2H so as to be rotatable integrally with swash plate M3a. Control arm 43 is provided on the other end portion thereof with a contact plate 44 abutting against control lever 45. Contact plate 44 is formed with two slots through which respective adjusting bolts 44a are screwed into control arm 43. By loosening bolts 44a, the position of contact plate 44 can be adjusted so as to adjust the initial tilt angle of swash plate M3a (during straight traveling of vehicle 100), i.e., adjust the front assist ratio. As mentioned above, by this adjustment, the front assist ratio is set within the range between 0.7 and 1.0 in correspondence to the working device equipped onto vehicle 100.

Pin 47 is disposed behind front transaxle housing 2H, and the end of control link 46 is pivotally provided on pin 47 between the rear end surface of front transaxle housing 2H and control lever 45, i.e., in front of control lever 45. A pivot shaft of control lever 45 coaxially engages to pin 47, thereby pivotally connecting control lever 45 to control link 46. Due to this arrangement, control link 46 is disposed forward as far as possible, i.e., control link 46 extremely approaches the rear surface of front transaxle 2H, so as to reduce the fore-and-aft width of front transaxle 2 with cam mechanism CM.

A hydraulic piping construction in vehicle 100 will be described. To minimize a vehicle, hydraulic pressure fluid pipes are requested to be collected inside a vehicle frame. In working vehicle 100, front transaxle 2 incorporates left fixed displacement hydraulic motor M2 and right variable displacement hydraulic motor M3, as mentioned above. Therefore, cam mechanism CM for controlling swash plate M3a of hydraulic motor M3 is disposed eccentrically rightward on the rear portion of front transaxle 2, as shown in FIG. 8. Transaxle housing 2H projects rearward at the left portion thereof laterally opposite to cam mechanism CM so as to have the pair of leftwardly opened ports 2a and 2b.

On the other hand, rightwardly opened ports 1a and 1b of rear transaxle 1 are disposed at the right side surface of rear transaxle housing 1H. This arrangement of ports 1a and 1b and ports 2a and 2b requires pipes 23 and 26 to be disposed rightward from ports 1a and 1b at the right rear portion of vehicle 100, and to be disposed leftward of the front portion of vehicle 100 so as to be connected to ports 2a and 2b. However, the traveling power transmission system and the mower-driving power transmission system occupy a main space inside frame 3. Further, mower unit 20 is disposed under the middle portion of frame 3. Consequently, the space for arranging pipes 23 and 26 between the front and rear portions of vehicle 100 without interfering with the power transmission systems and mower unit 20 is limited.

Other required things in arrangement of pipes are that the piping work requires no other device to be removed, and that work for attaching another device requires no pipe to be removed. Further, to reduce internal pressure resistance in pipes, the pipes include few bent portions as much as possible, and rigid pipes such as steel pipes are desired to serve as the hydraulic pressure fluid pipes. On the other hand, prevention of excessive twist and folding of the pipes caused by the swing of front transaxle 2 around center pivot 5, and prevention of ends of pipes connected to ports from having fluid leak and from being damaged are requested.

Figure 4:
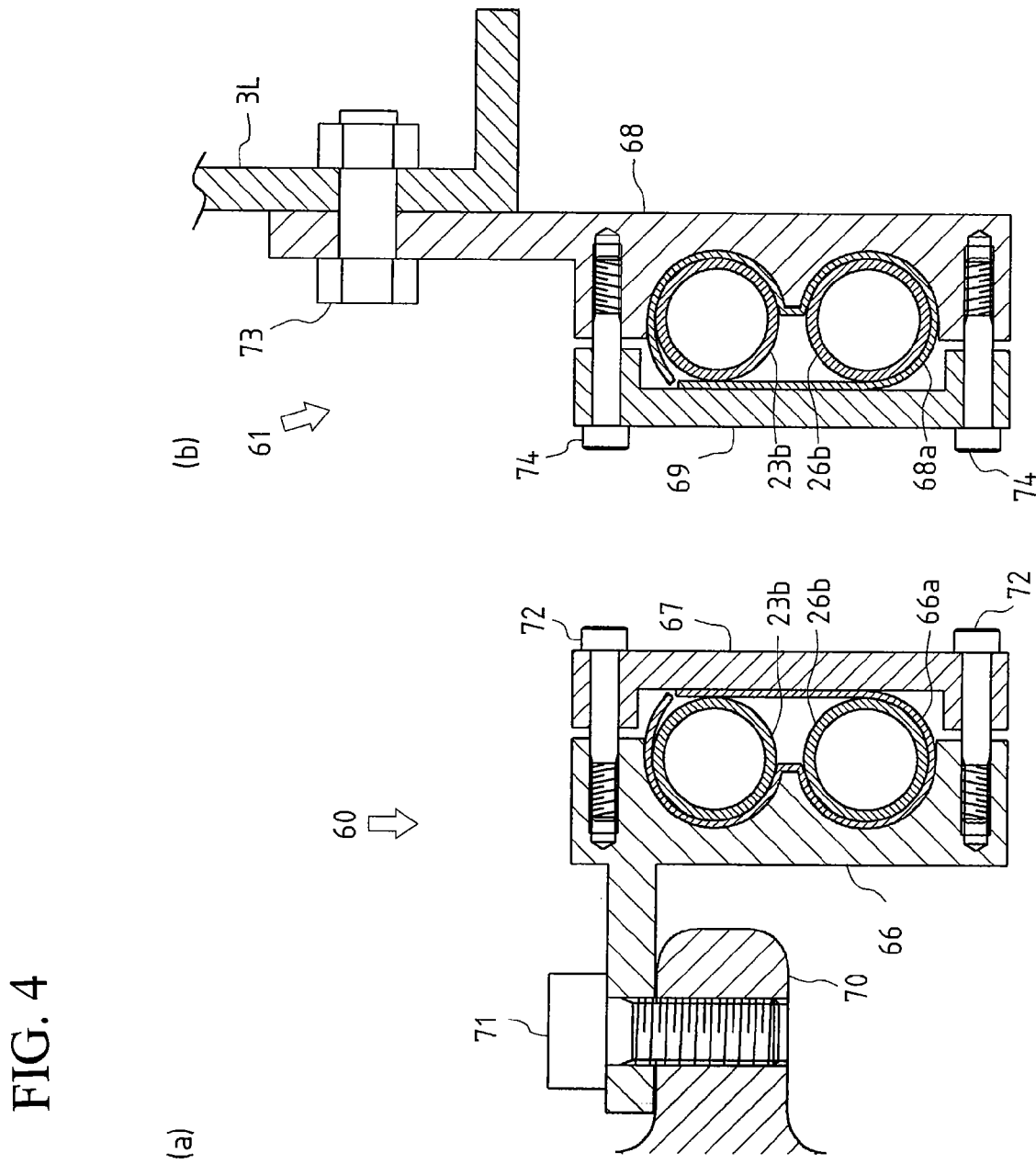
FIG. 4 is a sectional view of a pipe stay support portion.

Arrangement of pipes in vehicle 100 solving these problems will be described. In this regard, referring to FIGS. 1 and 3, extension routes of pipes 23 and 26 from ports 1a and 1b on rear transaxle housing 1H will be described. Rear rigid pipes 23b and 26b of pipes 23 and 26 are extended rightward from ports 1a and 1b, bent, extended upwardly forward, bent again, and extended leftward just in front of the front end surface of rear transaxle housing 1H. Clamping stay 60 fixed on housing 1H clamps the laterally (leftward) extended intermediate portions of rear rigid pipes 23b and 26b. As shown in FIG. 4(a), clamping stay 60 is fixed on a mount boss 70 formed on housing 1H. Mount boss 70 is used for attaching rear transaxle 1 onto a frame of another type vehicle. Arrangement of clamping stay 60 will be detailed later.

Rear rigid pipes 23b and 26b extended leftward just in front of rear transaxle housing 1H are bent at the left portions thereof, extended vertically upward, bent again, and extended horizontally forward along the bottom edge of left side plate 3L when viewed in side as shown in FIG. 1, and along the inside surface of left side plate 3L when viewed in plan as shown in FIG. 3. A clamping stay 61 is fixed onto left side plate 3L so as to clamp the horizontally forward extended portions of rear rigid pipes 23b and 26b.

Rear rigid pipes 23b and 26b are swivellably connected to respective rear ends of flexible hoses 23a and 26a through respective swivel joints 54 in front of clamping stay 61. Flexible hoses 23a and 26a are extended substantially horizontally forward, i.e., substantially coaxially to rear rigid pipes 23b and 26b, along the bottom edge of left side plate 3L when viewed in side as shown in FIG. 1, and along the inside surface of left side plate 3L when viewed in plan as shown in FIG. 3. Flexible hoses 23a and 26a are connected at front ends thereof to respective rear ends of front rigid pipes 23c and 26c through respective swivel joints 55 adjacent to a front portion of left side plate 3L. Front rigid pipes 23c and 26c are extended horizontally forward from respective swivel joints 55, bent and extended leftwardly downward just behind front transaxle 2 so as to be connected to respective ports 2a and 2b on front transaxle housing 2H.

Due to this arrangement, the whole pipes 23 and 26 between ports 1a and 1b and ports 2a and 2b are prevented from interfering with another device or member. In this regard, the fore-and-aft extended main portions of pipes 23 and 26 (including flexible hoses 23a and 26a) are disposed along the bottom edge of left side plate 3L when viewed in side, higher than mower unit 20, thereby being prevented from interfering with mower unit 20. Also, the fore-and-aft extended main portions of pipes 23 and 26 (including flexible hoses 23a and 26a) are disposed along the inside surface of left side plate 3L when viewed in plan, leftward from the traveling power transmission system, including pulley 10b and belt 18, the mower-driving power transmission system, including pulley 20b and the mower-driving belt, and the operation link mechanisms interlocking with speed control pedal 13 and brake pedal 41.

Rigid pipes 23b, 23c, 26b and 26b can be diametrically large so as to reduce the internal pressure resistance therein. Further, all the bent portions of pipes 23 and 26 are provided on rigid portions rigid pipes 23b, 23c, 26b and 26b, and the number of bent portions are reduced as much as possible. Flexible hoses 23a and 26a are disposed along left side plate 3L so as to absorb the deflection of pipes 23 and 26 caused by the swing of front transaxle 2 around center pivot 5. Consequently, pipes 23 and 26 are prevented from being unexpectedly bent or being broken at ends thereof connected to ports 1a, 1b, 2a and 2b.

Due to the clamping of rear rigid pipes 23b and 26b by clamping stays 60 and 61, ends of rigid pipes 23b and 26b connected to ports 1a and 1b are prevented from receiving excessive bending force, shearing force, and stretching force, and thereby being prevented from having fluid leak or being damaged. Further, swivel joints 54 and 55 absorb twisting of pipes 23 and 26 caused by the swing of front transaxle 2 around center pivot 5 so as to prevent pipes 23 and 26 from being damaged or deformed caused by the twist.

The power steering hydraulic circuit system and associate piping in vehicle 100 will be described with reference to FIG. 2. In vehicle 100, power steering cylinder 79 is supplied with fluid from charge pump 33. The pair of auxiliary device driving hydraulic fluid supply-and-delivery ports 75 and 76 are disposed on rear transaxle housing 1H. In rear transaxle housing 1H, charge pump 33 is connected through a passage 98 to port 75, and through a passage 99 to port 76. Hydraulic power steering valve 80 is provided with a pair of ports 85 and 86 corresponding to respective ports 75 and 76. At the outside of rear transaxle housing 1H, pipe 81 is interposed between ports 75 and 85, and pipe 82 is interposed between ports 76 and 86. Hydraulic power steering valve 80 is also provided with a pair of ports 87 and 88 corresponding to front and rear ports of power steering cylinder 79. A hydraulic pressure fluid pipe 83 is interposed between port 87 and the front port of power steering cylinder 79, and a hydraulic pressure fluid pipe 84 is interposed between port 88 and the rear port of power steering cylinder 79.

In the above hydraulic circuit system, valve 80 is switched correspondence to the rotation angle and direction of steering wheel 12, so as to control fluid-supply from charge pump 33 to power steering cylinder 79.

A relief valve 50 is interposed between pipes 98 and 99. When higher-pressurized pipe 98 is excessively pressurized, relief valve 50 is opened so as to bypass excessive pressure fluid from higher-pressurized pipe 98 to lower-pressurized pipe 99 so as to regulate the hydraulic pressure in the power steering hydraulic circuit system. In rear transaxle housing 1H, the recovery fluid flowing in pipe 82 joins the excessive pressure fluid released from relief valve 50 so as to be charged to HST circuit HC1.

Referring to arrangement of power steering hydraulic pressure fluid pipes 81 and 82, as shown in FIG. 1, ports 75 and 76 are juxtaposed behind ports 1a and 1b on the right side surface of rear transaxle housing 1H. Pipes 81 and 82 are extended from respective ports 75 and 76 along pipes 23 and 26, as partly shown in FIGS. 1 and 3, i.e., in a course similar to the course of pipes 23 and 26, so that the forwardly extended main portions of pipes 75 and 76 are extended along the inside surface of left side plate 3L when viewed in plan. Pipes 75 and 76 are bent at front ends of the forwardly extended portions thereof behind valve 80, extended upward, bent again and extended rightward above belt 18 so as to be connected to ports 85 and 86 of valve 80.

In this way, the portions of pipes 81 and 82 from the rear ends thereof connected to ports 75 and 76 to the front ends of the forwardly extended portions thereof are disposed along pipes 23 and 26 prevented from interfering with the traveling power transmission system, the mower-driving power transmission system and mower unit 20. Further, all the fore-and-aft extended main portions of pipes 23 and 26 and pipes 81 and 82 are compactly collected along left side plate 3L.

As shown in FIG. 3, power steering cylinder 79 is fixed onto frame 3 so as to be disposed along the outside surface of left side plate 3L. Piston rod 90 of power steering cylinder 79 is pivotally connected at the front end thereof to a bracket 48a extended from the top of left front wheel support unit 48L, so as to be prevented from interfering with cam mechanism CM disposed rightward on rear transaxle 2 and connected to right front wheel support unit 48R. Piston rod 90 is telescoped according to operating steering wheel 12, so as to leftwardly or rightwardly turn left and right front wheels 9 together with left and right front wheel support units 48L and 48R.

Clamping stays 60 and 61 for clamping pipes 23 and 26 will be described with reference to FIGS. 4(a) and 4(b). Referring to FIG. 4(a), clamping stay 60 comprises a main stay member 66 and a keep plate 67. Main stay member 66 includes a tab portion fastened to mount boss 70 of rear transaxle housing 1H through a bolt 71. Main stay member 66 also includes a pipe support portion for supporting rear rigid pipes 23b and 26b of pipes 23 and 26. The pipe support portion is formed with a pair of sectionally semicircular grooves into which rear rigid pipes 23b and 26b are fitted. Keep plate portion 67 is fastened to the pipe support portion of main stay member 66 through bolts 72, whereby rear rigid pipes 23b and 26b are clamped between main stay member 66 and keep plate portion 67. Incidentally, a shock absorbing rubber 66a is fitted between stay member 66 and keep plate portion 67 so as to be wound around pipe portions 23b and 26b, thereby preventing noise from a gap between rigid pipes 23b and 26b and clamping stay 60.

In this way, clamping stay 60 is fixed on rear transaxle housing 1H so as to clamp the laterally extended portions of rigid pipes 23b and 26b. In the embodiment shown in FIGS. 1 and 4(a), clamping stay 60 is disposed so as to vertically align the laterally extended portions of rigid pipes 23b and 26b. Alternatively, clamping stay 60 may be disposed onto rear transaxle housing 1H so as to horizontally align the laterally extended portions of rigid pipes 23b and 26b.

Referring to FIG. 4(b), clamping stay 61 comprises a main stay member 68 and a keep plate 69. Main stay member 68 includes a tab portion fastened to frame 3, more specifically, side plate 3L or 3R (in this embodiment, left side plate 3L), through a bolt 73. Main stay member 68 also includes a pipe support portion for supporting rear rigid pipes 23b and 26b of pipes 23 and 26. The pipe support portion is formed with a pair of sectionally semicircular grooves into which rear rigid pipes 23b and 26b are fitted. Keep plate portion 69 is fastened to the pipe support portion of main stay member 68 through bolts 74, whereby rear rigid pipes 23b and 26b are clamped between main stay member 68 and keep plate portion 69. Incidentally, a shock absorbing rubber 68a is fitted between stay member 68 and keep plate portion 69 so as to be wound around pipe portions 23b and 26b, thereby preventing noise from a gap between rigid pipes 23b and 26b and clamping stay 61.

In this way, clamping stay 61 is fixed onto left side plate rear transaxle housing 1H so as to clamp the fore-and-aft extended portions of rigid pipes 23b and 26b. In the embodiment shown in FIGS. 1 and 4(b), clamping stay 61 is disposed so as to vertically align the fore-and-aft extended portions of rigid pipes 23b and 26b. Alternatively, clamping stay 61 may be disposed onto rear transaxle housing 1H so as to horizontally align the fore-and-aft extended portions of rigid pipes 23b and 26b.

The above-mentioned arrangement of pipes 23 and 26 is associated with the rightwardly outward opened ports 1a and 1b on the right side of rear transaxle 1. Alternatively, referring to FIG. 5, ports 1a and 1b are opened leftwardly outward on the left side of rear transaxle 1, i.e., on the same lateral side of vehicle 100 with ports 2a and 2b of front transaxle 2. In this regard, rear rigid pipes 23b and 26b are bent upwardly forward from rear ends thereof connected to ports 1a and 1b of rear transaxle 1, and bent again so as to be extended horizontally forward along left side plate 3L (along the bottom edge of left side plate 3L when viewed in side, and along the inside surface of left side plate 3L when viewed in plan). The arrangement of pipes 23 and 26 between swivel joints 54 and ports 2a and 2b is similar to the arrangement when ports 1a and 1b are disposed on the right side of rear transaxle 1.

Figure 6:
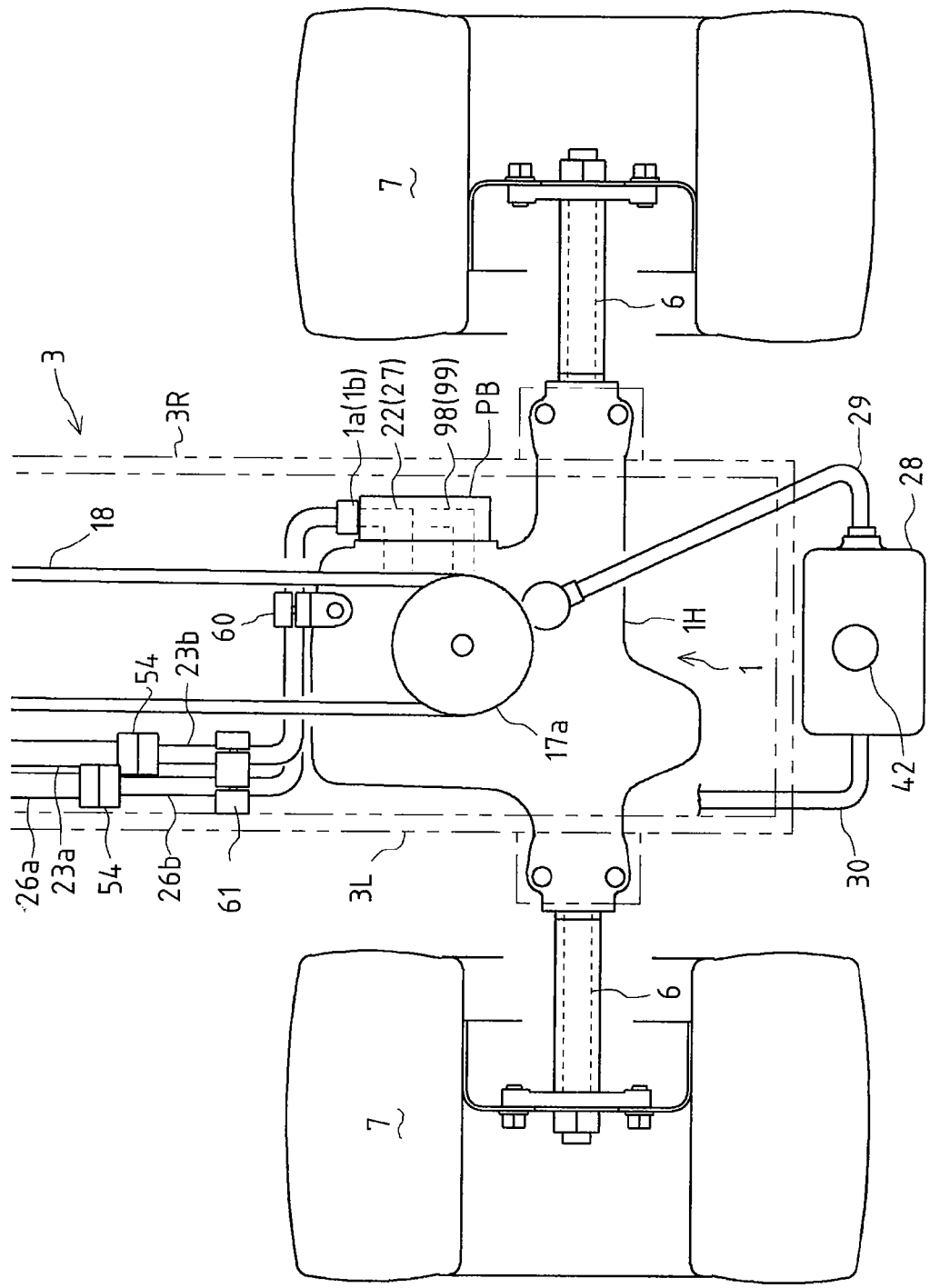
FIG. 6 is a sectional plan view of a rear transaxle provided on a right side surface thereof with hydraulic fluid supply-and-delivery ports facing forward.

Further alternatively, referring to FIG. 6, a port block PB is fixed onto the right side surface of rear transaxle housing 1H. Port block PB is bored with L-like shaped end portions of passages 22, 27, 98 and 99 (see FIG. 2). Ports 1a and 1b at front ends of respective passages 22 and 27, and ports 75 and 76 at front ends of respective passages 98 and 99 are forwardly outward opened on the front end surface of port block PB. The space within port block PB required for rightward-to-forward course change of passages 22, 27, 98 and 99 is smaller than the space required for rightward-to-forward course change of external pipes 23 (23b), 26 (26b), 81 and 82, i.e., for curving or bending the external pipes. Therefore, port block PB provided with ports 1a, 1b, 75 and 76 on the front end surface thereof is available for arranging pipes 23 and 26 (and 81 and 82) inside frame 3 in vehicle 100 having a very narrow gap between rear transaxle housing 1H and right side plate 3R of frame 3, because, if pipes 23 and 26 are connected to ports 1a and 1b without port block PB in the condition that the gap between rear transaxle housing 1H and right side plate 3R is very narrow, pipes 23 and 26 extended rightward from ports 1a and 1b cannot be curved forward within the very narrow gap between rear transaxle housing 1H and right side plate 3R (i.e., pipes 23b and 26b cannot help projecting rightward from right side plate 3R of frame 3 to be curved forward).

Figure 5:
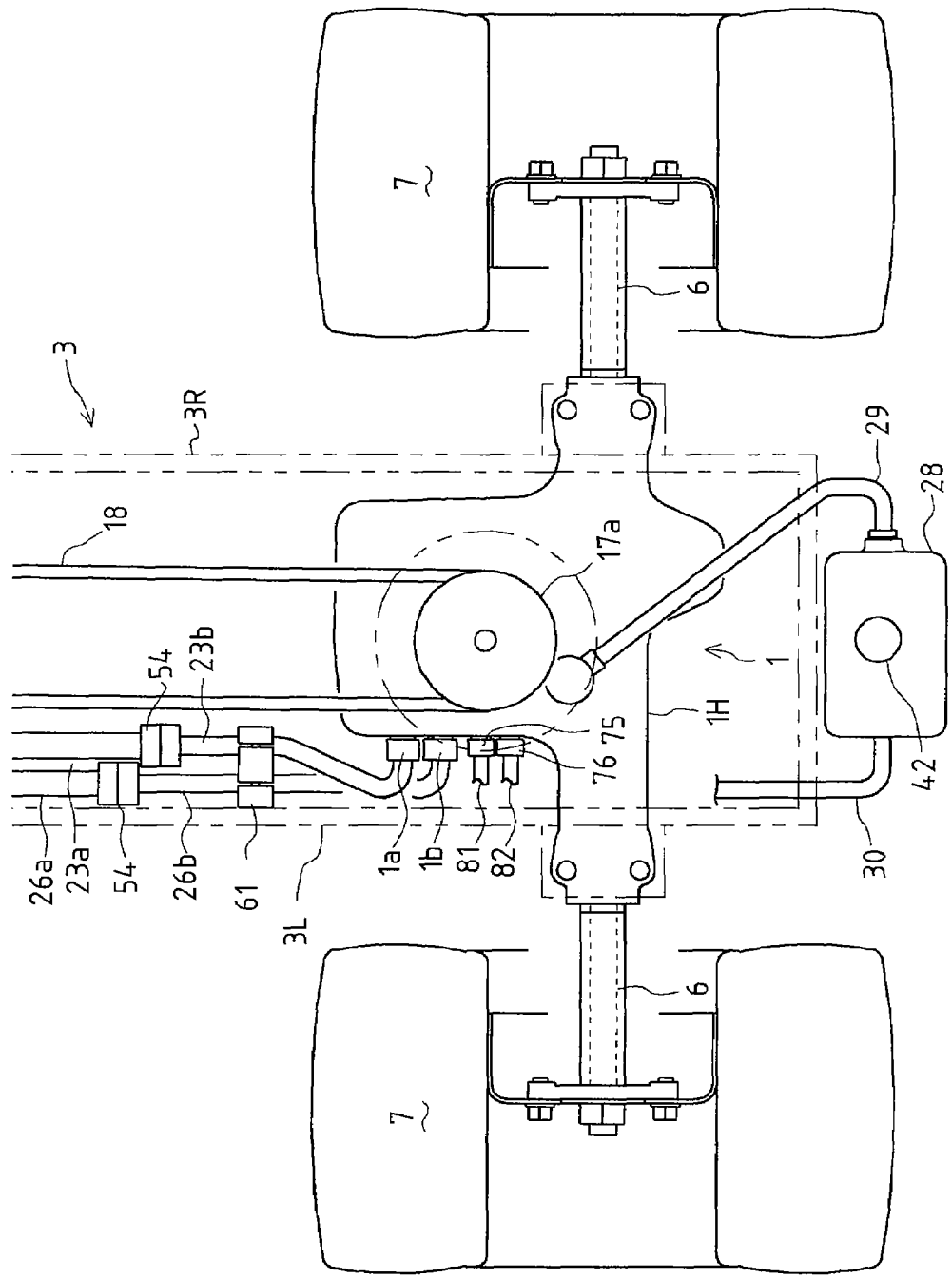
FIG. 5 is a sectional plan view of a rear transaxle provided on a left side surface thereof with hydraulic fluid supply-and-delivery ports.
Figure 7:
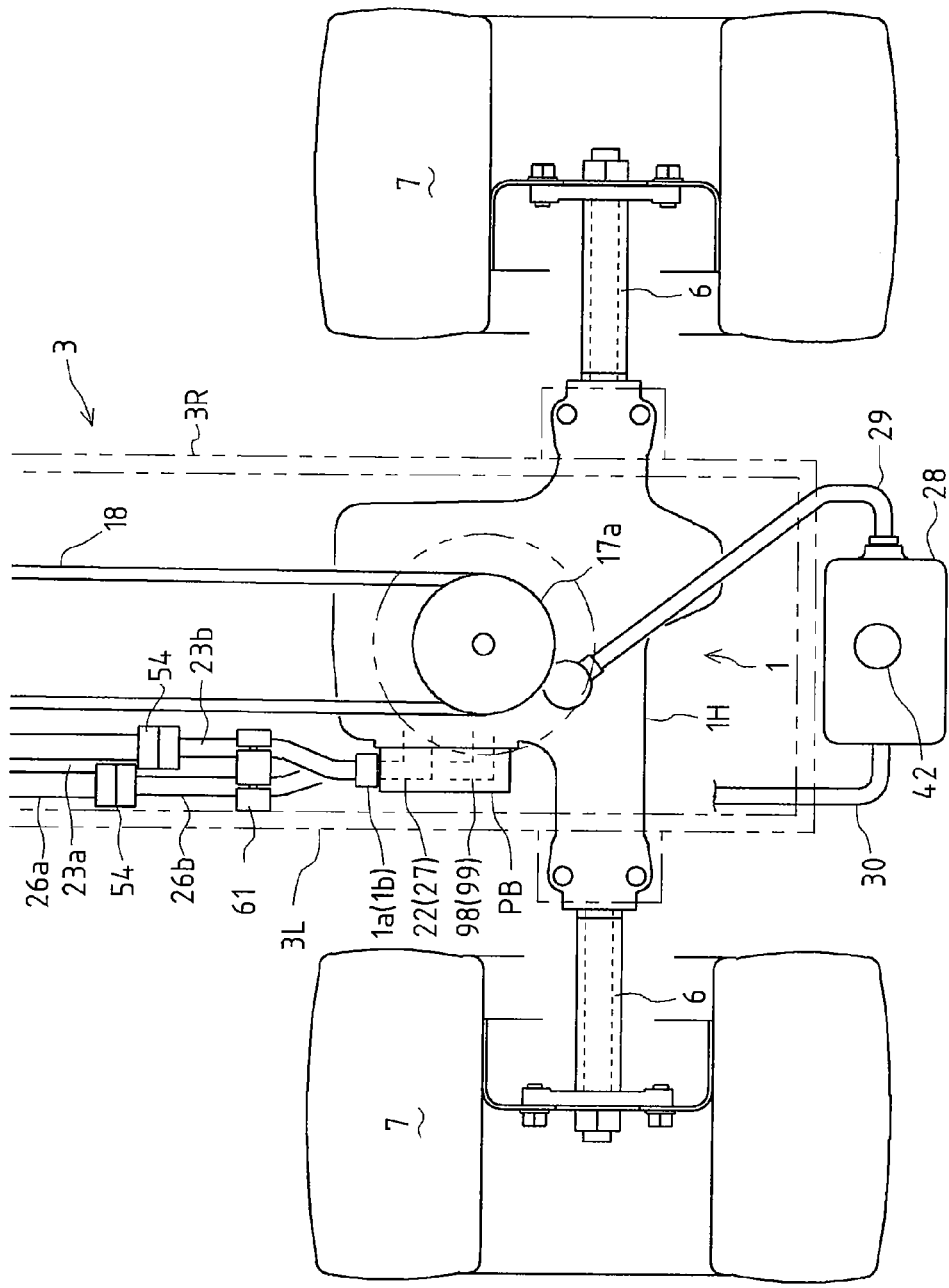
FIG. 7 is a sectional plan view of a rear transaxle provided on a left side surface thereof with hydraulic fluid supply-and-delivery ports facing forward.

Alternatively, referring to FIG. 7, port block PB bored with L-like shaped end portions of passages 22, 27, 98 and 99 is fixed onto the left side surface of rear transaxle housing 1H, so as to provide forwardly outward opened ports 1a, 1b, 75 and 76 at the left side of rear transaxle 1. Incidentally, the structure in the front portion of vehicle 100 which is omitted in each of FIGS. 5 to 7 is the same as that shown in FIGS. 1 and 3.

Arrangement of reservoir tank 28 in vehicle 100 will be described. In vehicle 100 shown in FIGS. 1 and 3 (also in the cases of FIGS. 5, 6 and 7), reservoir tank 28 is disposed just behind the rear end surface of frame 3, and disposed in rear cover 15, so that the fluid level in reservoir tank 28 is higher than the fluid levels of the respective fluid sumps in front and rear transaxle housings 1H and 2H. Reservoir tank 28 is fluidly connected to front and rear transaxles 1 and 2 through respective drain pipes 29 and 30 so as to absorb excessive fluid from front and rear transaxle housings 1H and 2H.

The arrangement of reservoir tank 28 behind the rear end surface of frame 3 is available for works of attachment, detachment and maintenance of reservoir tank 28, because reservoir tank 28 disposed at this position comes behind tires of rear wheels 7, and does not require rear wheels 7 to be detached for the works. During traveling of vehicle 100, the defect of reservoir tank 28 yielded to stones or mud spattered or knocked by the tires of rear wheel 7 becomes fewer.

Reservoir tank 28 is disposed upright (vertically long) so as to heighten the fluid level therein. Even if vehicle 100 travels on a slope, the high fluid level in reservoir tank 28 prevents the fluid sump in front and rear transaxle housings 1H and 2H from being contaminated with air bubbles, thereby preventing fluid circulating among hydraulic pump P and hydraulic motors M1, M2 and M3 from being contaminated with air bubbles. The vertical length of upright reservoir tank 28 is sufficient to prevent the fluid level surface from touching the bottom surface of reservoir tank 28 regardless of the swing of front transaxle 2 around center pivot 5.

Another advantage of reservoir tank 28 disposed behind the rear end surface of frame 3 is to provide a sufficient length of drainpipe 30 between front transaxle 2 and reservoir tank 28 so as to correspond to the swing of front transaxle 2 around center pivot 5.

Rear cover 15 is provided at a top portion thereof behind driver's seat 16 with a hole, through which upright cylindrical fluid-supply portion 28a of reservoir tank 28 projects upwardly outward. Breather 42, serving as the fluid-supply opening of reservoir tank 28, is disposed on the top of fluid-supply portion 28a above the top of rear cover 15, thereby facilitating fuel-supply work by a driver on seat 16. Further, due to such a high position of breather 42 (i.e., the fluid-supply opening of reservoir tank 28), fuel is prevented from overflowing from breather 42 even when vehicle 100 travels on a slope.

Figure 9:
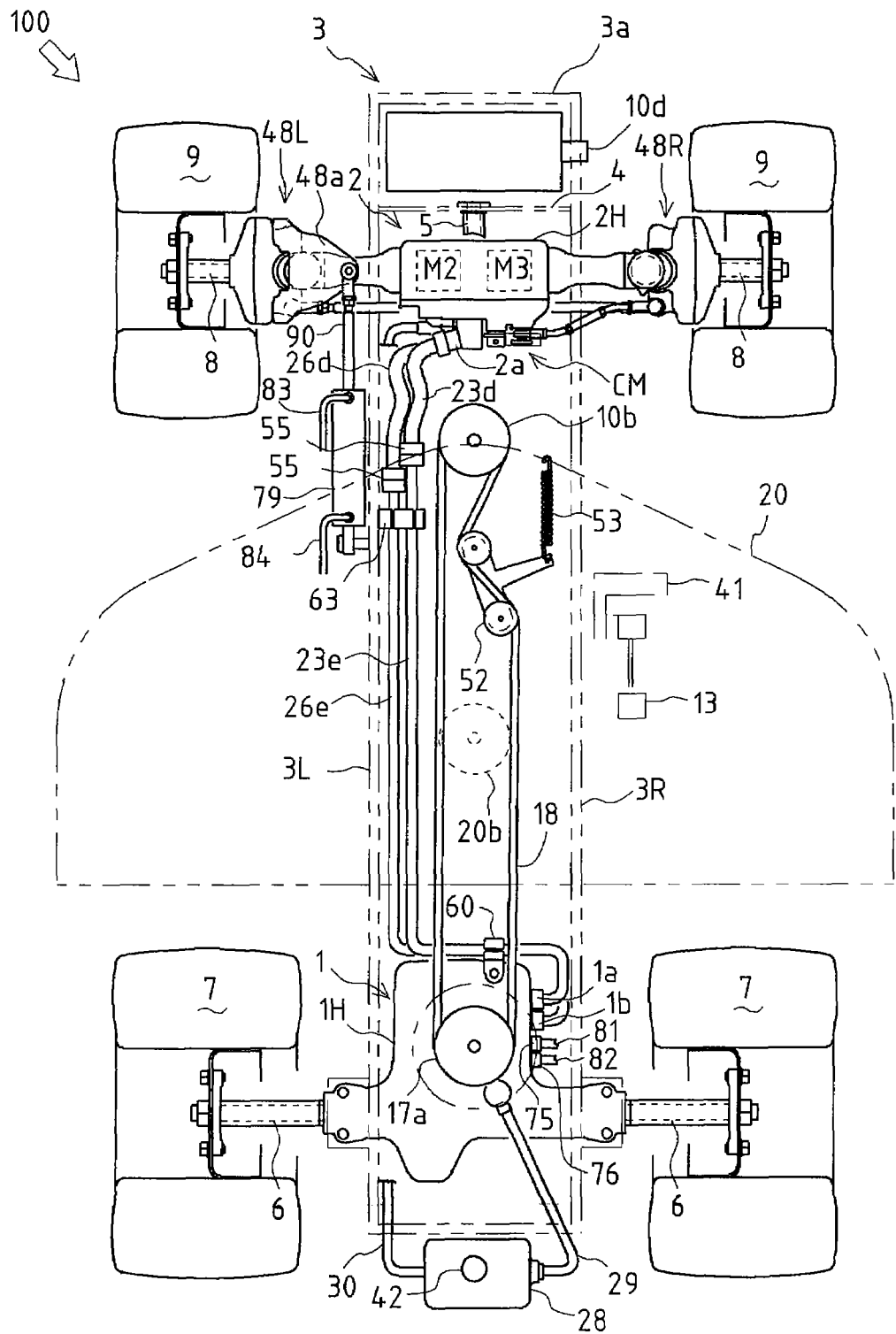
FIG. 9 is a sectional plan view of the hydraulic four-wheel drive working vehicle according to the first embodiment, provided with another arrangement of hydraulic pressure fluid pipes.

Alternatively, referring to FIG. 9, pipes 23 and 26 comprise flexible hoses (such as pressure rubber hoses) 23d and 26d and rigid pipes (such as metal or steel pipes) 23e and 26e. Flexible hoses 23d and 26d are connected to respective ports 2a and 2b of front transaxle 2. Rigid pipes 23e and 26e include the fore-and-aft main portion of pipes 23 and 26 and are connected to ports 1a and 1b of rear transaxle 1.

Rigid pipes 23e and 26e include the same arrangement of rigid pipes 23b and 26b. In this regard, rigid pipes 23e and 26e connected to ports 1a and 1b includes laterally extended portions, which are disposed just in front of rear transaxle housing 1H and clamped by clamping stay 60 fixed on mount boss 70 of rear transaxle housing 1H. The fore-and-aft extended main portions of rigid pipes 23e and 26e are extended along left side plate 3L (along the bottom edge of left side plate 3L when viewed in side, and along the inside surface of left side plate 3L when viewed in plan), so as to replace the fore-and-aft extended front portions of rigid pipes 23b and 26b and flexible hoses 23a and 26a. Rigid pipes 23e and 26e are connected at front ends thereof to respective flexible hoses 26d and 26e through respective swivel joints 55. The fore-and-aft extended main portions of rigid pipes 23e and 26e are clamped by a clamping stay 63 fixed onto left side plate 3L just behind swivel joints 55.

Vehicle 100 shown in FIG. 9 may be provided with any of other arrangements of ports 1a and 1b on rear transaxle 1 shown in FIGS. 5, 6 and 7. In this case, rigid pipes 23e and 26e are rearranged to suit the arrangement of ports 1a and 1b.

Flexible hoses 23d and 26d are extended forward from swivel joints 55 and bent rightwardly downward just behind of rear transaxle 2 so as to be connected to ports 2a and 2b on the rear end of rear transaxle housing 2H.

The arrangement of pipes 23 and 26 shown in FIG. 9 has the same advantages with the arrangement of pipes 23 and 26 shown in FIGS. 1 and 3, and additionally, has an advantage in reduction of flexible pipe portions, which are diametrically smaller than rigid pipe portions and have large internal pressure resistance. Namely, the reduction of flexible pipe portions leads to reduction of internal pressure resistance in pipes 23 and 26.

Referring to FIG. 1, a pair of left and right mower hangers 91 are disposed in front of front transaxle 2. Mower hangers 91 are extended downward from bottoms of respective side plates 3L and 3R just in front of front transaxle 2, and bent to be extended rearwardly downward under front transaxle 2. Left and right link rods 91a are pivotally connected at front ends thereof onto rear ends of respective mower hangers 91, and extended rearwardly downward so as to be pivotally connected at rear ends thereof to respective front hooks of mower unit 20. Therefore, mower unit 20 can be tilted in the fore-and-aft direction relative to vehicle 100, so as to fit the ground during traveling of vehicle 100.

To ensure a proper performance of link rods 91a serving as a parallel linkage, location of mower hangers 91 is important. Conventional mower hangers disposed behind front transaxle 2 are troublesome to be attached or detached to and from frame 3 or to be reformed. In the present vehicle 100, mower hangers 91 disposed in front of front transaxle 2 can be easily and efficiently attached to frame 3 while adjusting its vertical and fore-and-aft position. Further, due to the arrangement of mower hangers 91 in front of front transaxle 2, front transaxle 2 is shifted rearward from its conventional position so as to shorten the gap between rear wheel axles 6 and front wheel axles 8, thereby reducing the turning radius of vehicle 100.

Incidentally, engine 10 is provided with a muffler 10d disposed on a front end portion of frame 3 in front of front transaxle 2. Frame 3 is integrally formed with a muffler cover 3a covering a front surface of muffler 10d. Muffler cover 3a serves as a part of a bumper of vehicle 100.

Figure 16:
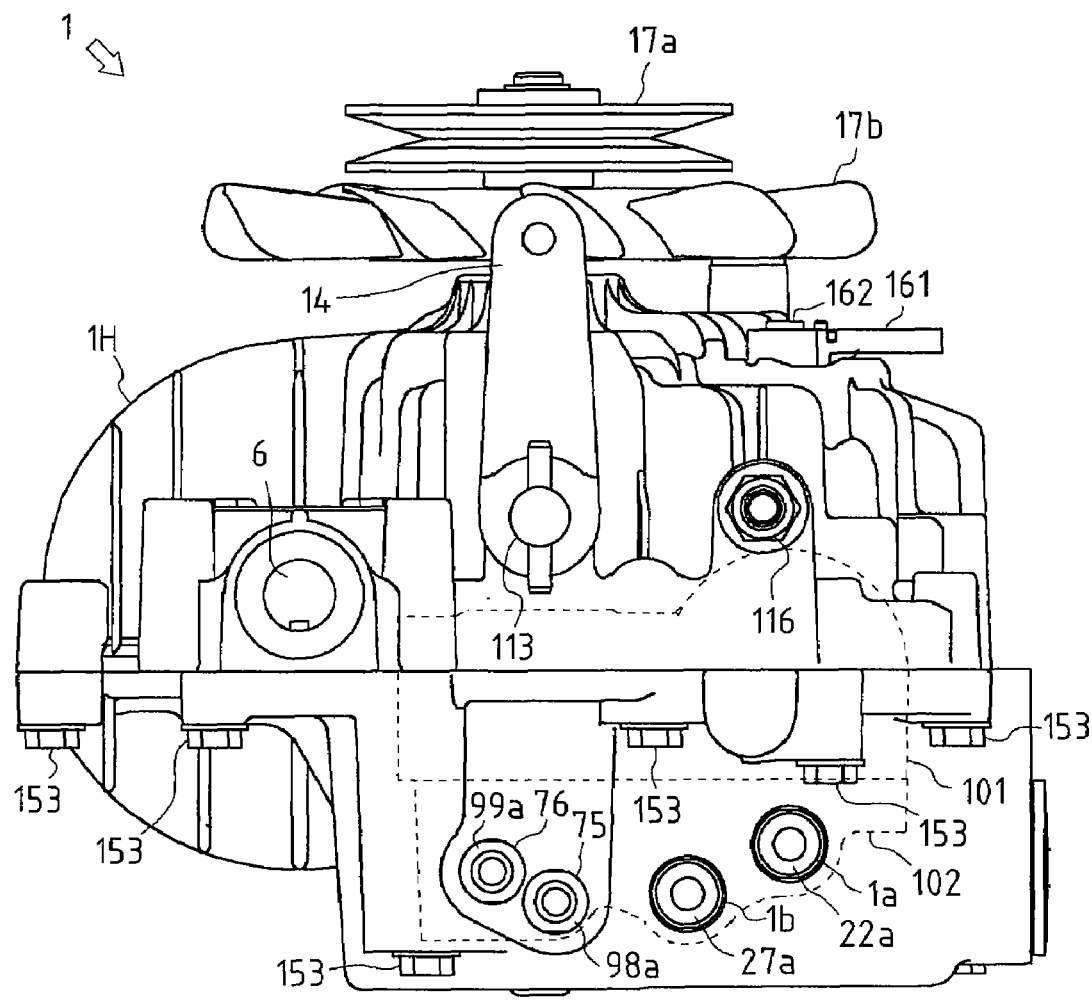
FIG. 16 is a right side view of a rear transaxle for the vehicle according to the first embodiment.

Structure of rear transaxle 1 will be described with reference to FIGS. 16 to 24. As shown in FIG. 16, main ports 1a and 1b and auxiliary ports 75 and 76 are juxtaposed on the same (right) side surface of housing 1H, thereby compactly collecting axle-driving hydraulic pressure fluid pipes 23 and 26 and power steering hydraulic pressure fluid pipes 81 and 82 so as to be connected to these ports.

As mentioned above, in rear transaxle housing 1H are disposed hydraulic pump P and charge pump 33, which are driven by power from engine 10 through the traveling power transmission system disposed out of rear transaxle 1, hydraulic motor M1 fluidly connected to hydraulic pump P, and axles 6 driven by hydraulic motor M1. Also, in rear transaxle housing 1H are disposed passage 21 interposed between hydraulic pump P and port 1a, passage 27 interposed between hydraulic motor M1 and port 1b, passage 98 interposed between charge pump 33 and port 75, and passage 99 interposed (through either of charge check valves 35) between the suction (lower-pressurized) side of hydraulic pump P (i.e., either of passages 21 and 27) and port 76 (see FIG. 2).

Further, in rear transaxle housing 1H is disposed a center section 101 interposed between hydraulic pump P and hydraulic motor M1. Center section 101 is formed with a pair of pump kidney ports 57a and 57b opened to hydraulic pump P, and with a pair of motor kidney ports 56a and 56b opened to hydraulic motor M1. Passage 21 fluidly connecting hydraulic pump P and hydraulic motor M1 to each other is bored within center section 101 so as to be interposed between kidney ports 57a and 56a. A part of passage 22 interposed between hydraulic pump P and port 1a is bored within center section 101 so as to be connected to kidney port 57b. A part of passage 27 interposed between hydraulic motor M1 and port 1b is bored within center section 101 so as to be connected to kidney port 56b.

In rear transaxle housing 1H is also disposed a charge pump casing 102 joined to center section 101. Charge pump casing 102 incorporates charge pump 33 and is formed therein with a part of passage 98 to be connected to port 75, and a part of passage 99 to be connected to port 76. Charge pump casing 102 is also formed therein with a part of passage 22 interposed between hydraulic pump P and port 1a, and a part of passage 27 interposed between hydraulic motor M1 and port 1b. The parts of passages 22 and 27 within charge pump casing 102 continue to the respective parts of passages 22 and 27 within center section 101 so as to be connected to respective kidney ports 57b and 56b.

Figure 17:
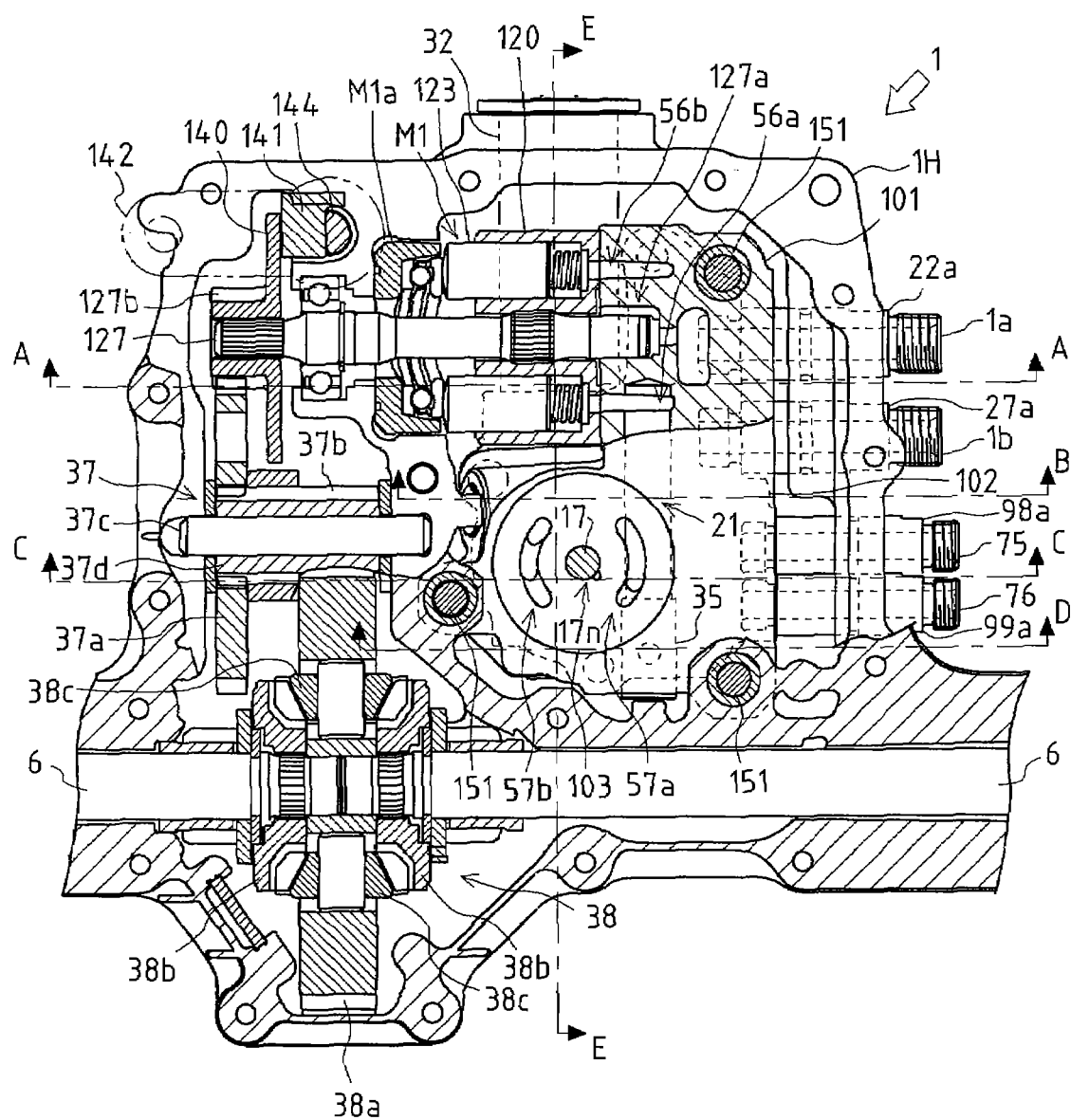
FIG. 17 is a left side view of the rear transaxle according to the first embodiment.
Figure 23:
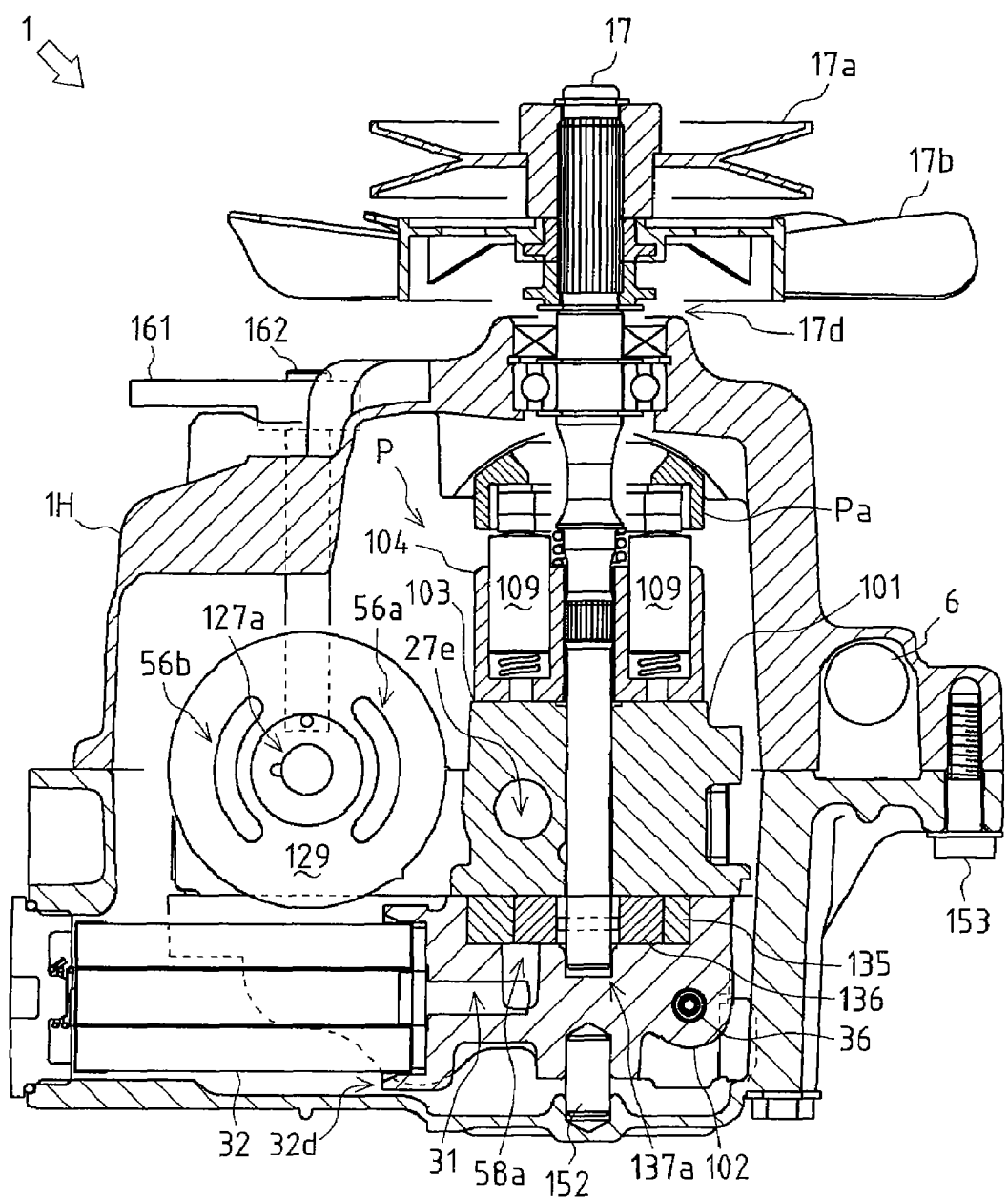
FIG. 23 is a cross sectional view of the rear transaxle taken along an E-E line of FIG. 17.

Referring to FIG. 17, the inner space of rear transaxle housing 1H is partitioned by a partition wall between a hydraulic circuit chamber and a transmission gear chamber. Hydraulic pump P and motor M1 are disposed in the hydraulic circuit chamber, and deceleration gear train 37, differential gear unit 38 and axles 6 are disposed in the transmission gear chamber. As shown in FIGS. 16 and 23, rear transaxle housing 1H is constituted by upper and lower halves joined to each other through bolts 153.

Figure 21:
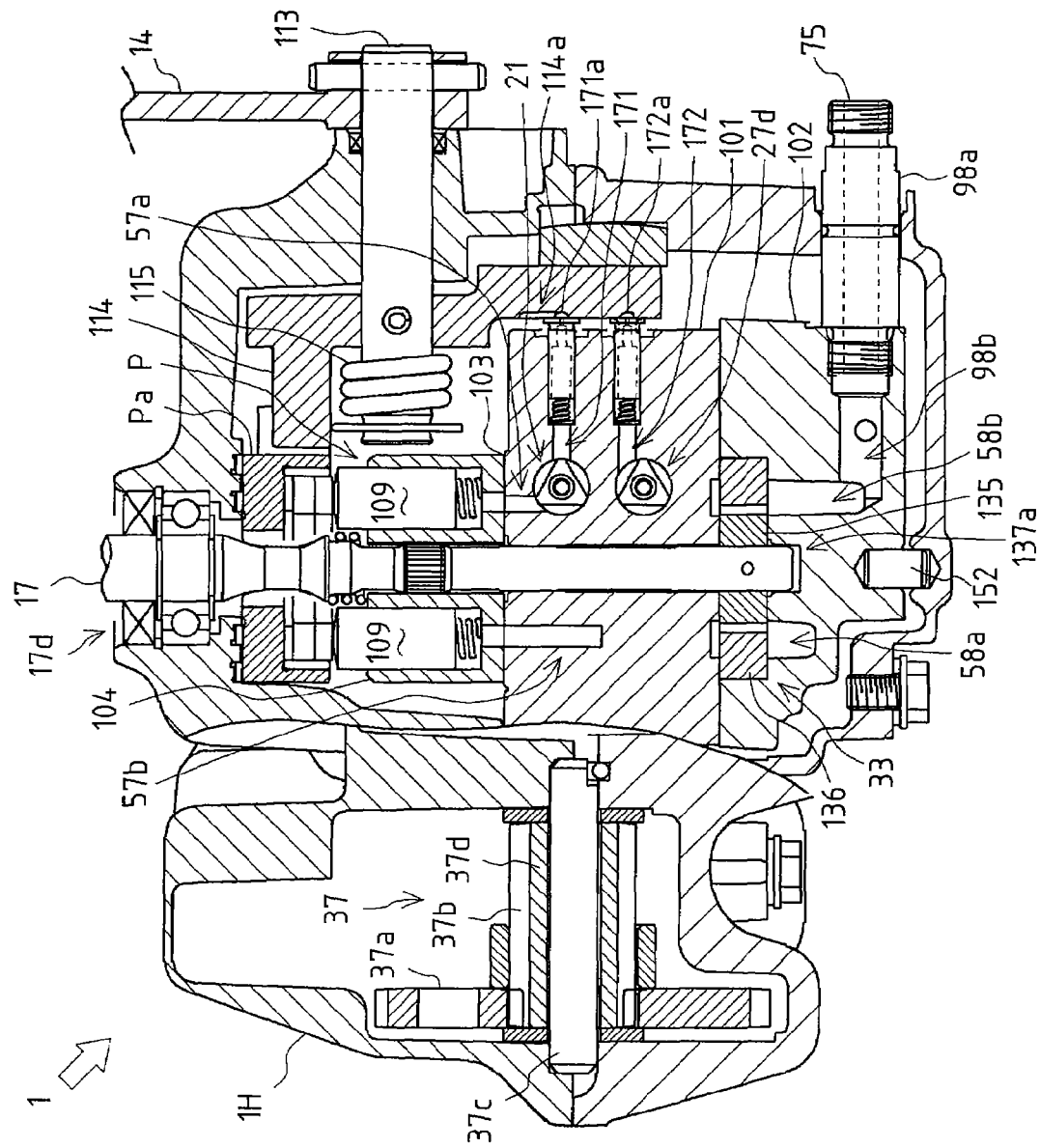
FIG. 21 is a cross sectional view of the rear transaxle taken along a C-C line of FIG. 17.

Referring to FIG. 21, as mentioned above, the upper portion of input shaft 17 projecting vertically upward from rear transaxle housing 1H is fixedly provided thereon with input pulley 17a so as to be drivingly connected to engine 10 through belt 18, and is fixedly provided thereon with cooling fan 17b for cooling rear transaxle housing 1H under pulley 17a. In rear transaxle housing 1H, vertical input pulley 17 serves as the rotary axial shaft of hydraulic pump P.

Variable displacement hydraulic pump P, having input shaft 17 serving as the vertical rotary axis thereof, is vertically mounted onto a rear top surface of center section 101 at which kidney ports 57a and 57b are opened. Fixed displacement hydraulic motor M1, having a laterally (leftward) horizontal motor shaft 127 serving as the rotary axis thereof, is mounted onto a front left side surface of center section 101 at which kidney ports 56a and 56b are opened, so as to be fluidly connected to hydraulic pump P. Motor shaft 127 is drivingly connected to deceleration gear train 37 so as to transmit the output force of hydraulic motor M1 to axles 6 through deceleration gear train 37 and differential gear unit 38.

As shown in FIG. 23, vertical input shaft 17 penetrates center section 101 and is inserted into charge pump casing 102 attached to the bottom surface of center section 101 so as to serve as the drive shaft of charge pump 33 in charge pump casing 102. Charge pump 33 sucks fluid from the fluid sump in rear transaxle housing 1H so as to supply fluid to the axle-driving hydraulic circuit, and to the auxiliary device (power steering) driving hydraulic circuit through ports 75 and 76.

As shown in FIGS. 16 and 21, speed control lever 14 operatively connected to speed control pedal 13 is pivoted on rear transaxle housing 1H so as to control the tilt angle and direction of swash plate Pa of hydraulic pump P.

The structure of the hydraulic circuit system in rear transaxle 1 will be more detailed. As shown in FIGS. 17 and 24(b), center section 101 is fastened to an inside wall of rear transaxle housing 1H through bolts 151. As shown in FIG. 17, the circular rear top surface of center section 101, onto which hydraulic pump P is mounted, serves as a pump contact surface 103. In pump contact surface 103, right pump kidney port 57a and left pump kidney port 57b are laterally symmetrically opened upward, and a vertical shaft hole 17n, into which input shaft 17 is rotatably inserted, is opened upward between right and left pump kidney ports 57a and 57b. Vertical shaft hole 17n is passed through center section 101 and also opened downward at the bottom surface of center section 101.

As shown in FIG. 21, a cylinder block 104 of hydraulic pump P is slidably rotatably fitted onto pump contact surface 103 so as to open cylinder holes therein to pump kidney ports 57a and 57b, and is not relatively rotatably fitted on input shaft 17 passed through shaft hole 17n (in a spline-engaging manner). Pistons 109 are reciprocally slidably fitted in the respective cylinder holes of cylinder block 104, and project at heads thereof outward from cylinder block 104 so as to abut against movable swash plate Pa. Input shaft 17 projects upward from cylinder block 104, freely penetrates movable swash plate Pa, and projects upward from the top wall of rear transaxle housing 1H so as to be fixedly provided thereon with pulley 17a and cooling fan 17b, as mentioned above. Input shaft 17 inserted in shaft hole 17n also projects downward from center section 101 into charge pump casing 102 so as to serve as the drive shaft of charge pump 33.

Figure 18:
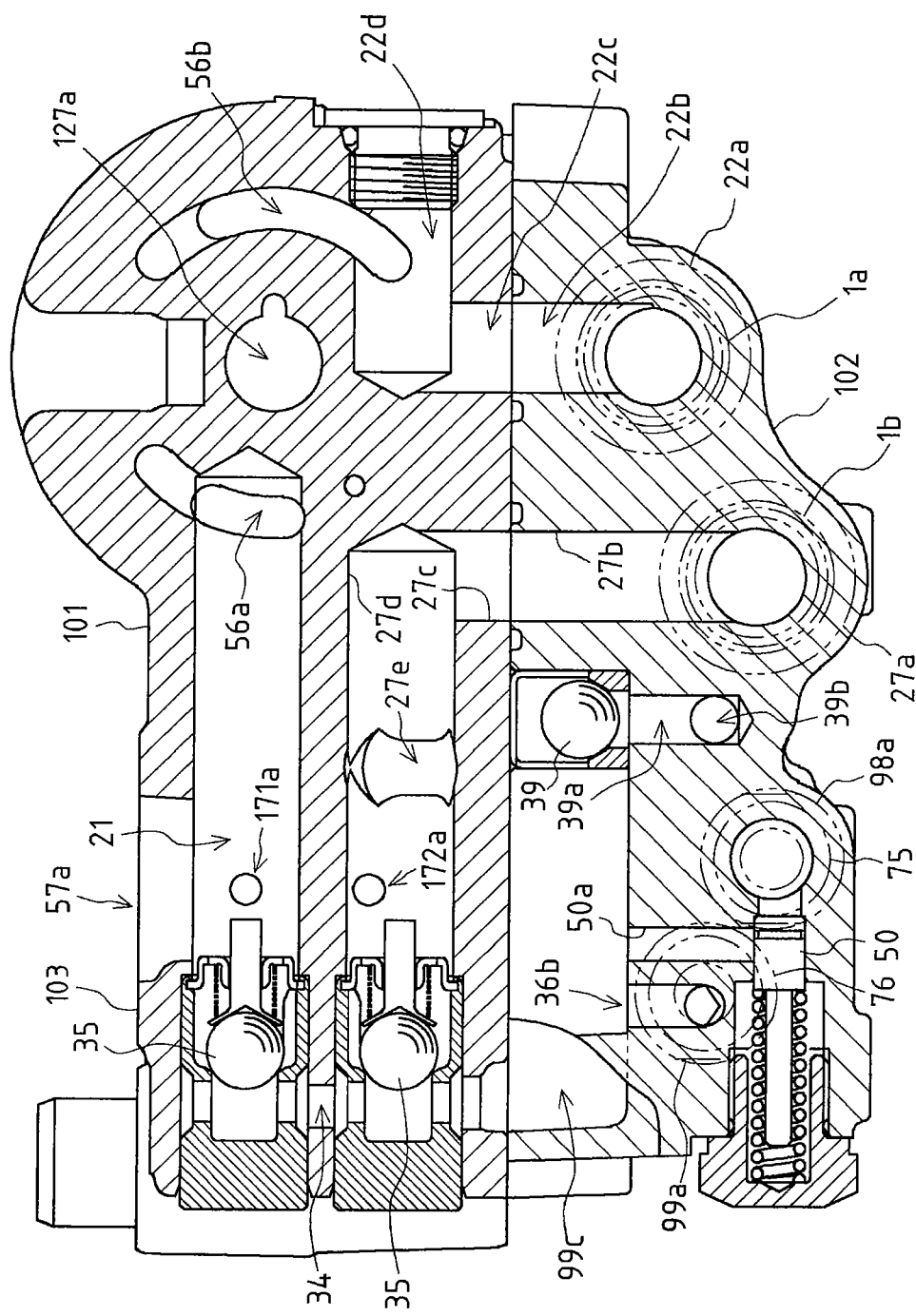
FIG. 18 is a sectional right side view of the rear transaxle according to the first embodiment, showing a center section and a charge pump casing in a transaxle housing.
Figure 20:
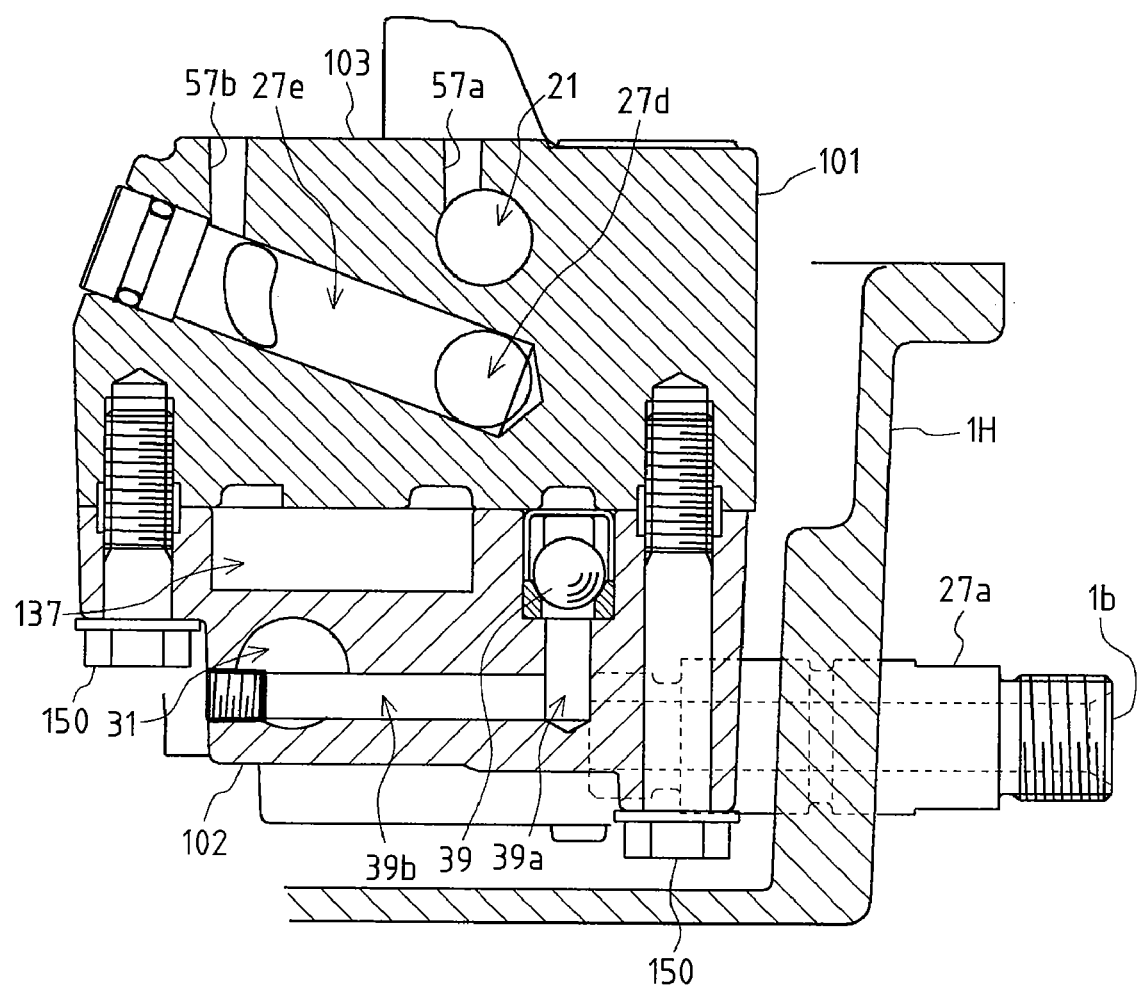
FIG. 20 is a cross sectional view of the rear transaxle taken along a B-B line of FIG. 17.

Referring to FIGS. 17, 18 and 20, a fore-and-aft horizontal passage hole 21, serving as passage 21 interposed between hydraulic pump P and motor M1, is bored in center section 101, so as to be connected at a rear upper end portion to right pump kidney ports 57a, and at a front upper end portion thereof to rear motor kidney port 56a. The part of passage 27 bored in center section 101 comprises fluid passage holes 27c, 27d and 27e, and the part of passage 27 bored in charge pump casing 102 is a fluid passage hole 27b. Fluid passage hole 27e is extended rightwardly downward from left pump kidney port 27b to a fore-and-aft intermediate portion of fluid passage hole 27d. Fluid passage hole 27d is fore-and-aft horizontally extended under fluid passage hole 21 in parallel, and connected at a front end portion thereof to vertical fluid passage hole 27c. Fluid passage hole 27c is opened downward at the bottom surface of center section 101 so as to be directly coaxially connected to vertical fluid passage hole 27b bored in charge pump casing 102.

As shown in FIG. 23, the circular front left side surface of center section 101, onto which hydraulic motor M1 is mounted, serves as a motor contact surface 129. In motor contact surface 129, rear motor kidney port 56a and front motor kidney port 56b are symmetrically opened leftward, and a lateral horizontal shaft hole 127a, into which motor shaft 127 is rotatably inserted, is opened leftward between rear and front motor kidney ports 56a and 56b.

As shown in FIG. 17, a cylinder block 120 of hydraulic motor M1 is slidably rotatably fitted onto motor contact surface 129 so as to open cylinder holes therein to motor kidney ports 56a and 56b, and is not relatively rotatably fitted on motor shaft 127 inserted in shaft hole 127a (in a spline-engaging manner). Pistons 123 are reciprocally slidably fitted in the respective cylinder holes of cylinder block 120, and project at heads thereof outward from cylinder block 120 so as to abut against a fixed swash plate M1a.

As shown in FIG. 17, motor shaft 127, rotatably fitted at a right end portion thereof in shaft hole 127a of center section 101, is journalled through a bearing 128 by the partition wall between the hydraulic circuit chamber and the transmission gear chamber, and extended at a left end portion thereof into the transmission gear chamber so as to be provided thereon with a gear 127b and a brake disc 140.

Referring to FIGS. 17 and 18, rear motor kidney port 56a is connected to right pump kidney port 57a through horizontal fluid passage hole (passage) 21, as mentioned above. Referring to FIGS. 18 and 24(b), the part of passage 22 bored in center section 101 comprises fluid passage holes 22c and 22d, and the part of passage 22 bored in charge pump casing 102 is a fluid passage hole 22b. Fluid passage hole 22d is fore-and-aft horizontally extended in a front portion of center section 101, and connected at an upper portion thereof to front motor kidney port 56b. Vertical fluid passage hole 22c is extended from fluid passage hole 22d, and opened downward at the bottom surface of center section 101 just in front of fluid passage hole 27c, so as to be directly coaxially to vertical fluid passage hole 22b bored in charge pump casing 102.

Referring to FIG. 18, center section 101 is bored in a rear portion thereof with a vertical fluid passage hole serving as passage 34, and provided therein with upper and lower charge check valves 35 interposed between fluid passage hole 34 and respective upper and lower parallel fluid passage holes 21 and 27d. Each of charge check valves 35 allows only flow from fluid from fluid passage hole (passage) 34 to corresponding fluid passage hole (passage) 21 or 27d (i.e., prevents backflow to fluid passage hole 34). Fluid passage hole 34 is opened downward at the bottom surface of center section 101, and connected an upwardly opened fluid passage hole 99c of passage 99 bored in charge pump casing 102.

Referring to FIG. 18, charge pump casing 102 is fastened to center section through bolts 150. Referring to FIGS. 20, 24(a) and 24(b), charge pump casing 102 is provided at a bottom portion with a downwardly opened vertical pin hole, which coaxially coincides with an upwardly opened vertical pin hole bored in a bottom portion of rear transaxle housing 1H. A lock pin 152 is fitted in the coinciding pin holes of charge pump casing 102 and rear transaxle housing 1H, so as to engage charge pump casing 102 to rear transaxle 1H at a determined position.

Referring to FIG. 18, as mentioned above, upwardly opened vertical fluid passage hole 22b and 27b are bored in charge pump casing 102 so as to be coaxially connected to respective vertical fluid passage holes 22c and 27c bored in center section 101. Referring to FIGS. 18, 19, 20 and 24(a), front and rear laterally horizontal joint plugs 22a and 27a are screwed into charge pump casing 102 so as to be connected to respective fluid passage holes 22b and 27b. Right end portions of joint plugs 22a and 27a project rightwardly outward from the right side surface of charge pump casing 102, and from the right side surface of rear transaxle housing 1H, so as to be provided with respective rightwardly outward opened ports 1a and 1b. In this way, passage 22 between hydraulic pump P (pump kidney port 57b) and port 1a in rear transaxle housing 1H is constituted by the series of fluid passage holes 22d, 22c, 22b and joint plug 22a, while passage 27 between hydraulic motor M1 (motor kidney port 56b) and port 1b in rear transaxle housing 1H is constituted by the series of fluid passage holes 27e, 27d, 27, 27b and joint plug 27a. Incidentally, front joint plug 22a with port 1a is higher than rear joint plug 27a with port 1b. In this regard, vertical fluid passage hole 27b is bored deeper than vertical fluid passage hole 22b.

Referring to FIG. 24(a), charge pump casing 102 is bored with a vertical circular cylindrical trochoid gear chamber 137 which is opened upward to face the bottom surface of center section 101. Referring to FIGS. 21 and 24(a), a circular (in plan view) shaft hole 137a, into which the lower portion of input shaft 17 is rotatably inserted, is extended downward from a bottom center portion of trochoid gear chamber 137. Charge pump casing 102 is bored from the bottom surface of trochoid gear chamber 137 with a vertical suction port 58a on the left side of shaft hole 137a, and with a vertical delivery port 58b on the right side of shaft hole 137a. Referring to FIG. 21, a trochoid gear consisting of an inner gear 135 and an outer gear 136 is disposed in gear chamber 137. Inner gear 135 is fixed on input shaft 17 inserted in shaft hole 137a, so as to be rotatable integrally with input shaft 17.

Referring to FIGS. 23 and 24(a), a fore-and-aft horizontal fluid passage hole serving as suction passage 31 is bored in charge pump casing 102, connected at a rear end thereof to suction port 58a, and forwardly outward opened at a recess 32d formed on the front side surface of charge pump casing 102. Horizontal fluid filter 32 is fitted at a rear end thereof into recess 32d so as to be fluidly connected to suction passage hole 31.

Referring to FIGS. 21 and 24(a), a lateral horizontal fluid passage hole 98b serving as a part of passage 98 is bored in charge pump casing 102, connected at a left end thereof to delivery port 58b, and connected at a right end thereof to a lateral horizontal joint plug 98a screwed into charge pump casing 102. A right end portion of joint plug 98a projects rightwardly outward from the right side surface of charge pump casing 102, and from the right side surface of rear transaxle housing 1H, so as to be provided with rightwardly outward opened port 75. In this way, passage 98 interposed between the delivery port of charge pump 33 and port 75 is constituted by fluid passage hole 98b and joint plug 98a.

Figure 22:
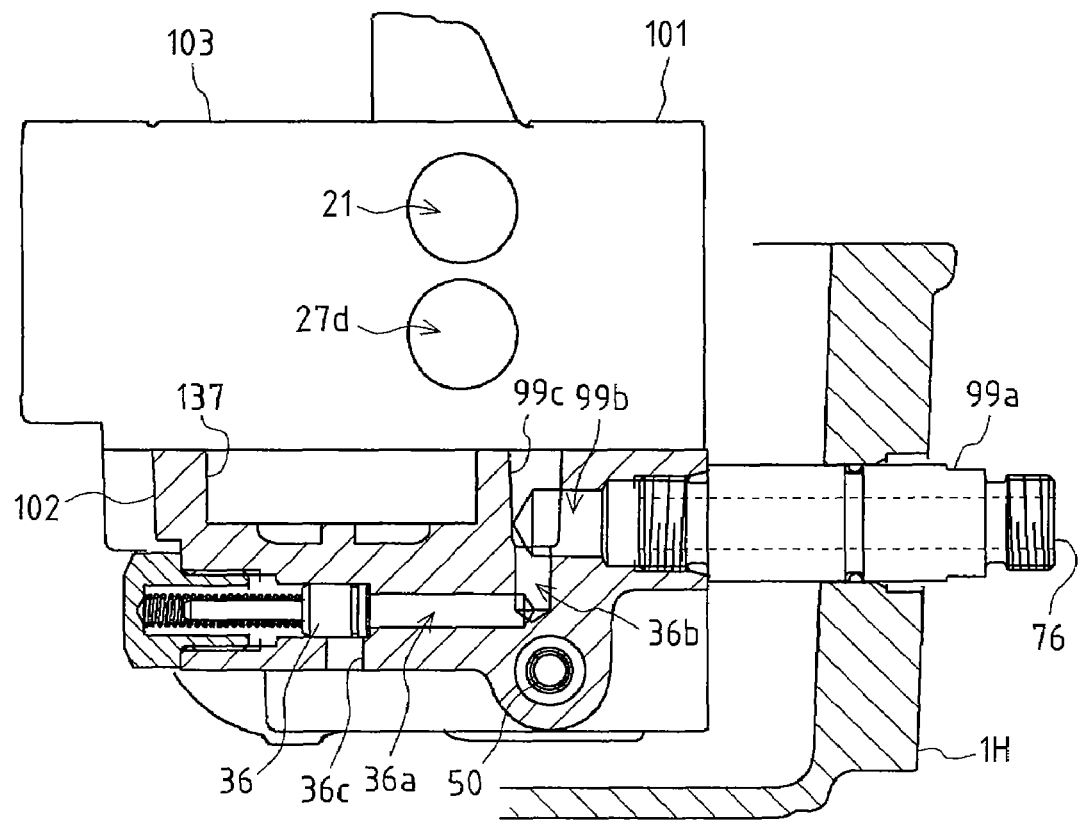
FIG. 22 is a cross sectional view of the rear transaxle taken along a D-D line of FIG. 17.

Referring to FIGS. 24(a) and 24(b), a downwardly opened groove of charge pump casing 101 and an upwardly opened groove of charge pump 102 along a right side edge of trochoid gear chamber 137 coincide with each other so as to form a substantially fore-and-aft fluid passage hole 99c. Referring to FIGS. 22 and 24(a), a lateral horizontal fluid passage hole 99b is bored in charge pump casing 102 leftwardly upward from fluid passage hole 98b, connected at a left end portion thereof to an intermediate portion of fluid passage hole 99c, and connected at a right end portion thereof to a joint plug 99a screwed into charge pump casing 102. A right end portion of joint plug 99a projects rightwardly outward from the right side surface of charge pump casing 102, and from the right side surface of rear transaxle housing 1H, so as to be provided with rightwardly outward opened port 76.

Referring to FIGS. 18 and 24(b), the bottom opening of vertical fluid passage hole 34 is connected to a rear end portion of fluid passage hole 99c. As mentioned above, in center section 101, fluid passage hole 34 is connected to fluid passage holes 21 and 27d through respective charge check valves 35. In this way, joint plug 99a and fluid passage holes 99b and 99c constitute passage 99 interposed between port 76 and either lower pressurized passage 21 or 27 connected to the suction side of hydraulic pump P through corresponding charge check valve 35.

Referring to FIGS. 18 and 24(a), check valve 39 is disposed at a front end portion of fluid passage hole 99c. A fluid passage hole 50a is extended from an intermediate portion of fluid passage hole 99c to relief valve 50. Referring to FIGS. 22 and 24(a), a fluid passage hole 36b from a relief valve 36 is connected to a bottom portion of fluid passage hole 99c joining fluid passage hole 99b. Check valve 39, relief valve 50 and relief valve 36 will be detailed later.

The above arrangement of rear transaxle 1 shown in FIGS. 16 to 24 is associated with the arrangement of vehicle 100 shown in FIG. 3 or 9, so that ports 1a, 1b, 75 and 76 are provided on the respective right outer ends of joint plugs 22a, 27a, 98a and 99a projecting rightwardly outward from charge pump casing 102 through the right side wall of rear transaxle housing 1H. Therefore, pipes 23, 26, 81 and 82 can be compactly collected to be connected to respective ports 1a, 1b, 75 and 76. Alternatively, for the arrangement of vehicle 100 shown in FIG. 5, rear transaxle 1 may be disposed so that ports 1a, 1b, 75 and 76 are provided on the respective left outer ends of joint plugs 22a, 27a, 98a and 99a projecting leftwardly outward from charge pump casing 102 through the left side wall of rear transaxle housing 1H.

As shown in FIG. 16, front axle-driving hydraulic fluid port 1a is disposed higher than rear axle-driving hydraulic fluid port 1b, and front auxiliary (power steering) device driving hydraulic fluid port 75 is disposed lower than rear auxiliary (power steering) device driving hydraulic fluid port 76. Due to the height difference, ports 1a, 1b, 75 and 76 are disposed compactly in the fore-and-aft direction, and pipes 23, 27, 81 and 82 connected these ports can be smoothly extended forwardly upward without stressing bend, thereby being further compactly collected.

A mechanism for controlling the tilt angle and direction of movable swash plate Pa of hydraulic pump P will be described. Referring to FIG. 21, a horizontal control shaft 113 rotatably penetrates a right side wall of rear transaxle housing 1H. A control arm 114 is fixed on an inner end of control shaft 113 inside housing 1H and engages at a top portion thereof with swash plate Pa. Speed control lever 14 operatively connected to speed control pedal 13 is fixed on control arm 114 outside housing 1H.

Referring to FIGS. 21 and 23, a torque spring 115 is wound around control shaft 113 inside housing 1H and includes twisted and extended opposite end portions, so as to pinch a pin (not shown) fixed on control arm 114 and a retaining pin 117 planted into the right side wall of housing 1H. Referring to FIGS. 16 and 21, retaining pin 117 projects outward from housing 1H so as to be provided thereon with a nut 116 for fastening retaining pin 117 to housing 1H. Unless speed control pedal 13 is depressed, the force of spring 115 pinching both retaining pin 117 and the pin fixed on arm 114 keeps swash plate Ma at the neutral position. When speed control pedal 13 is depressed on either front or rear side thereof, swash plate Pa is tilted integrally with the rotation of lever 14, shaft 113 and arm 114 so that spring 115 pushes the pin fixed on arm 114 at one end thereof away from retaining pin 117 retaining the other end thereof, so as to generate the neutral-returning biasing force. Due to the neutral-returning biasing force of spring 115, swash plate Pa is kept at the tilt position corresponding to the depression angle and direction of speed control pedal 13, and, if speed control pedal 13 is released from depression force, swash plate Pa and speed control pedal 13 return to the respective neutral positions.

The flow of fluid in HST circuit HC1, especially in rear transaxle 1, during forward traveling will be described. By depressing speed control pedal 13 in the direction for forward traveling, swash plate Pa of hydraulic pump P is tilted from the neutral position (where swash plate Pa is disposed perpendicular to input shaft 17, as shown in FIG. 23) to a position corresponding to the depression degree and direction of speed control pedal 13. In this state, cylinder block 104 is rotated integrally with input shaft 17 so as to reciprocate pistons 109 at a stroke corresponding to the tilt angle of movable swash plate Pa, whereby hydraulic pump P sucks fluid from right pump kidney port 57a into the cylinder holes of cylinder block 104, and delivers fluid from the cylinder holes to left pump kidney port 57b.

Figure 19:
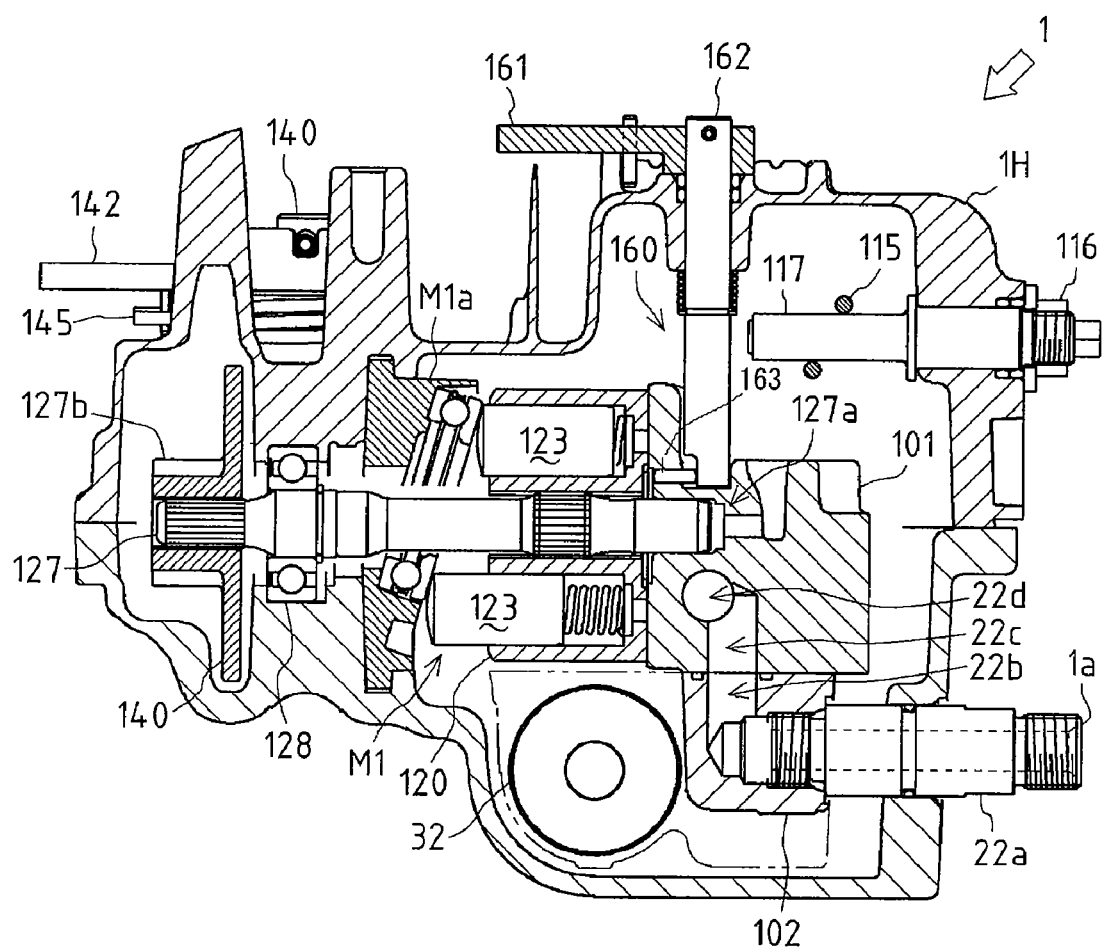
FIG. 19 is a cross sectional view of the rear transaxle taken along an A-A line of FIG. 17.

Referring to FIGS. 2, 3, 18 and 20, fluid in pump kidney port 57b from hydraulic pump P is led to port 1b through passage 27 consisting of fluid passage holes 27e, 27d, 27c and 27b and joint plug 27a. In this state, corresponding charge check valve 35 prevents high-pressurized fluid in passage 27 from entering charge fluid passage 34. Fluid flows from port 1b of rear transaxle 1 to hydraulic motors M2 and M3 in front transaxle 2 through pipe 26, and returns to port 1a of rear transaxle 1 through pipe 23. Referring to FIGS. 18 and 19, in rear transaxle 1, fluid is introduced into front motor kidney port 56b through passage 22 consisting of joint plug 22a and fluid passage holes 22b, 22c and 22d. Referring to FIG. 17, fluid is introduced from front motor kidney port 56b into the cylinder holes of cylinder block 120 of hydraulic motor M1 so as to reciprocate pistons 123 at a stroke corresponding to the tilt angle of fixed swash plate Ma, thereby rotating cylinder block 120 with motor shaft 127 for forward traveling rotation. Referring to FIGS. 17, 18 and 20, the fluid in the cylinder holes of cylinder block 120 is delivered into rear motor kidney port 56a, and returns through passage 21 to right pump kidney port 57a serving as the suction port of hydraulic pump P. In this state, corresponding charge check valve 35 prevents high-pressurized fluid in passage 21 from entering charge fluid passage 34.

When speed control pedal 13 is depressed in the direction for backward traveling, the above fluid flow route is reversed.

That is, left pump kidney port 57*b* serves as the suction port of hydraulic pump P, and right pump kidney port 57*a* serves as the delivery port of hydraulic pump P, so as to rotate motor shaft 127 for backward traveling rotation.

The fluid flow concerned to charge pump 33 will be described with reference to FIGS. 2, 21 and 23. The trochoid gear consisting of inner and outer gears 135 and 136, serving as charge pump 33, is driven by input shaft 17 so as to suck fluid from the fluid sump in rear transaxle housing 1H into trochoid gear chamber 137 through fluid filter 32, suction passage hole 31 and suction port 58*a*. Charge pump 33 pressurizes fluid in trochoid gear chamber 137 and delivers it to deliver port 58*b*. Relief valve 50 regulates the pressure of delivery fluid from deliver port 58*b* so as to correspond to the power steering device. The pressure-regulated fluid from relief valve 50 is led into port 75 through passage 98 consisting of fluid passage hole 98*b* and joint plug 98*a*, and supplied from port 75 to power steering hydraulic valve 80 through pipe 81. Fluid drained from valve 80 returns to port 76 of rear transaxle 1 through pipe 82. Fluid is supplied from valve 80 to one chamber of power steering cylinder 79 through either pipe 83 or 84, and simultaneously drained to the other chamber of power steering cylinder 79 through the other pipe 84 or 83, thereby telescoping piston rod 90 of cylinder 79.

Figure 24:
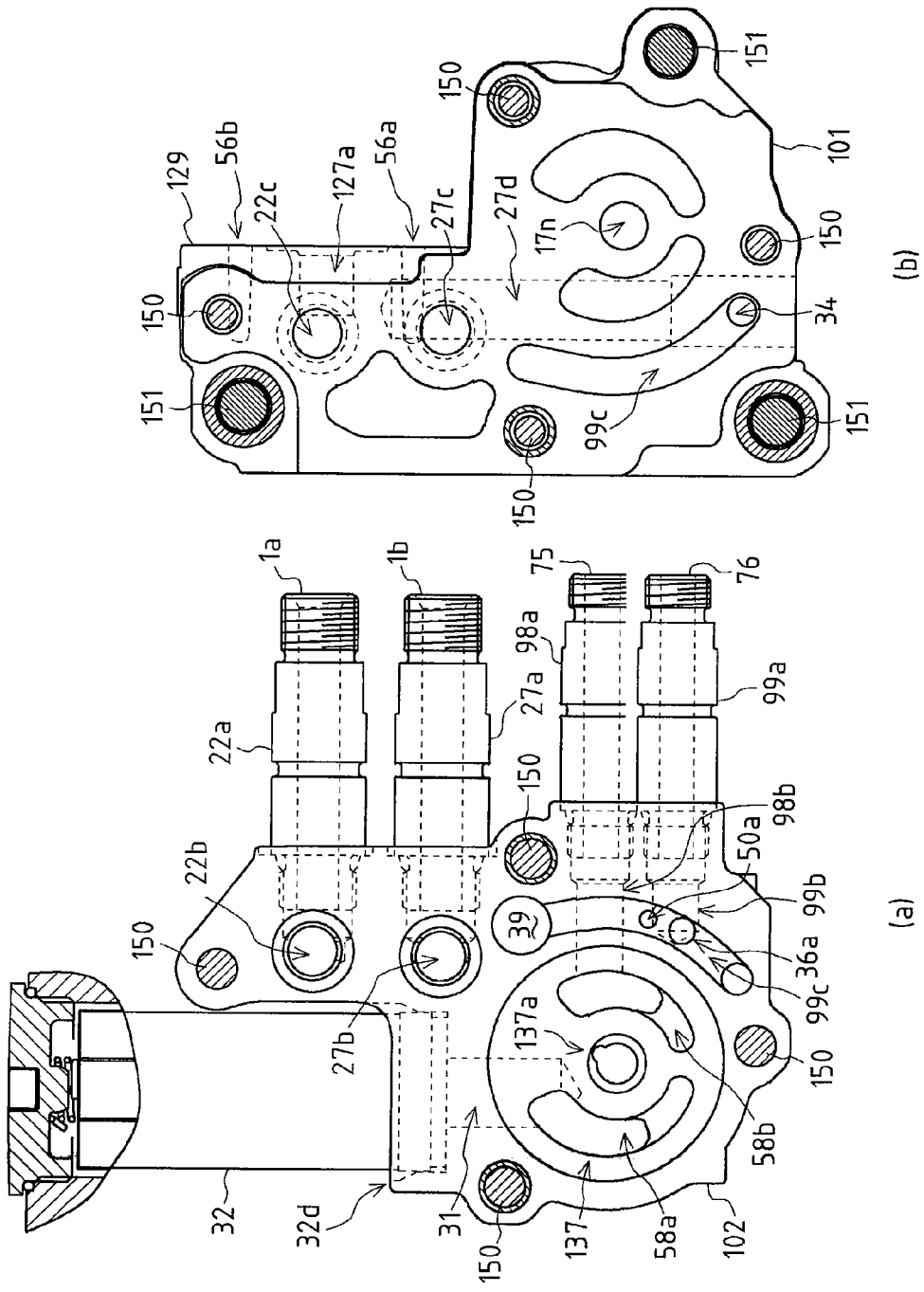
FIG. 24(*a*) is a plan view of a bottom surface of the center section joined to the charge pump casing, and FIG. 24(*b*) is a plan view of a top surface of the charge pump casing joined to the center section.

Referring to FIGS. 18, 20 and 24(*b*), fluid returned from valve 80 to port 76 is introduced to charge fluid passage 34 through passage 99 consisting of joint plug 99*a* and fluid passage holes 99*b* and 99*c*, and supplied to either lower-pressurized passage 21 and pump kidney port 57*a*, during forward traveling, or lower-pressurized passage 27 and pump kidney port 57*b*, during backward traveling, through corresponding charge check valve 35.

The power transmission mechanism in rear transaxle 1 between motor shaft 127 and axles 6 will be detailed with reference to FIG. 17. Deceleration gear train 37 comprises a diametrically large gear 37*a*, a diametrically small gear 37*b*, a counter shaft 37*c* and a sleeve 37*d*. In the transmission gear chamber of rear transaxle housing 1H, laterally horizontal counter shaft 37*c* is fixedly spanned between the left side wall of housing 1H and the partition wall in housing 1H behind motor shaft 127 and in front of axles 6. Sleeve 37*d* is relatively rotatably provided on counter shaft 37*c*, and diametrically large and small gears 37*a* and 37*b* are fixed on sleeve 37*d*. Large gear 37*a* meshes with gear 127*b* fixed on motor shaft 127, and small gear 37*b* meshes with a bull gear 38*a* of differential gear unit 38.

Differential gear unit 38 comprises bull gear 38*a*, a pair of left and right differential side gears 38*b*, and pinions 38*c*. Differential side gears 38*b* are not relatively rotatably (spline-fittingly) provided on respective proximal end portions of left and right axles 6. Pinions 38*c* are relatively rotatably supported in bull gear 37*a*, so as to have pivots disposed in the radial direction of bull gear 37*a*. Each pinion 38*c* meshes with both differential side gears 38*b*, so as to differentially distribute the rotary force of bull gear 37*a* between left and right axles 6.

Referring to FIG. 19, a vertical brake camshaft 143 is rotatably supported in rear transaxle housing 1H. A brake arm 142 is fixed on a top portion of brake camshaft 143 projecting upward from rear transaxle housing 1H, and operatively connected to brake pedal 41 through a linkage. In rear transaxle housing 1H, brake camshaft 142 is formed at a vertically intermediate portion thereof with a sectionally semicircularly shaped cam 144 facing brake disc 140 on motor shaft 127 through a brake shoe 141. When brake pedal 41 is depressed, brake arm 142 and brake camshaft 143 are integrally rotated, so as to slant cam 144 when viewed in plan, and press brake shoe 141 against brake disc 140, thereby braking motor shaft 127.

A safety valve device for the hydraulic circuit system will be described with reference to FIGS. 18, 20 and 24(*a*). As mentioned above, check valve 39 is disposed at the front end of fluid passage hole 99*c* in charge pump casing 102. In charge pump casing 102, a vertical fluid passage hole 39*a* is extended downward from check valve 39, and a leftwardly horizontal fluid passage hole 39*b* is extended leftward from a bottom portion of vertical fluid passage hole 39*a*, so as to be connected to suction passage hole 31.

When vehicle 100 is parked on a slope, hydraulic motor M1 receives backflow driving force from wheels 7 and acts as a pump so as to excessively pressurize HST circuit HC1. Hydraulic pump P and charge pump 33 are not driven, and movable swash plate Pa of pump P is disposed at the neutral position. However, due to the excessive pressurization by hydraulic motor M1, fluid leaks from the gap between hydraulic pump P and pump contact surface 103 or the gap between hydraulic motor M1 and motor contact surface 129. Consequently, HST circuit HC1 becomes short of fluid so as to cause unexpected free rotation of hydraulic motor M1, i.e., cause the free wheel phenomenon that vehicle 100 unexpectedly descends the slope. Therefore, when HST circuit HC1 is hydraulically depressed by the fluid leak, check valve 39 is automatically opened to pass fluid from the fluid sump in rear transaxle housing 1H to either or both of passage 21 and 27 through check valve or valves 35. In this way, even while charge pump 33 is inactivated, check valve 39 supplies HST circuit HC1 with fluid so as to prevent the free wheel phenomenon.

Referring to FIGS. 22 and 23, charge pump casing 102 is bored in a left rear portion thereof with a lateral horizontal circular hole, into which pressure-regulating relief valve 36 is fitted. A horizontal fluid passage hole 36*a* is extended rightward from the upstream side of relief valve 36, and a vertical fluid passage hole 36*b* is extended upward from fluid passage hole 36*a* to fluid passage hole 99*c*, so as to connect the upstream side of relief valve 36 to lower-pressurized passage 99 (fluid passage hole 99*c*). A vertical fluid passage hole 36*c* is extended downward from the downstream side of charge pump 36 and downwardly outwardly opened at the bottom surface of charge pump casing 102 to the fluid sump in rear transaxle housing 1H. When the charge fluid circuit is excessively supplied with fluid and the pressure in passage 99 is in excess of a predetermined level, relief valve 36 is opened to drain fluid from passage 99 to the fluid sump outside of charge pump casing 102 through fluid passage holes 36*b*, 36*a* and 36*c*, thereby keeping the proper pressure level of fluid charged to the axle-driving hydraulic fluid circuit in HST circuit HC1.

Referring to FIGS. 18 and 20, charge pump casing 102 is bored in a rear bottom portion thereof with a fore-and-aft horizontal circular hole, into which pressure-regulating relief valve 50 for regulating pressure in the auxiliary (e.g., power steering) device driving fluid circuit is fitted. The upstream side of relief valve 50 is connected to higher-pressurized fluid passage hole 98*b*, and the downstream side of relief valve 50 is connected to lower-pressurized fluid passage hole 99*c* through a vertical fluid passage hole 50*a*. In the auxiliary device driving fluid circuit, if higher-pressurized passage 98 is excessively pressurized, relief valve 50 is opened to bypass fluid from higher-pressurized passage 98 to lower-pressurized passage 99.

Referring to FIG. 19, rear transaxle 1 is provided with a forcible relief valve 160 comprising a lever 161, a camshaft 162, and a pushpin 163. Vertical camshaft 162 is rotatably fitted at a cam-shaped bottom portion into center section 101. Horizontal pushpin 163 is axially slidably disposed in center section 101 between motor contact surface 129 and the cam portion of camshaft 162. Horizontal lever 161 is fixed on a top portion of camshaft 162 projecting upward from rear transaxle housing 1H. When vehicle 100 is towed, wheels 7 and 9 are requested to rotate freely from the hydraulic pressure in HST circuit HC1. Therefore, lever 161 is manually rotated together with camshaft 162 so that the cam portion of camshaft 162 thrusts pushpin 163 outward from motor contact surface 129, thereby pushing and separating cylinder block 120 from motor contact surface 129, and draining fluid from motor kidney ports 56a and 56b to the fluid sump in rear transaxle housing 1H. In this way, fluid in HST circuit HC1 is reduced so as to allow the free rotation of wheels 7 and 9.

Rear transaxle 1 is provided with a mechanism for expanding the neutral dead zone of hydraulic pump P relative to the tilt of movable swash plate Pa. Referring to FIG. 21, in center section 101, upper and lower horizontal fluid passage holes 171 and 172 are extended rightward from respective upper and lower fluid passage holes 21 and 27d, and opened rightwardly outward at the right side surface of center section 101. A pair of upper and lower plugs provided at right end portions with respective rightwardly outward opened orifices 171a and 172a are fitted leftward into upper and lower fluid passage holes 171 and 172, and project at the right end portions thereof from the right openings of fluid passage holes 171 and 172 on the right side surface of center section 101. A portion of control arm 114 opposite to the end engaged to swash plate Pa with respect to control shaft 113 is extended so as to abut against the right end of the plugs. A groove 114a constantly opened to the fluid sump in rear transaxle housing 1H is formed on the surface of the extended portion of control arm 114 facing the plugs so as to correspond to a tilt range of swash plate Pa for making the expanded neutral dead zone of hydraulic pump P.

While swash plate Pa is disposed within the tilt range including the neutral position so that either or both of orifices 171a and 172a are opened to groove 114a (in FIG. 21, both orifices 171a and 172a are opened to groove 114a), a certain amount of fluid is drained from higher-pressurized passage 21 or 27 to the fluid sump through orifice 171a or 172a and groove 114a, so as to prevent hydraulic pump P from supplying fluid to hydraulic motors M1, M2 and M3, thereby ensuring the extended neutral dead zone of hydraulic pump P for preventing vehicle 100 from moving. The tilt angle of movable swash plate Pa with control arm 114 from the neutral position is increased so as to take groove 114a apart from both orifices 171a and 172a, both the right end openings of orifices 171a and 172a are closed by the surface of the extended portion of control arm 114 so as to prevent fluid from being drained from higher-pressurized passage 21 or 27, thereby ensuring the proper volumetric efficiency between hydraulic pump P and hydraulic motors M1, M2 and M3.

Alternatively, to expand the tilt range for the neutral dead zone of hydraulic pump P, a check and neutral valve may be interposed between passages 21 and 27.

Figure 25:
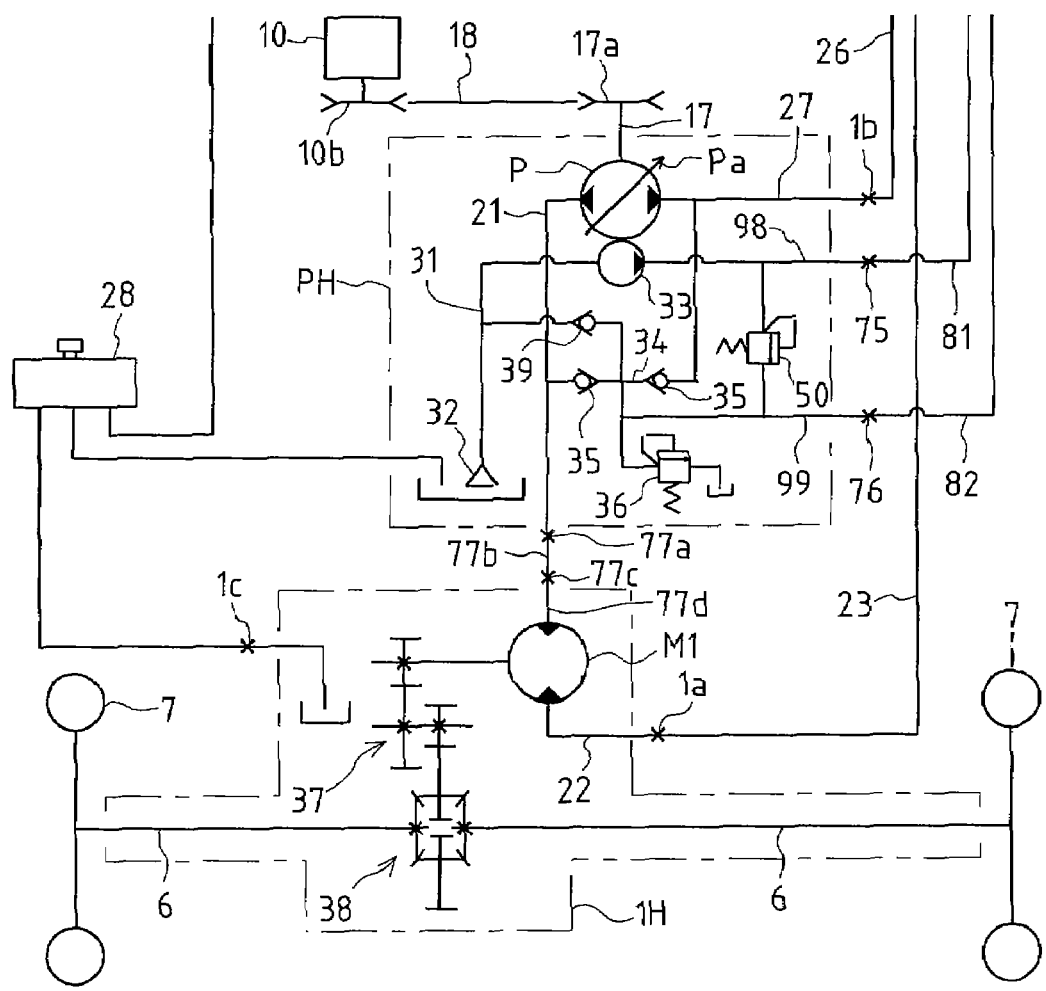
FIG. 25 is another hydraulic circuit diagram of a rear transaxle separated from a pump housing.

Alternatively, referring to FIG. 25, a pump housing PH incorporating hydraulic pump P and charge pump 33 is disposed outside of rear transaxle housing 1H which incorporates hydraulic motor M1, deceleration gear train 37, differential gear unit 38 and axles 6.

Referring to FIG. 25, port 1a connected to external pipe 23 is disposed on rear transaxle housing 1H, and hydraulic motor M1 is connected to port 1a through passage 22 in rear transaxle housing 1H. Port 1b connected to external pipe 26 is disposed on an outer surface of pump housing PH, and hydraulic pump P is connected to port 1b through passage 27 in pump housing PH. An outward opened port 77a is disposed on an outer surface of pump housing PH, and a port 77c is disposed on an outer surface of rear transaxle housing 1H. Passage 21 is disposed in pump housing PH, and interposed between hydraulic pump P and port 77a. A passage 77d is disposed in rear transaxle housing 1H, and interposed between hydraulic motor M1 and port 77c. An external pipe 77b is disposed outside of pump housing PH and rear transaxle housing 1H, and interposed between ports 77a and 77c. Ports 75 and 76 connected to respective external pipes 81 and 82 are disposed on the same outer side surface of pump housing PH with port 1a. In pump housing PH are disposed the charge fluid circuit portion between fluid filter 32 and port 75 through charge pump 33 and passage 98, the charge fluid circuit portion between port 76 and passages 21 and 27 through passage 99 and charge check valves 35, and associate valves and equipments, which are disposed in rear transaxle housing 1H in the embodiment of FIG. 2.

Pump housing PH is disposed adjacent to rear transaxle housing 1H (e.g., just in front of housing 1H or just above housing 1H). Preferably, ports 1b, 75 and 76 are disposed on a right side surface of pump housing PH while port 1a is disposed on the right side surface of rear transaxle housing 1H, thereby collecting ports 1a, 1b, 75 and 76 at the right side of vehicle 100 so as to compactly collect pipes 23, 26, 81 and 82. Alternatively, if port 1a is disposed on the left side surface of rear transaxle housing 1H, ports 1b, 75 and 76 are disposed on the left side surface of pump housing PH.

Figure 33:
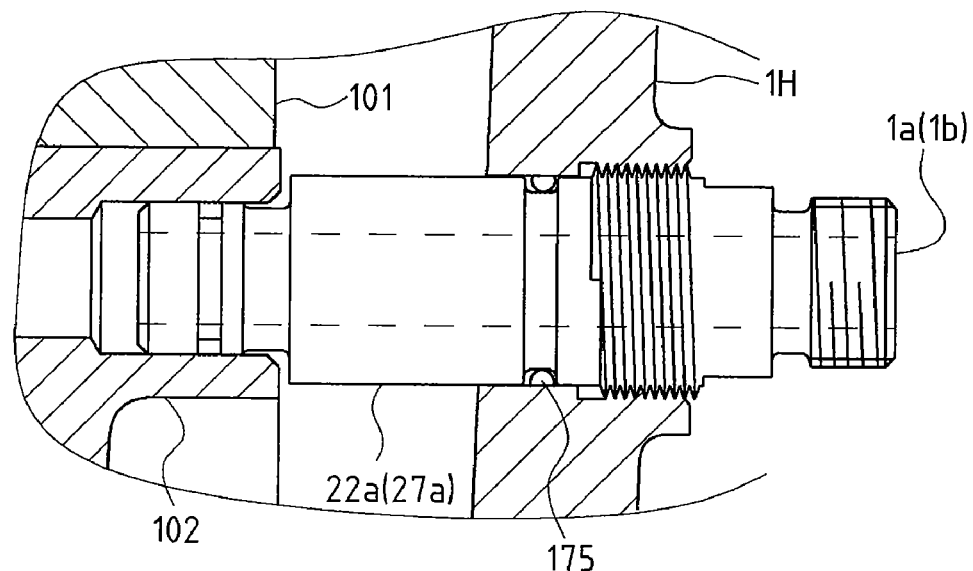
FIG. 33(a) is a sectional side view of a pipe connector fitted in a transaxle housing.
FIG. 33(b) is a sectional side view of another pipe connector fitted in a transaxle housing.
Figure 33:
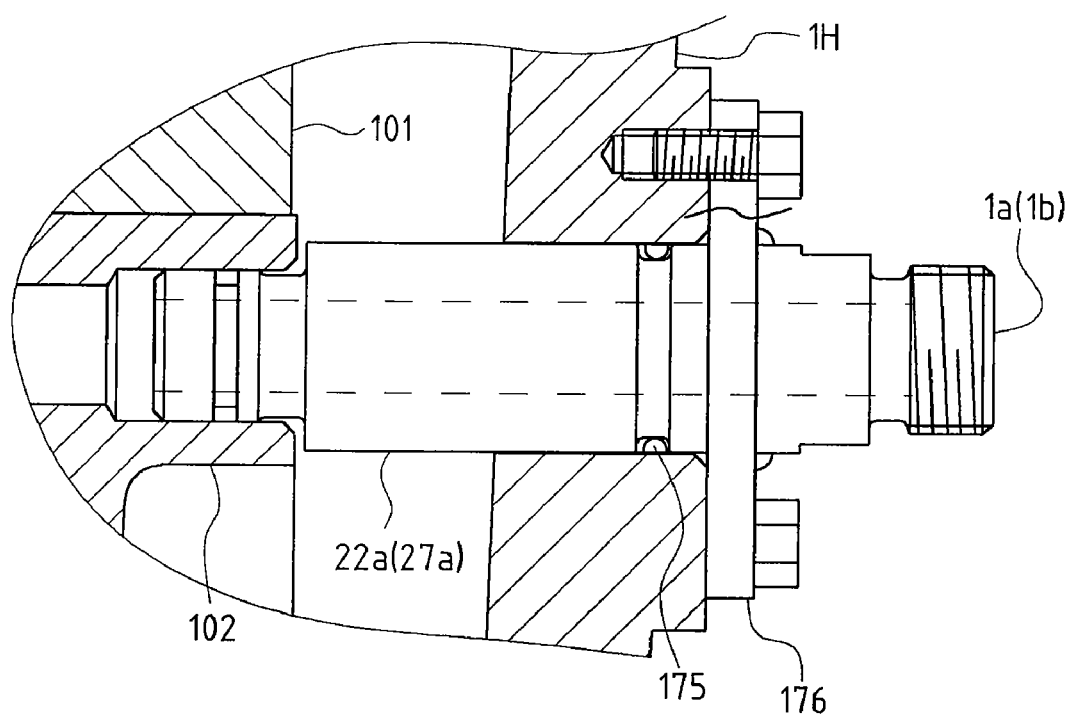

Alternative arrangements of joint plugs 22a and 27a having respective ports 1a and 1b fitted into rear transaxle housing 1H will be described with reference to FIGS. 33(a) and 33(b) (each of FIGS. 33(a) and 33(b) illustrates only representative joint plug 22a). Joint plugs 22a and 27a are provided thereon with respective O-rings 175 in respective plug holes through the wall of rear transaxle housing 1H. Further, referring to FIG. 33(a), each of the plug holes within the wall of rear transaxle housing 1H is tapped, and each of joint plugs 22a and 27a has an intermediate threaded portion corresponding to the tapped plug hole, so as to be immovably fastened to rear axle housing 1H, while each of joint plugs 22a and 27a are slidably fitted into charge pump casing 102. Due to the screw-engagement of joint plugs 22a and 27a to rear transaxle housing 1H, joint plugs 22a and 27a are prevented from being axially deviated by movement of pipes 23 and 26 according to the swing of front transaxle 2 around center pivot 5, thereby preventing fluid leak from the gap between O-ring 175 and the peripheral wall surface of the shaft hole in rear transaxle housing 1H. Referring to FIG. 33(b), for the same purpose of the arrangement of FIG. 33(a), a flange 176 is fixed on the outer peripheral portion of each of joint plugs 22a and 27a projecting outward from rear axle housing 1H, and flange 176 is fastened onto the outer side surface of rear transaxle housing 1H through bolts or screws. In this way, the arrangements shown in FIGS. 33(a) and 33(b) improve the fluid tightness of joint plugs 22a and 27a against rear transaxle housing 1H.

Alternatively, vehicle 100 may be provided at a front portion thereof with transaxle 1 incorporating hydraulic motor M1, deceleration gear train 37 and differential gear unit 38, and provided at a rear portion thereof with transaxle 2 incorporating hydraulic motors M2 and M3. In this regard, front wheels may be unsteerable, and rear wheel may be steerable.

Second Embodiment

Figure 10:
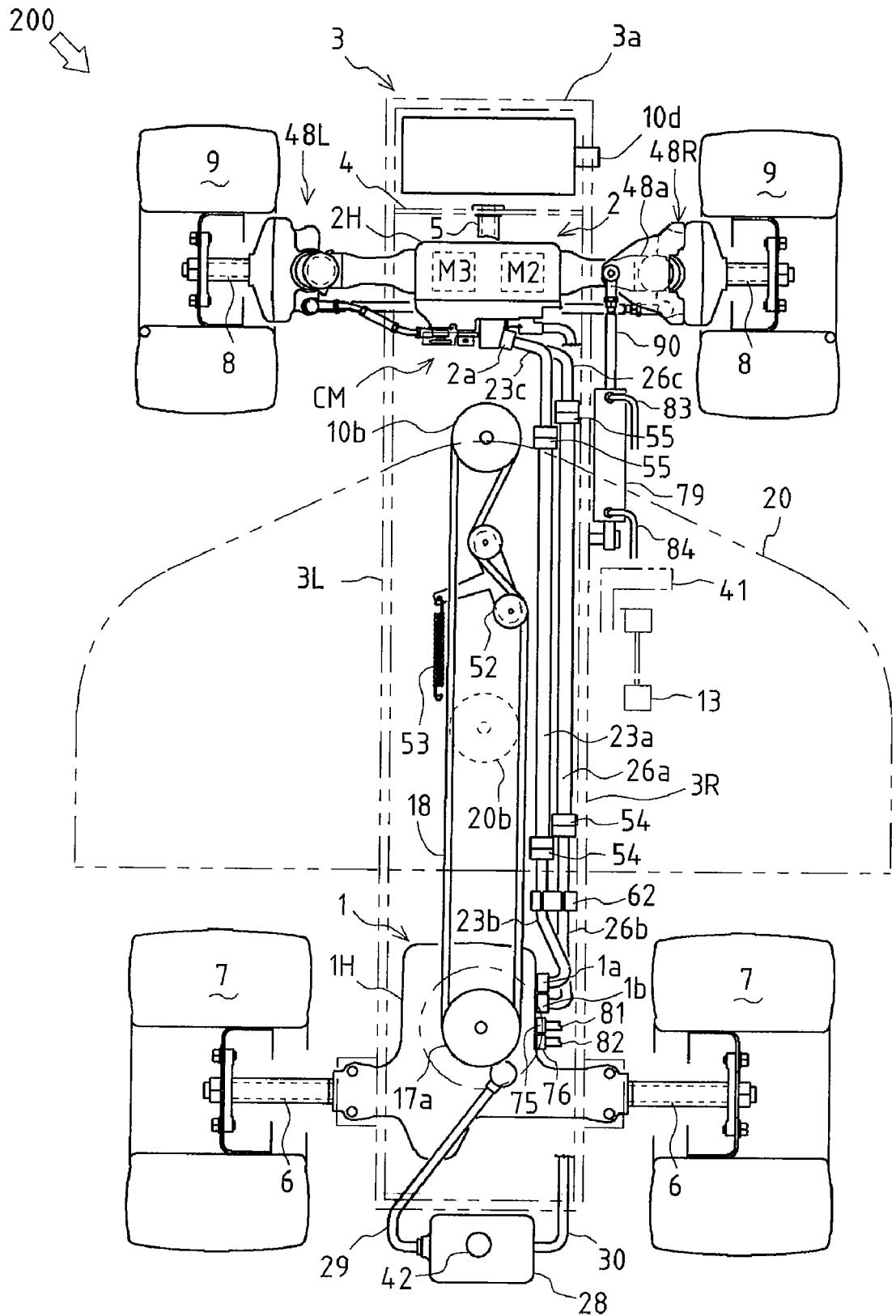
FIG. 10 is a sectional plan view of a hydraulic four-wheel drive working vehicle according to a second embodiment of the invention, provided with an arrangement of hydraulic pressure fluid pipes.

Each of hereinafter described vehicles 200 and 300 is provided with front transaxle 2 in which positions or directions of ports 2a and 2b are different from those of front transaxle 2 of vehicle 100. Referring to FIG. 10, vehicle 200 according to a second embodiment is provided with front transaxle 2 serving as laterally reversed front transaxle 2 of vehicle 100. Namely, in front transaxle 2 of this embodiment, right fixed displacement hydraulic motor M2 and left variable displacement hydraulic motor M3 are disposed in front transaxle housing 2H. In this regard, cam mechanism CM for controlling the tilt of swash plate M3a of hydraulic motor M3 is disposed leftward in front transaxle 2. Ports 2a and 2b are disposed on a laterally intermediate rear portion of rear transaxle housing 2H so as to be rightwardly outward opened. Further, referring to FIG. 10, ports 1a and 1b are disposed on the right side surface of rear transaxle housing 1H. Vehicle 200 employs HST circuit HC1 similar to that of FIG. 2.

Corresponding to this arrangement of rightward ports 2a and 2b on front transaxle 2, pipes 23 and 26 interposed between respective rear ports 1a and 1b and respective front ports 2a and 2b include fore-and-aft main portions extended along right side plate 3R of frame 3 (along the bottom edge of right side plate 3R when viewed in side, and along the inside surface of right side plate 3R when viewed in plan). Pipe 23 includes rear rigid pipe 23b connected to port 1a, front rigid pipe 23c connected to port 2a, and flexible hose 23a interposed between rear and front rigid pipes 23b and 23c. Pipe 26 includes rear rigid pipe 26b connected to port 1b, front rigid pipe 26c connected to port 2b, and flexible hose 26a interposed between rear and front rigid pipes 26b and 26c. Rear rigid pipes 23b and 26b are extended rightward from respective ports 1a and 1b, bent and extended forwardly upward, and bent against and extended horizontally forward, so as to be clamped by clamping stay 62 fixed on the inside surface of right side plate 3R. Front rigid pipes 23c and 26c are extended in the fore-and-aft direction along right side plate 3R of frame 3 (along the bottom edge of right side plate 3R when viewed in side, and along the inside surface of right side plate 3R when viewed in plan), and connected to respective rear rigid pipes 23b and 26b through respective swivel joints 54, and to respective front rigid pipes 23c and 26c through respective swivel joints 55. This arrangement of pipes 23 and 26 serves as the laterally reversed arrangement of pipes 23 and 26 shown in FIG. 5 where ports 1a and 1b are disposed on the left side surface of rear transaxle housing 1H and ports 2a and 2b are disposed on the left side surface of front transaxle housing 2H. Further, tension pulley 52 with spring 53 also serves as the laterally reversed tension pulley 52 shown in FIG. 3 so as to be prevented from interfering with pipes 23 and 26 along right side plate 3R.

This arrangement of pipes 23 and 26 between rear and front transaxles 1 and 2 has the same advantages as the arrangement of pipes 23 and 26 shown in the embodiment of FIG. 3 combined with the embodiment of FIG. 5. That is, pipes 23 and 26 can be compactly disposed at the safe space inside frame 3 while they are prevented from interfering with the traveling power transmission system, the mower-driving power transmission system and mower unit 20, from having fluid leak and being damaged at ends thereof connected to ports 1a, 1b, 2a and 2b, and from being subjected to twisting stress caused by the swing of front transaxle 2 around center pivot 5. Further, since all rear ports 1a and 1b and front ports 2a and 2b are disposed rightward, rear rigid pipes 23b and 26b have no laterally extended portions disposed just in front of rear transaxle housing 1H, i.e., have bent portions reduced.

Referring to FIG. 10, power steering valve 80 (not shown) is disposed on frame 3 between rear and front transaxles 1 and 2, power steering cylinder 79 is attached onto the outside surface of right side plate 3R, and ports 75 and 76 are disposed on the right side surface of rear transaxle housing 1H. Therefore, pipes 81 and 82 are disposed along pipes 23 and 26 along right side plate 3R. The arrangement of pipes 81, 82, 83 and 84 for power steering serves as the laterally reversed arrangement of those shown in FIG. 5. Further, in association with the position of power steering cylinder 79 rightward of frame 3, bracket 48a pivotally connected to piston rod 90 of cylinder 79 is provided on right front wheel support unit 48R in association with cam mechanism CM disposed leftward on front transaxle 2. Other structure and parts in vehicle 200 are similar to vehicle 100 whose rear portion is configured as shown in FIG. 5.

Figure 11:
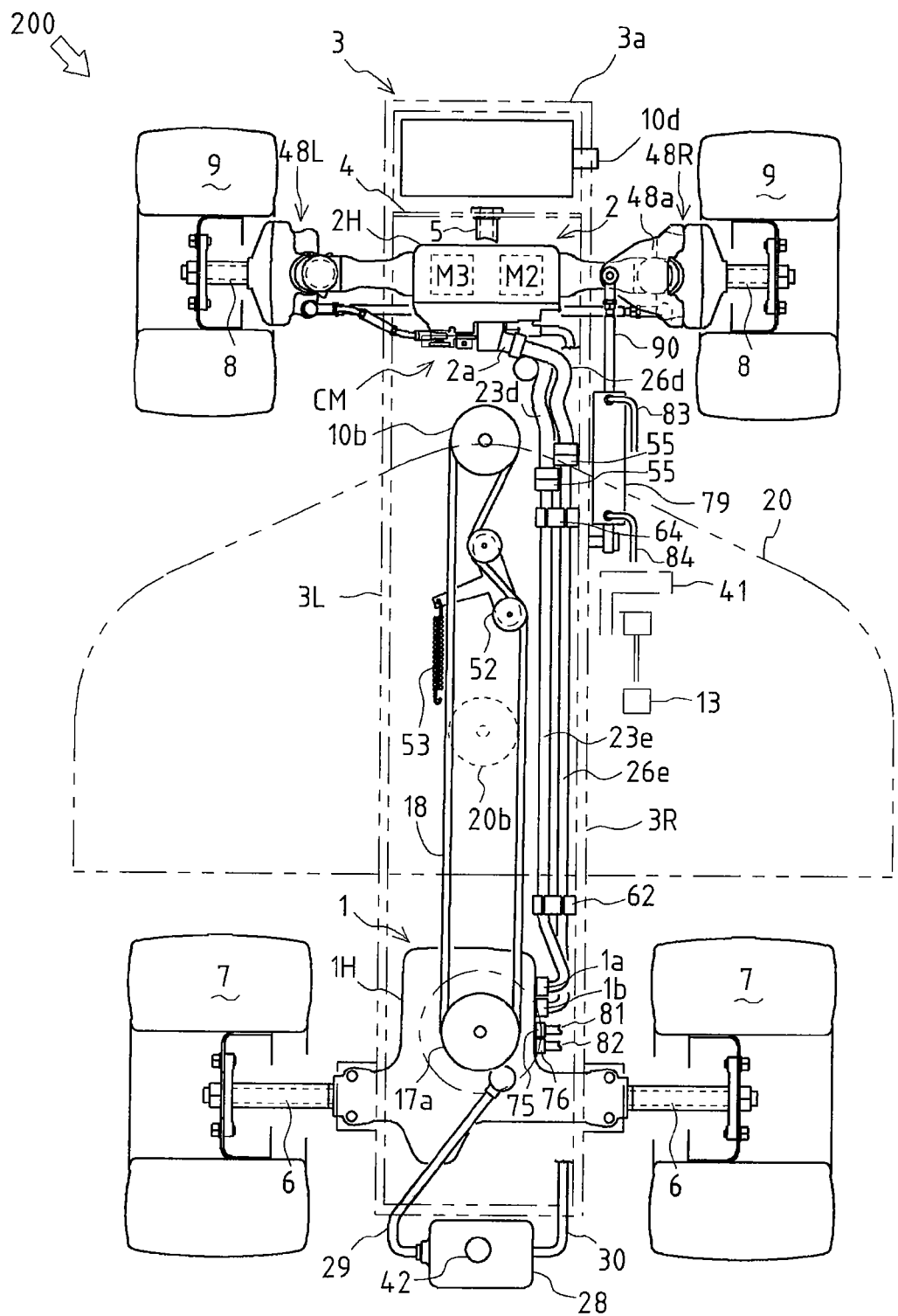
FIG. 11 is a sectional plan view of the hydraulic four-wheel drive working vehicle according to the second embodiment, provided with another arrangement of hydraulic pressure fluid pipes.

Referring to FIG. 11, in vehicle, pipes 23 and 26 interposed between rightward opened ports 1a and 1b of rear transaxle 1 and rightward opened ports 2a and 2b of front transaxle 2 comprise flexible pipes 23d and 26d connected to ports 2a and 2b and rigid pipes 23e and 26e connected to ports 1a and 1b. Rigid pipes 23e and 26e are extended along right side plate 3R, clamped by clamping stays 62 and 63 fixed to right side plate 3R, and connected at front ends thereof to respective rigid pipes 23d and 26d through respective swivel joints 55. This arrangement of pipes 23 and 26 serves as the laterally reversed arrangement of pipes 23 and 26 shown in FIG. 9, excluding that flexible hoses 23e and 26e do not have laterally extended portions disposed just in front of rear transaxle housing 1H because ports 1a and 1b are disposed on the right side surface of rear transaxle housing 1H. The increase of rigid pipe portions in pipes 23 and 26 advantageously reduces internal pressure resistance in pipes 23 and 26.

Third Embodiment

Figure 12:
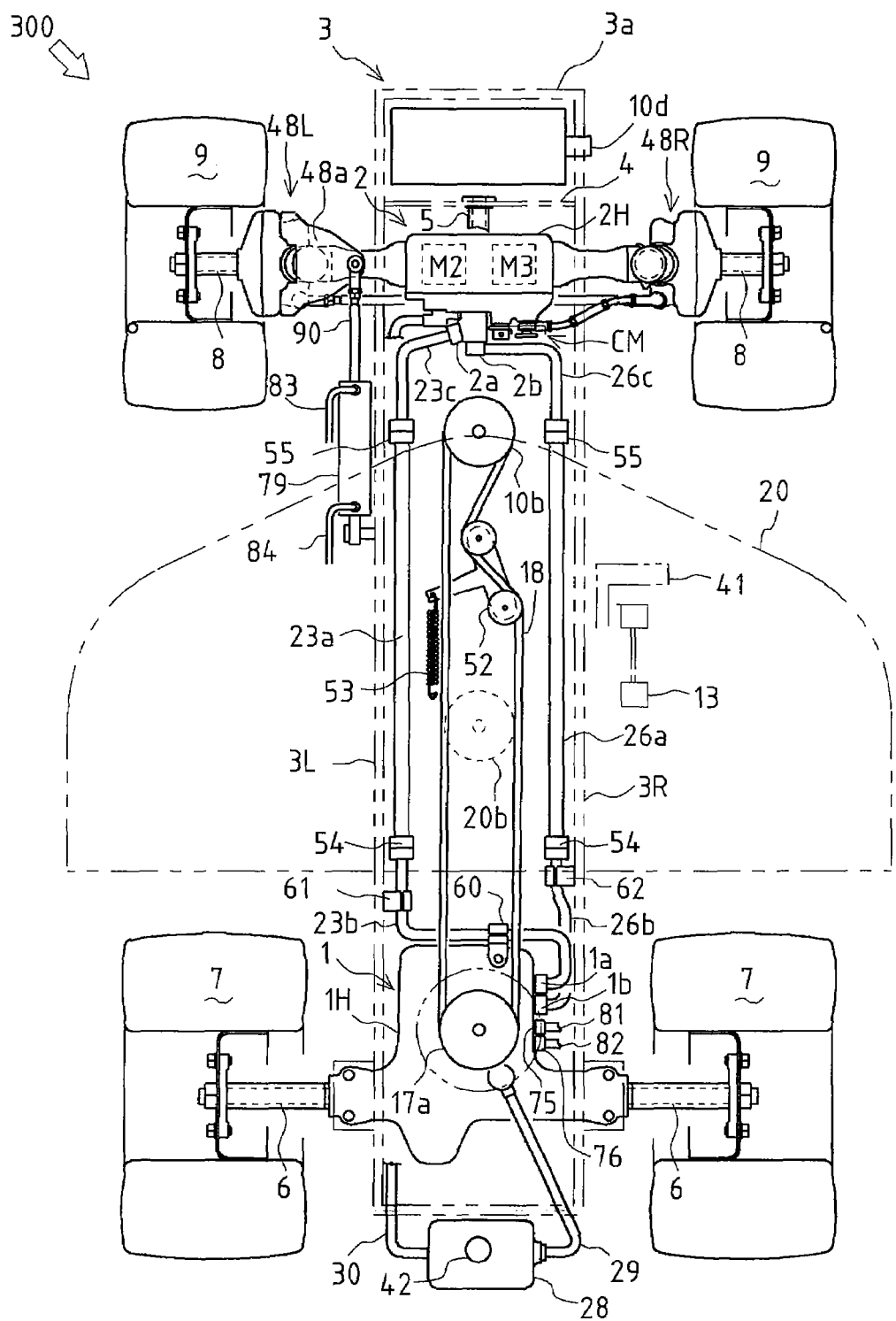
FIG. 12 is a sectional plan view of a hydraulic four-wheel drive working vehicle according to a third embodiment of the invention, provided with an arrangement of hydraulic pressure fluid pipes.
Figure 13:
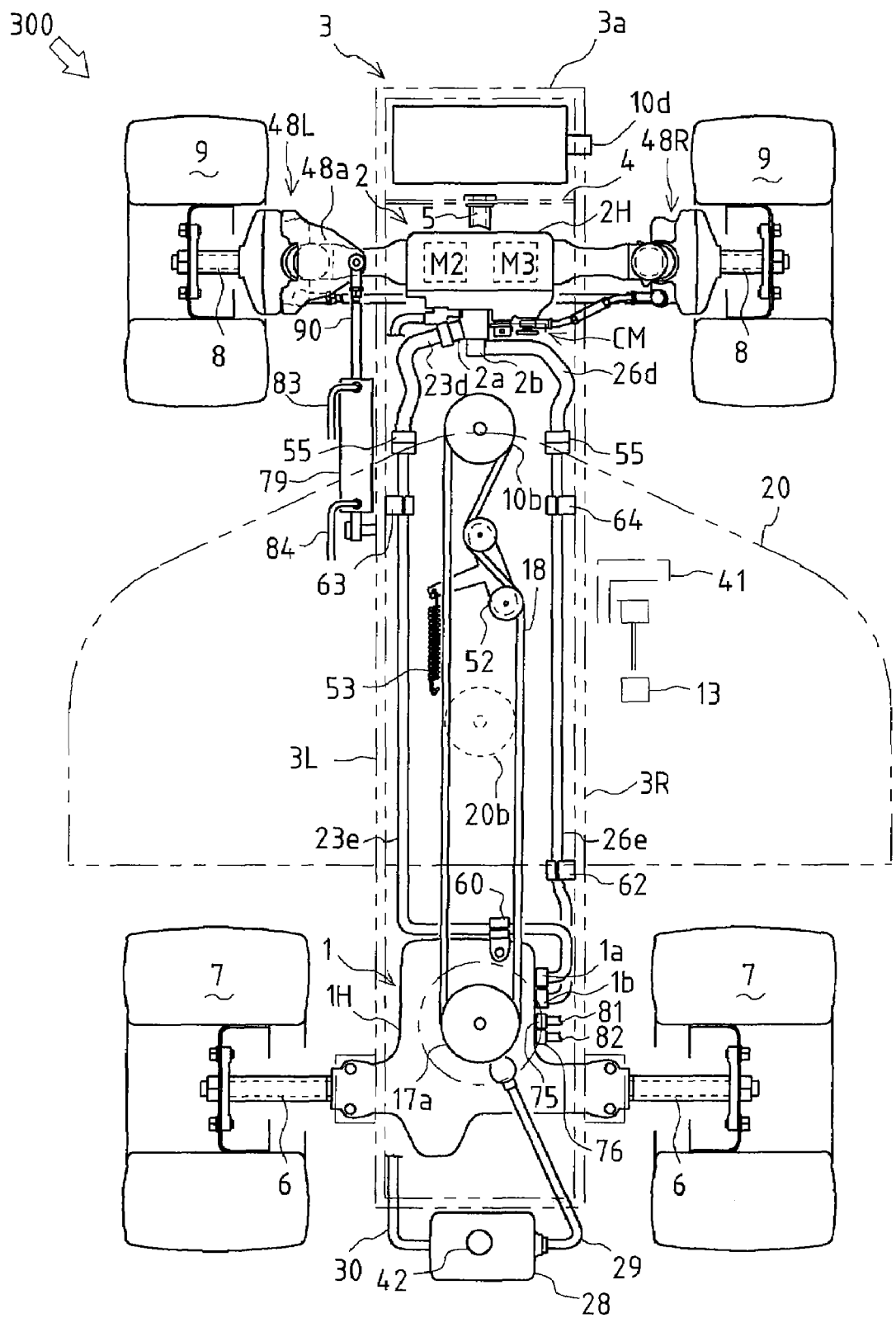
FIG. 13 is a sectional plan view of the hydraulic four-wheel drive working vehicle according to the third embodiment, provided with another arrangement of hydraulic pressure fluid pipes.

Referring to FIGS. 12 and 13, each of vehicles 300 according to a third embodiment is provided with front transaxle 2 substantially similar to front transaxle 2 of vehicle 100 shown in FIG. 3. That is, front transaxle housing 2H incorporates left fixed displacement hydraulic motor M2 and right variable displacement hydraulic motor M3, cam mechanism CM is disposed in the rightward portion of front transaxle 2, and port 2a connected to pipe 23 is rightwardly outward opened. The different point of rear transaxle 2 of vehicle 300 from that of vehicle 100 is that port 2b connected to pipe 26 is rightwardly outward opened opposite to port 2a. Further, referring to FIGS. 12 and 13, ports 1a and 1b are disposed on the right side surface of rear transaxle housing 1H.

Referring to FIGS. 12 and 13, to correspond to this arrangement of ports 1a, 1b, 2a and 2b, arrangement of pipe 23 interposed between ports 1a and 2a is similar to that of vehicle 100 shown in FIG. 3, and arrangement of pipe 26 interposed between ports 1b and 2b is similar to that of vehicle 200 shown in FIG. 10. That is, pipe 23 includes the fore-and-aft main portion extended along left side plate 3L (along the bottom edge of left side plate 3L when viewed in side and along the inside surface of left side plate 3L when viewed in plan), and pipe 26 includes the fore-and-aft main portion extended along right side plate 3R (along the bottom edge of right side plate 3R when viewed in side and along the inside surface of right side plate 3R when viewed in plan). In association with the laterally opposite arrangement of ports 1a and 2a, pipe 23 includes the lateral extended portion disposed just in front of rear transaxle housing 1H (and clamped by clamping stay 60 fixed on rear transaxle housing 1H) so as to be extended at the fore-and-aft main portion thereof along left side plate 3L. On the other hand, since both ports 1b and 2b are opened rightward, pipe 26 is extended from port 1b to the fore-and-aft main portion thereof without bending to have a lateral extended portion just in front of rear transaxle housing 1H.

More specifically, referring to FIG. 12, pipe 23 comprises rear and front rigid pipes 23b and 23c and flexible hose 23a interposed between rigid pipes 23b and 23c, and pipe 26 comprises rear and front rigid pipes 26b and 26c and flexible hose 26a interposed between rigid pipes 26b and 26c. Flexible hose 23a is extended in the fore-and-aft direction along left side plate 3L, connected at the rear end thereof through swivel joint 54 to rear rigid pipe 23b connected to port 1a, and connected at the front end thereof through swivel joint 55 to front rigid pipe 23c connected to port 2a. Flexible hose 26a is extended in the fore-and-aft direction along right side plate 3R, connected at the rear end thereof through swivel joint 54 to rear rigid pipe 26b connected to port 1b, and connected at the front end thereof through swivel joint 55 to front rigid pipe 26c connected to port 2b. Rear rigid pipe 23b includes the lateral extended portion which is disposed just in front of rear transaxle housing 1H and clamped by clamping stay 60 fixed on rear transaxle housing 1H. The forwardly extended front portion of rear rigid pipe 23b is clamped by clamping stay 61 fixed to left side plate 3L so as to be connected to flexible hole 23a through swivel joint 54. Rear rigid pipe 26b includes no lateral extended portion disposed just in front of rear transaxle housing 1H, but is extended substantially forward when viewed in plan so as to be connected to flexible hose 26R through swivel joint 54.

Referring to FIG. 13, pipe 23 comprises flexible hose 23d connected to port 2a, and rigid pipe 23e connected to port 1a. Pipe 26 comprises flexible hose 26d connected to port 2b, and rigid pipe 26e connected to port 1b. Rigid pipe 23e includes the fore-and-aft extended portion along left side plate 3L, and is connected at the rear end thereof to port 1a, and at the front end thereof to flexible hose 23d through swivel joint 55. Further, rigid pipe 23e includes the lateral extended portion which is disposed just in front of rear transaxle housing 1H and clamped by clamping stay 60 fixed on rear transaxle housing 1H. The front portion of rigid pipe 23e is clamped by clamping stay 61 fixed to left side plate 3L so as to be connected to flexible hose 23d through swivel joint 55. Rigid pipe 26e includes the fore-and-aft extended portion along right side plate 3R, and is connected at the rear end thereof to port 1b, and at the front end thereof to flexible hose 26d through swivel joint 55. Rigid pipe 26e includes no lateral extended portion disposed just in front of rear transaxle housing 1H, but is extended substantially forward when viewed in plan so as to be disposed along right side plate 3R, and connected at the front end thereof to flexible hose 26d through swivel joint 55.

Other features and advantages in these arrangements of pipes 23 and 26 in FIGS. 12 and 13 are the same as those in the above descriptions about the embodiments of FIGS. 3, 9, 10 and 11.

Further, referring to FIGS. 12 and 13, power steering device 80 is disposed between rear and front transaxles 1 and 2, and power steering cylinder 79 is disposed along left side plate 3L and includes piston rod 90 connected to bracket 48a mounted on left front wheel support unit 48L. Ports 76 and 78 are disposed on the same right side surface of rear transaxle housing 1H with ports 1a and 1b. In this condition, pipes 81 and 82 interposed between valve 80 and respective ports 75 and 76, and pipes 83 and 84 interposed between valve 80 and cylinder 79 are disposed similar to those in the arrangement of FIG. 3. In this regard, pipes 81 and 82 are disposed along pipe 26 along right side plate 3R. The features and advantages of the arrangement of power steering pipes are the same as those in the above description of FIG. 3.

Alternatively, each of vehicle 300 may be provided with any of rear transaxles 1 arranged as shown in FIGS. 5, 6 and 7. If either of rear transaxles 1 shown in FIGS. 5 and 7 is equipped on vehicle 300, since ports 1a and 1b are disposed leftward of rear transaxle housing 1H, pipe 26 including the fore-and-aft main portion extended along right side plate 3R includes the lateral extended portion disposed just in front of rear transaxle 1, and pipe 23 including the fore-and-aft main portion extended along left side plate 3L includes no lateral extended portion disposed just in front of rear transaxle 1. Pipes 81 and 82 are disposed along pipe 23 along left side plate 3L.

Fourth Embodiment

Figure 14:
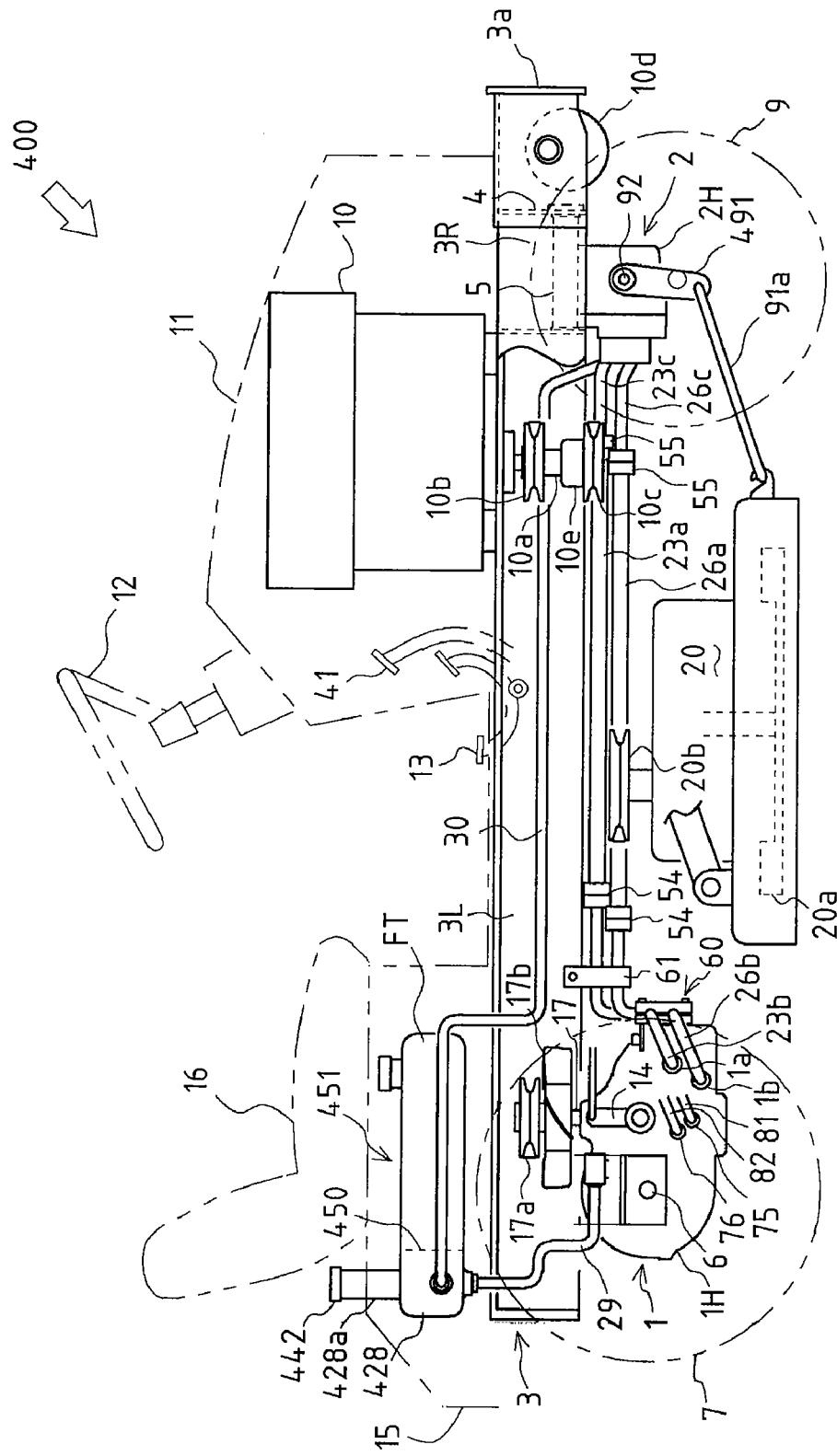
FIG. 14 is a sectional side view of a hydraulic four-wheel drive working vehicle according to a fourth embodiment of the invention, provided with an arrangement of a reservoir tank.

Each of hereinafter described vehicles 400 and 500 is provided with a reservoir tank arranged in a different manner from that of reservoir tank 28 in vehicle 100. Referring to FIG. 14, in vehicle 400 according to a fourth embodiment, a reservoir tank 428 is joined to a fuel tank FT. Fuel tank FT and reservoir tank 428 are disposed between rear transaxle 1 and driver's seat 16 above rear transaxle 1, i.e., below driver's seat 16 and above rear transaxle 1. A breather 442 of reservoir tank 428, also serving as a fluid-supply opening of reservoir tank 428, is disposed behind seat 16.

More specifically, in rear cover 15 on the rear portion of frame 3 is disposed a tank 451 whose inner space is divided into front and rear chambers by a partition 450. The front chamber in tank 451 serves as fuel tank FT. The rear chamber serves as reservoir tank 428, which is disposed just behind seat 16 mounted on the top of rear cover 15 in the fore-and-aft direction of vehicle 400.

The top portion of rear cover 15 is bored with a hole just behind seat 16. An upright cylindrical fluid-supply portion 428a projects upward from tank 428 through the hole of rear cover 15 just behind seat 16. Breather 442 is provided on the top of fluid-supply portion 428a. Fluid-supply portion 428a is opened at the bottom thereof to fluid tank 428 in tank 451. A fuel-supply opening is disposed on the top of fuel tank FT of tank 451 under seat 16. Reservoir tank 428 is disposed so that the fluid level in reservoir tank 428 is higher than the fluid levels of the respective fluid sumps in rear and front transaxles 1 and 2. Reservoir tank 428 is fluidly connected to the fluid sump of rear transaxle 1 through drain pipe 29, and to the fluid sump of front transaxle 2 through drain pipe 30, so as to absorb excessive fluid from the respective fluid sumps.

The integration of reservoir tank 428 with fuel tank FT is advantageous in saving the number of required parts, and facilitates assembly of the reservoir tank and the fuel tank. Due to the position of reservoir tank 428 just above the rear end of frame 3, the length of drain pipe 30 interposed between reservoir tank 428 and front transaxle 2 is enough to ensure adequate flexibility of drain pipe 30 following the swing of front transaxle 2 around center pivot 5.

Further, referring to FIG. 14, vehicle 400 is provided with left and right mower hangers 491 whose respective pivots 92 are disposed coaxially to axles 8 supported by rear transaxle housing 2H. Mower hangers 491 are pivoted at top portions thereof on respective pivots 92, and extended downward. Left and right link rods 91a are pivoted at front ends thereof onto bottom portions of mower hangers 491, and hooked at rear ends thereof onto the front end of mower unit 20. Since pivots 92 of mower hangers 491 are disposed coaxially to axles 8, the accuracy of location of mower hangers 491 is improved so as to facilitate assembly work of suspending mower unit 20.

Fifth Embodiment

Figure 15:
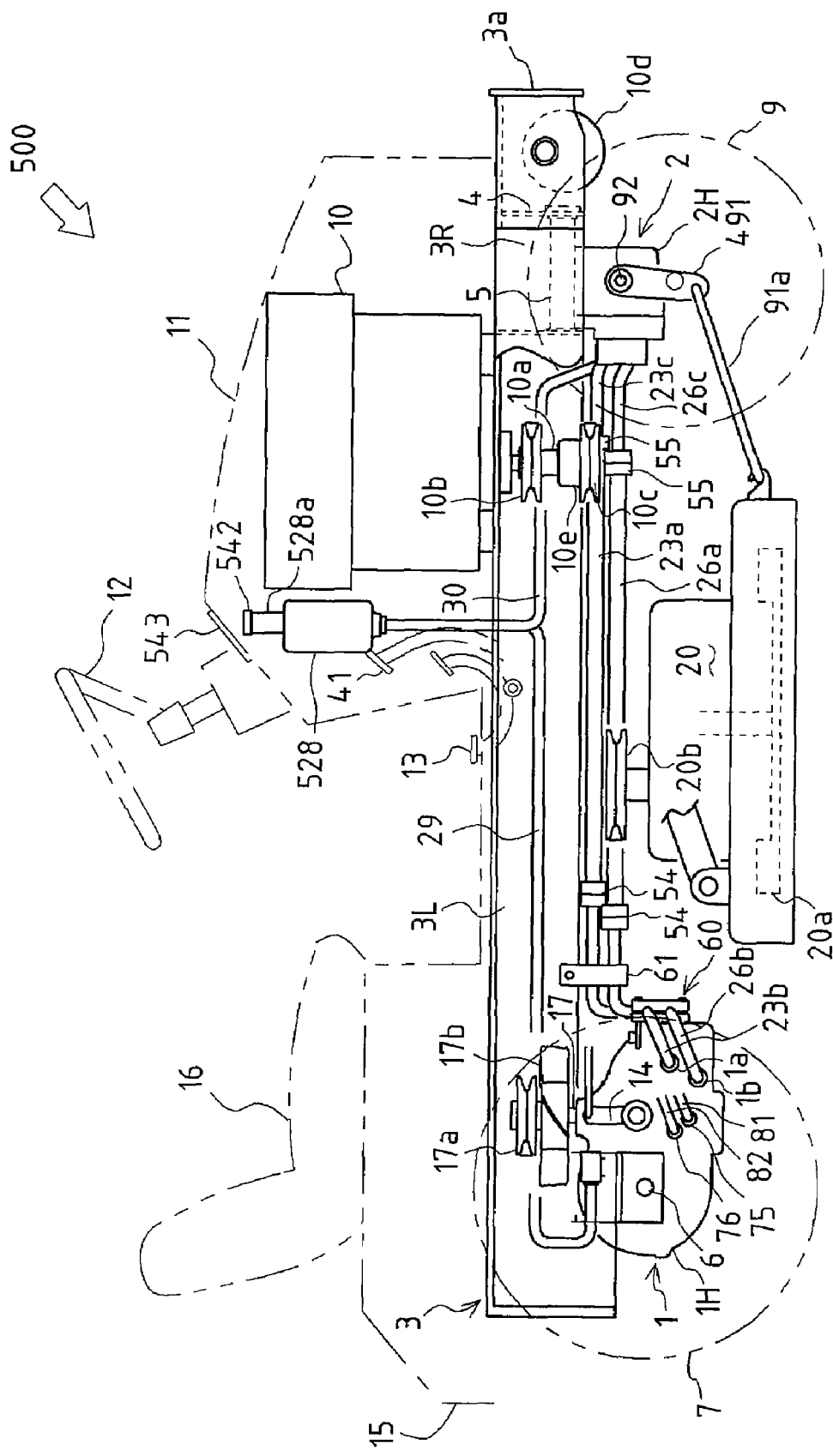
FIG. 15 is a sectional side view of a hydraulic four-wheel drive working vehicle according to a fifth embodiment, provided with another arrangement of a reservoir tank.

Referring to FIG. 15, in vehicle 500 of a fifth embodiment, a reservoir tank 528 is disposed between rear wheels 7 and front wheels 9, and in bonnet 11 incorporating engine 10. A breather 542 of reservoir tank 528, also serving as a fluid-supply opening of reservoir tank 528, is disposed so as to face an opening 543 provided in the dashboard at the rear end of bonnet 11. Opening 543 is normally covered with a lid 543.

More specifically, in bonnet 11, reservoir tank 528 is disposed upright just behind engine 10 between front wheels 9 and rear wheels 7. The bottom of reservoir tank 528 is disposed at the vertical intermediate position of the inside of bonnet 11. A cylindrical upright fluid-supply portion 528a projects upward from the top of reservoir tank 528. A breather 542, also serves as a fluid-supply opening of reservoir tank 528, is disposed on the top of fluid-supply portion 528a so as to face the opening of the dashboard covered with lid 543. Reservoir tank 528 is fluidly connected to the fluid sump of rear transaxle I through drain pipe 29, and to the fluid sump of front transaxle 2 through drain pipe 30, so as to absorb excessive fluid from the respective fluid sumps.

Since reservoir tank 528 is disposed between rear wheels 7 and front wheels 9, reservoir tank 528 approaches the fore-and-aft middle portion of vehicle 500 so as to ensure good balance of vehicle 500 in the fore-and-aft direction. Due to the upright shape of reservoir tank 528, the fluid in reservoir tank 528 is prevented from being contaminated with air bubbles when vehicle 500 travels on a slope. Further, reservoir tank 528 disposed just behind engine 10 is easily subjected to the air for cooling engine 10.

Further, vehicle 500 is provided with mower hangers 491 pivoted on pivots 92 disposed coaxially to axles 8, so as to suspend mower unit 20 through link rods 91a, similar to those of vehicle 400 in FIG. 14.

With respect to front transaxle 2, in each of the foregoing embodiments of vehicles 100, 200, 300, 400 and 500, referring to FIGS. 1 to 25, the arrangement of fixed displacement hydraulic motor M2 and variable displacement hydraulic motor M3 for respective axles 8 may be replaced with an arrangement of a single (variable displacement) hydraulic motor and a differential gear unit driven by the hydraulic motor. Left and right axles 8 mutually connected through the differential gear unit can be differentially driven similar left and right axles 8 driven by respective hydraulic motors M2 and M3. The single variable displacement hydraulic motor ensures acceleration of front wheels 9 during turning of the vehicle. A pair of hydraulic pressure fluid supply-and-delivery ports of the single hydraulic motor, and pipes interposed between these ports and ports 1a and 1b on rear transaxle 1 can be disposed on front transaxle housing 2H similar to any of the foregoing arrangements of ports 2a and 2b and pipes 23 and 26.

Sixth Embodiment

Figure 26:
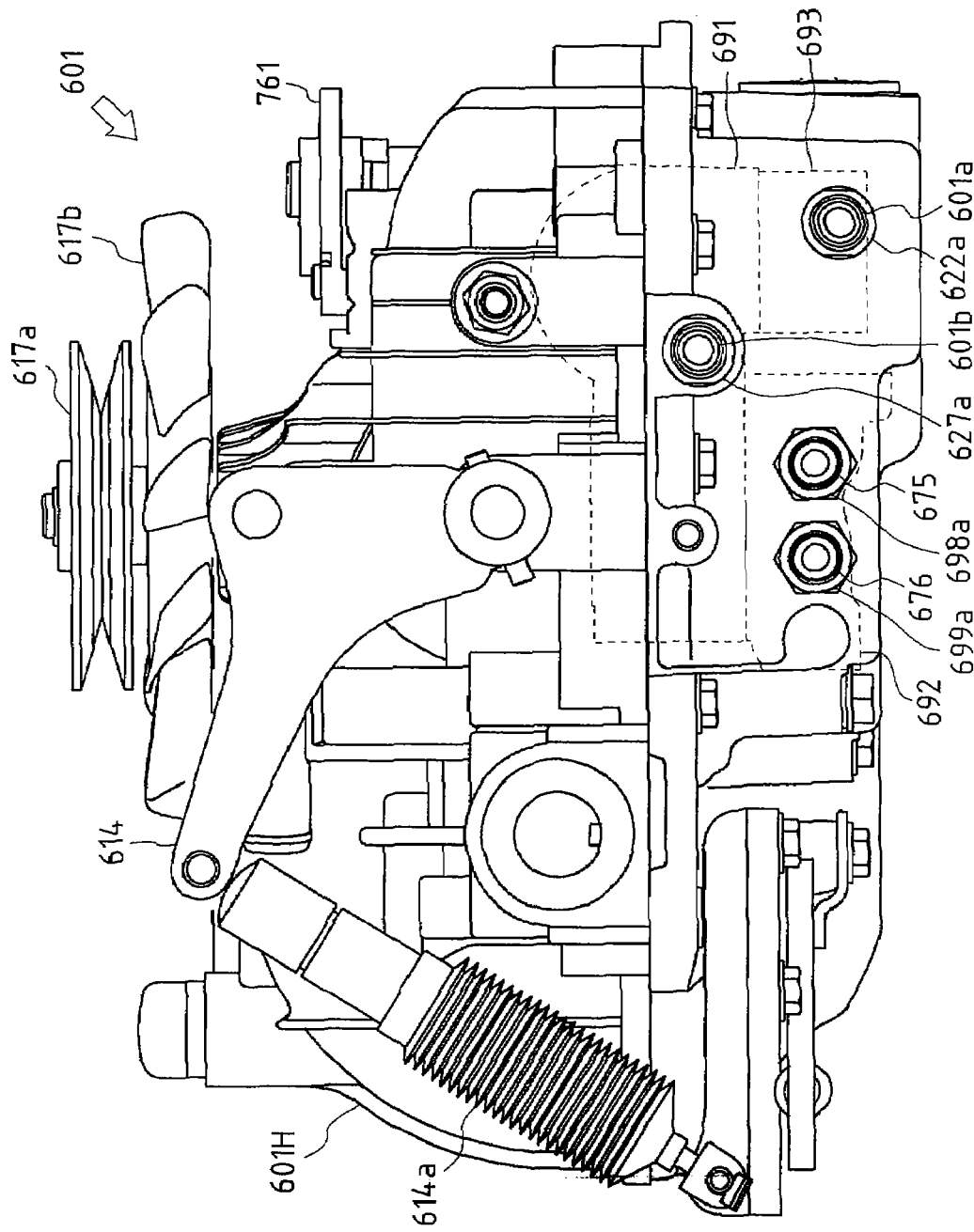
FIG. 26 is a right side view of a rear transaxle according to a sixth embodiment.

Referring to FIGS. 16 to 32, a transaxle 601 may replace rear transaxle 1 in the foregoing embodiments of vehicles 100 to 500 referring to FIGS. 1 to 24. Referring to FIG. 26, transaxle 601 includes housing 601H which is provided on a right side surface thereof with ports 601a and 601b for supply and delivery of hydraulic pressure fluid for driving axles, and with ports 675 and 676 for supply and delivery of hydraulic pressure fluid for driving an auxiliary (e.g., power steering) device. A hydraulic circuit of a hydraulic four-wheel driving vehicle equipped with transaxle 601 can be similar to the hydraulic circuit shown in FIG. 2, on the assumption that a hydraulic pump P6 and a hydraulic motor M6 in transaxle 601 coincide to hydraulic pump P and hydraulic motor M1 in transaxle 1, and almost other concerned parts and devices of transaxle 601 coinciding to those of transaxle 1 shown in FIG. 2 are marked by respective notations shown in FIG. 2 plus 600.

Figure 28:
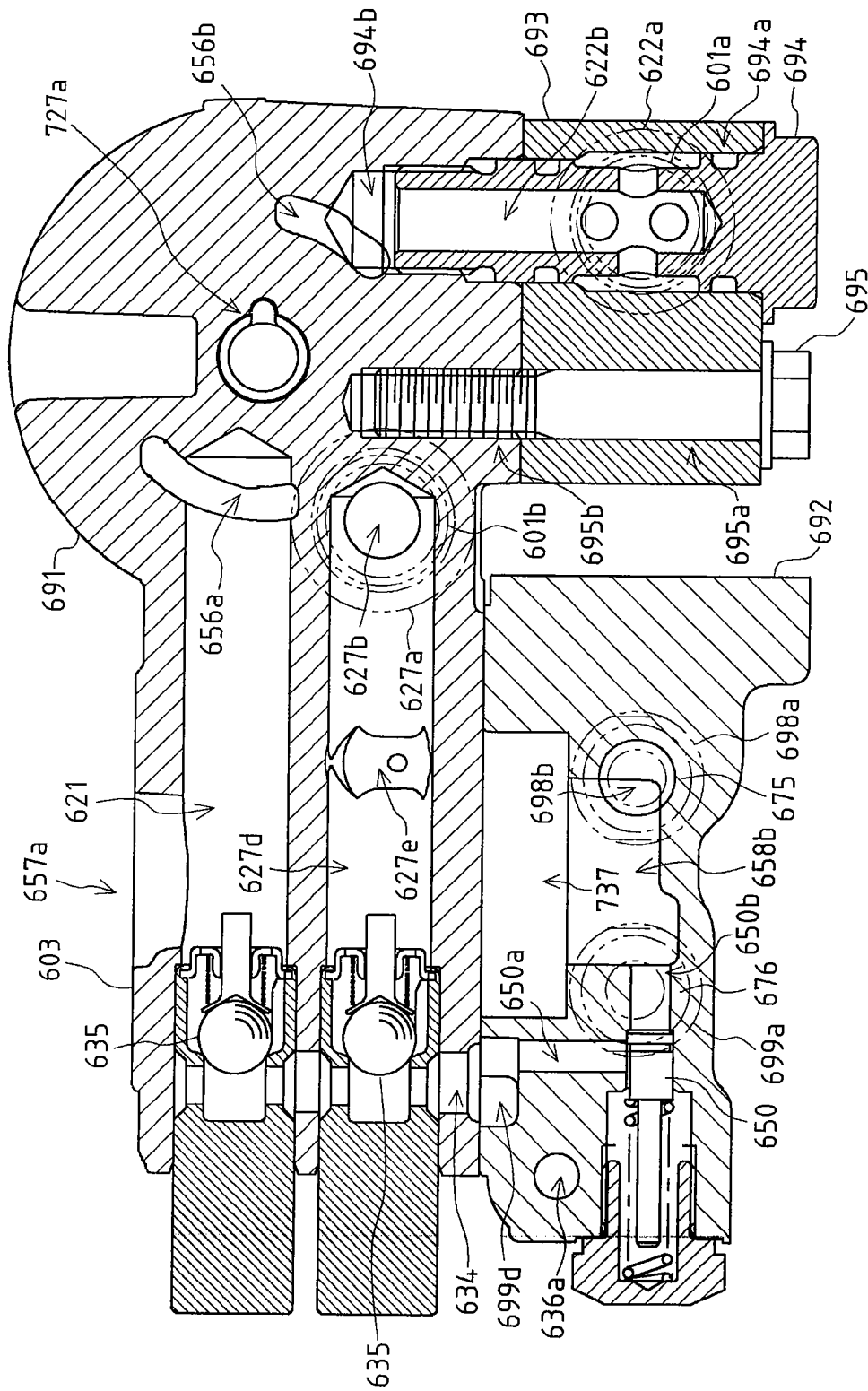
FIG. 28 is a sectional right side view of the rear transaxle according to the sixth embodiment, showing a center section and a charge pump casing in a transaxle housing.
Figure 29:
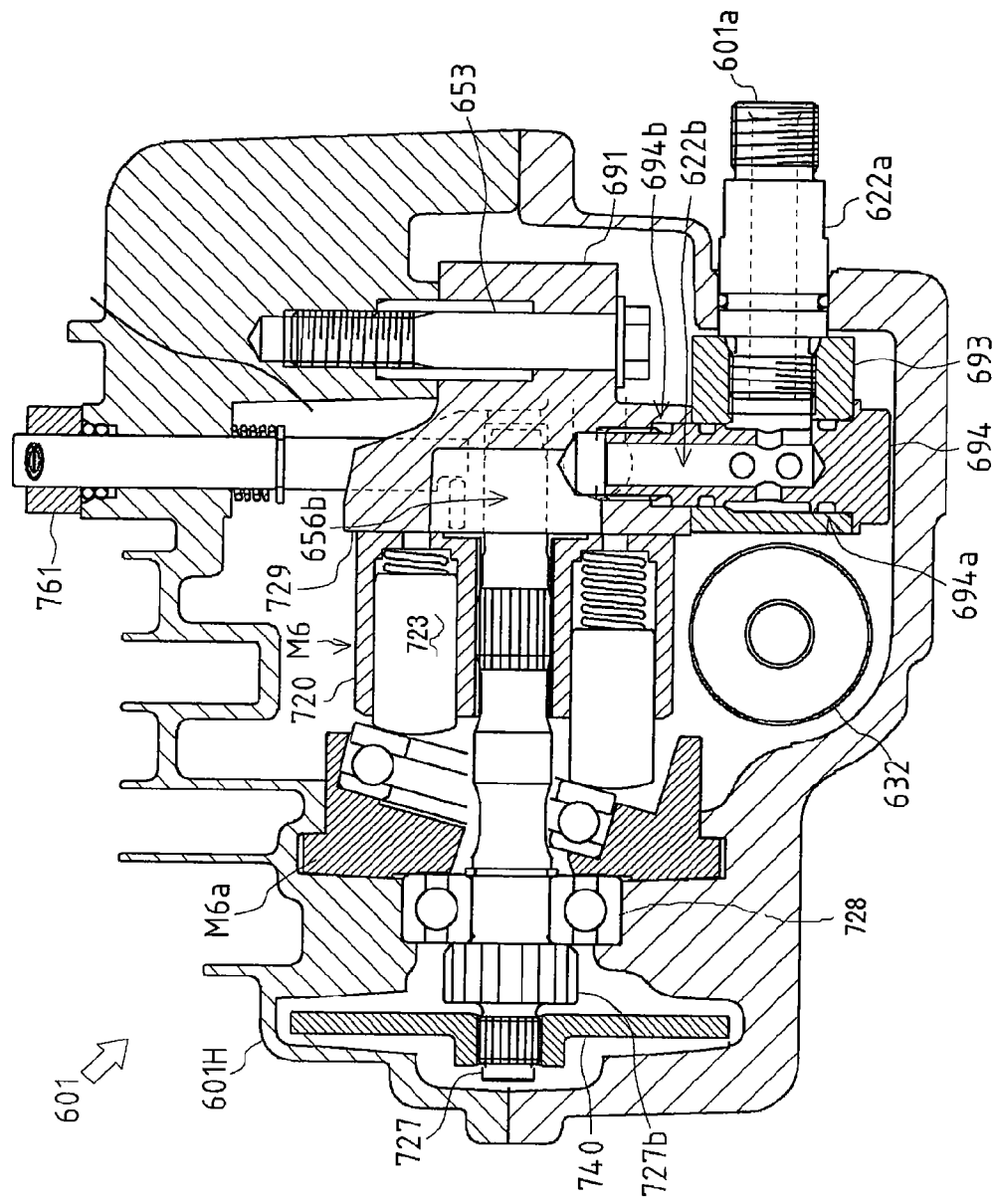
FIG. 29 is a cross sectional view of the rear transaxle taken along an A-A line of FIG. 27.

The main feature of transaxle 601 is that an adapter 693, formed therein with a fluid passage hole to be interposed between port 601a and a passage in a center section 691, is detachably attached to center section 691, as shown in FIGS. 28 and 29, and a joint plug 627a including port 601b is fitted into center section 691 to be connected to another passage in center section 691, as shown in FIGS. 28 and 32(b).

Figure 27:
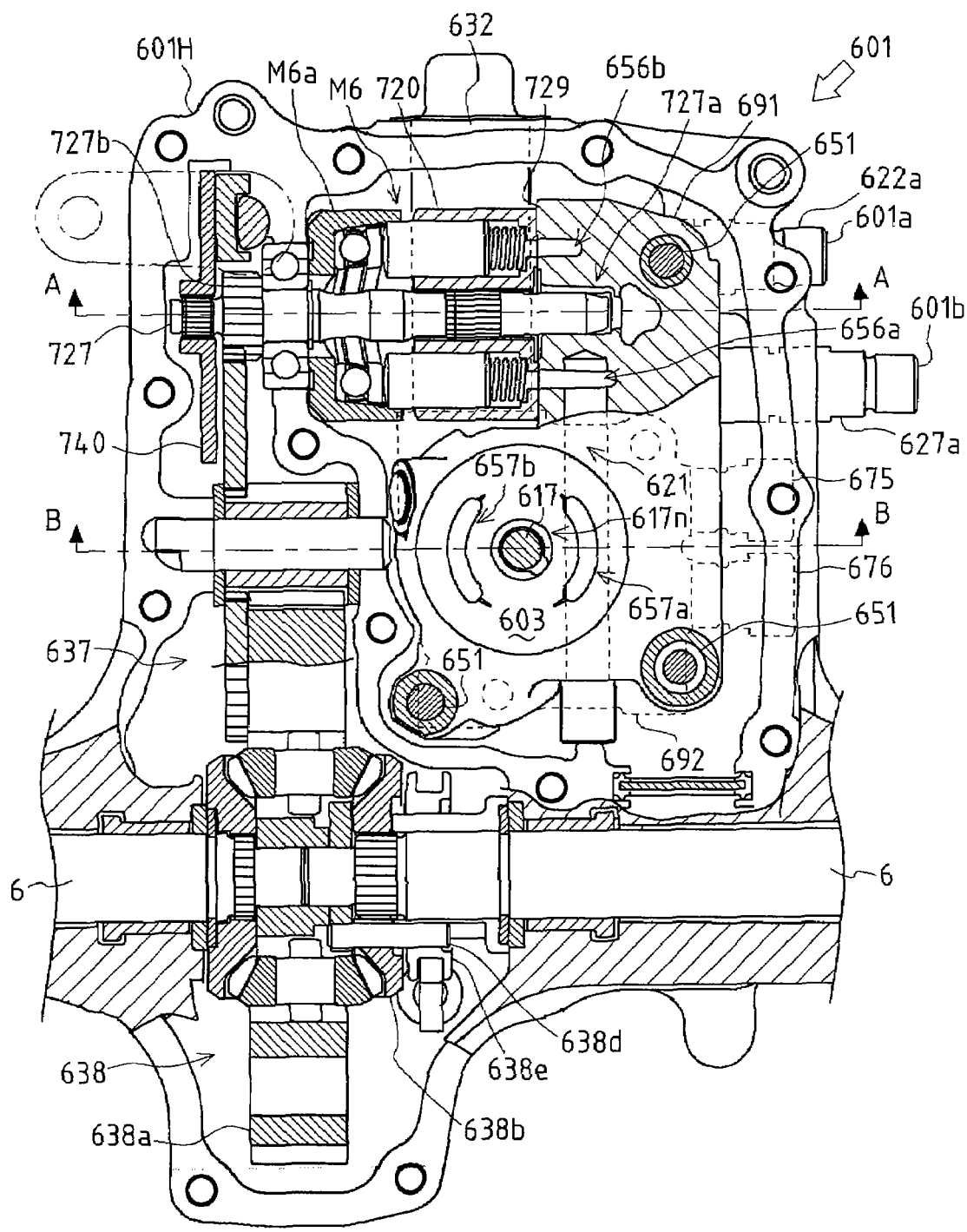
FIG. 27 is a sectional plan view of the rear transaxle according to the sixth embodiment.

A general structure and function of transaxle 601 will be described. As shown in FIG. 27, the inner space of transaxle housing 601H is partitioned by a partition wall between a hydraulic circuit chamber and a transmission gear chamber. Hydraulic pump P6 and hydraulic motor M6 are disposed in the hydraulic circuit chamber, and a deceleration gear train 637, a differential gear unit 638 and axles 6 are disposed in the transmission gear chamber. As shown in FIGS. 26 and 29, transaxle housing 601H is constituted by upper and lower halves joined to each other through bolts 653.

Figure 30:
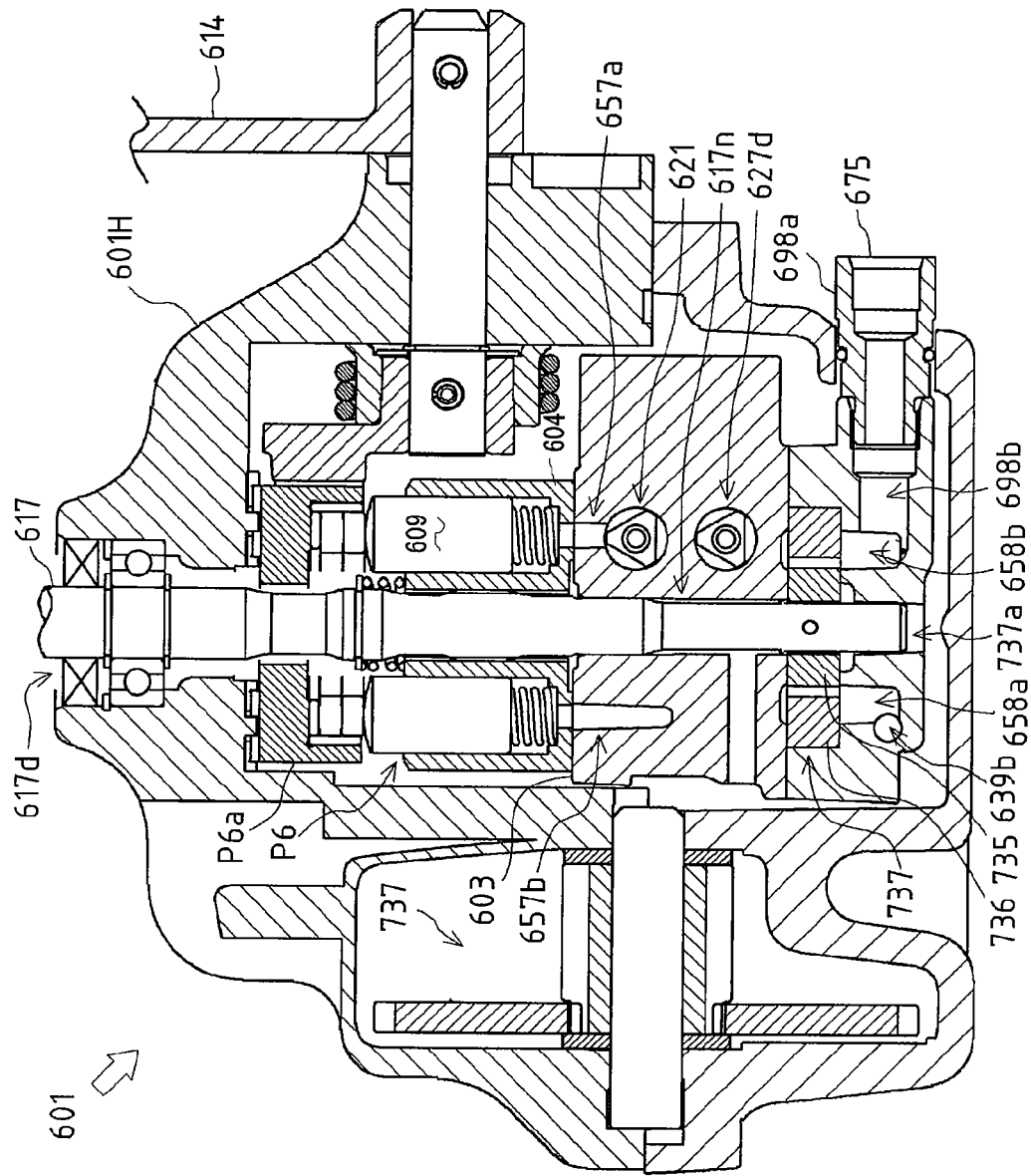
FIG. 30 is a cross sectional view of the rear transaxle taken along a B-B line of FIG. 27.

Referring to FIG. 30, an upper portion of an input shaft 617 projects vertically upward from transaxle housing 601H, and is fixedly provided thereon with input pulley 617a so as to be drivingly connected to engine 10 through belt 18, and is fixedly provided thereon with cooling fan 617b for cooling transaxle housing 601H under pulley 617a. In transaxle housing 601H, vertical input pulley 617 serves as the rotary axial shaft of hydraulic pump P6.

Variable displacement hydraulic pump P6, having input shaft 617 serving as the vertical rotary axis thereof, is vertically mounted onto a rear top surface of center section 691 at which kidney ports 657a and 657b are opened. As shown in FIG. 27, fixed displacement hydraulic motor M6, having a laterally (leftward) horizontal motor shaft 727 serving as the rotary axis thereof, is mounted onto a front left side surface of center section 691 at which kidney ports 656a and 656b are opened, so as to be fluidly connected to hydraulic pump P6. Motor shaft 727 is drivingly connected to deceleration gear train 637 so as to transmit the output force of hydraulic motor M6 to axles 6 through deceleration gear train 637 and differential gear unit 638.

As shown in FIGS. 28 and 29, vertical input shaft 617 penetrates center section 691 and is inserted into a charge pump casing 692 attached to the bottom surface of center section 691 so as to serve as the drive shaft of charge pump 633 in charge pump casing 692. Charge pump 633 sucks fluid from the fluid sump in transaxle housing 601H so as to supply fluid to the axle-driving hydraulic circuit, and to the auxiliary device (power steering) driving hydraulic circuit through ports 675 and 676.

As shown in FIGS. 26 and 30, speed control lever 614 operatively connected to speed control pedal 13 is pivoted on transaxle housing 601H so as to control the tilt angle and direction of a movable swash plate P6a of hydraulic pump P6.

The structure of the hydraulic circuit system in transaxle 601 will be more detailed. As shown in FIGS. 27 and 32(b), center section 691 is fastened to an inside wall of transaxle housing 601H through bolts 651. As shown in FIG. 27, the circular rear top surface of center section 691, onto which hydraulic pump P6 is mounted, serves as a pump contact surface 603. In pump contact surface 603, a right pump kidney port 657a and a left pump kidney port 657b are laterally symmetrically opened upward, and a vertical shaft hole 617n, into which input shaft 617 is rotatably inserted, is opened upward between right and left pump kidney ports 657a and 657b. Vertical shaft hole 617n is passed through center section 691 and also opened downward at the bottom surface of center section 691, as shown in FIG. 30.

As shown in FIGS. 27, 28 and 30, a cylinder block 604 of hydraulic pump P6 is slidably rotatably fitted onto pump contact surface 603 so as to open cylinder holes therein to kidney ports 657a and 657b, and is not relatively rotatably fitted on input shaft 617 passed through shaft hole 617n (in a spline-engaging manner). Pistons 609 are reciprocally slidably fitted in the respective cylinder holes of cylinder block 604, and project at heads thereof outward from cylinder block 604 so as to abut against movable swash plate P6a. Input shaft 617 projects upward from cylinder block 604, freely penetrates movable swash plate P6a, and projects upward from the top wall of rear transaxle housing 1H so as to be fixedly provided thereon with pulley 617a and cooling fan 617b, as mentioned above. Input shaft 617 inserted in shaft hole 617n also projects downward from center section 691 into charge pump casing 692 so as to serve as the drive shaft of charge pump 633.

Referring to FIGS. 27 and 28, a fore-and-aft horizontal fluid passage hole 621 (coinciding to fluid passage hole 21 in transaxle 1) interposed between hydraulic pump P6 and motor M6 is bored in center section 101, so as to be connected at a rear upper end portion to right pump kidney ports 657a, and at a front upper end portion thereof to a rear motor kidney port 656a. In center section 691 is bored therein with a part of a passage interposed between hydraulic pump P6 and port 601b (coinciding to passage 27 of transaxle 1) comprising fluid passage holes 627b, 627d and 627e. Fluid passage hole 627e is extended rightwardly downward from left pump kidney port 657b to a fore-and-aft intermediate portion of fluid passage hole 627d. Fluid passage hole 627d is fore-and-aft horizontally extended under fluid passage hole 621 in parallel. Fluid passage hole 627b is extended horizontally rightward from a front end portion of fluid passage hole 627d, and opened outward at a right side surface of center section 691. Joint plug 627a provided at the outer end with port 601b is inserted horizontally leftward into fluid passage hole 627b through a right sidewall of transaxle housing 601H, so as to be fluidly connected to left pump kidney port 657b.

As shown in FIGS. 27 and 28, the circular front left side surface of center section 291, onto which hydraulic motor M6 is mounted, serves as a motor contact surface 729. In motor contact surface 729, rear motor kidney port 756a and front motor kidney port 756b are symmetrically opened leftward, and a lateral horizontal shaft hole 727a, into which motor shaft 727 is rotatably inserted, is opened leftward between rear and front motor kidney ports 656a and 656b.

As shown in FIGS. 27 and 29, a cylinder block 720 of hydraulic motor M6 is slidably rotatably fitted onto motor contact surface 729 so as to open cylinder holes therein to kidney ports 656a and 656b, and is not-relatively rotatably fitted on motor shaft 727 inserted in shaft hole 727a (in a spline-engaging manner). Pistons 723 are reciprocally slidably fitted in the respective cylinder holes of cylinder block 720, and project at heads thereof outward from cylinder block 720 so as to abut against a fixed swash plate M6a.

As shown in FIGS. 27 and 29, motor shaft 727, rotatably fitted at a right end portion thereof in shaft hole 727a of center section 691, is journalled through a bearing 728 by the partition wall between the hydraulic circuit chamber and the transmission gear chamber, and extended at a left end portion thereof into the transmission gear chamber so as to be provided thereon with a gear 727b and a brake disc 740.

Referring to FIGS. 27 and 28, rear motor kidney port 656a is connected to right pump kidney port 657a through horizontal fluid passage hole (passage) 621, as mentioned above.

Referring to FIGS. 28, 29 and 32(b), a passage interposed between hydraulic motor M6 and port 601a (coinciding to passage 22 of transaxle 1) is formed by adapter 693 attached to the bottom surface of center section 691, horizontal joint plug 622a screwed into adapter 693, and a vertical fluid passage plug 694 fitted into center section 691 through adapter 693. In this regard, a vertical hole 694b is bored vertically downward from front motor kidney port 656b and downwardly opened at the bottom surface of center section 691. Center section 691 and adapter 693 are bored with coaxial vertical bolt holes 695b and 695a. Adapter 693 is fastened to this bottom surface of center section 691 through a vertical bolt 695 screwed into bolt holes 695a and 695b. A vertical hole 694a is bored through adapter 693 so as to be coaxially connected at the top thereof to hole 694b in center section 691. Vertical fluid passage plug 694 is upwardly inserted into hole 694b through hole 694a. A vertical axial fluid passage hole 622b is bored in plug 694. Hole 622b is opened at the top of plug 694 in hole 694b within center section 691, and opened at a vertical intermediate portion of plug through radial horizontal ports into hole 694a. A lateral horizontal tapped hole is bored in adapter 693 so as to be connected vertical hole 694a and opened rightwardly outward. Joint plug 622a is screwed from the rightward outside of housing 601H into the horizontal tapped hole in adapter 622a through the right side wall of transaxle housing 601H. Joint plug 622a includes a horizontal penetrating axial fluid passage hole whose outer right end serves as port 601a. The fluid passage hole in joint plug 622a is opened at the inward end into hole 694a so as to be fluidly connected to vertical fluid passage hole 622b in plug 694, thereby fluidly connecting port 601a to motor kidney port 656b opened to hydraulic motor M6.

Alternatively, adapter 693 may be formed therein with a fluid passage without fluid passage plug 694. Alternatively, both fluid passages to respective ports 601a and 601b may be formed in adapter 693. Alternatively, adapter 693 may be formed therein with a fluid passage to port 601b, and a joint plug including port 601a may be provided onto center section 691.

Joint plugs 622a and 627a are screwed into the tapped hole in adapter 693 and tapped fluid passage hole 627b, respectively. Alternatively, joint plugs 622a and 627a may be screwed in respective tapped holes within the wall of transaxle housing 601H, similar to joint plug 22a (27a) of FIG. 33(a), or they may be fastened to the outer side surface of transaxle housing 601H through a flange, thereby improving the fluid tightness thereof. In either of the two cases, joint plugs 622a and 627a may be just slidably fitted into the hole in adapter 693 and fluid passage hole 627b, respectively (without screwing engagement).

Referring to FIG. 28, center section 691 is bored in a rear portion thereof with a vertical fluid passage hole 634, and provided therein with upper and lower charge check valves 635 interposed between fluid passage hole 634 and respective upper and lower parallel fluid passage holes 621 and 627d. Each of charge check valves 635 allows only flow from fluid passage hole 634 to corresponding fluid passage hole 21 or 27d (i.e., prevents backflow to fluid passage hole 634). Fluid passage hole 634 is opened downward at the bottom surface of center section 691, and connected an upwardly opened fluid passage hole 699*d* bored in charge pump casing 692.

Figure 31:
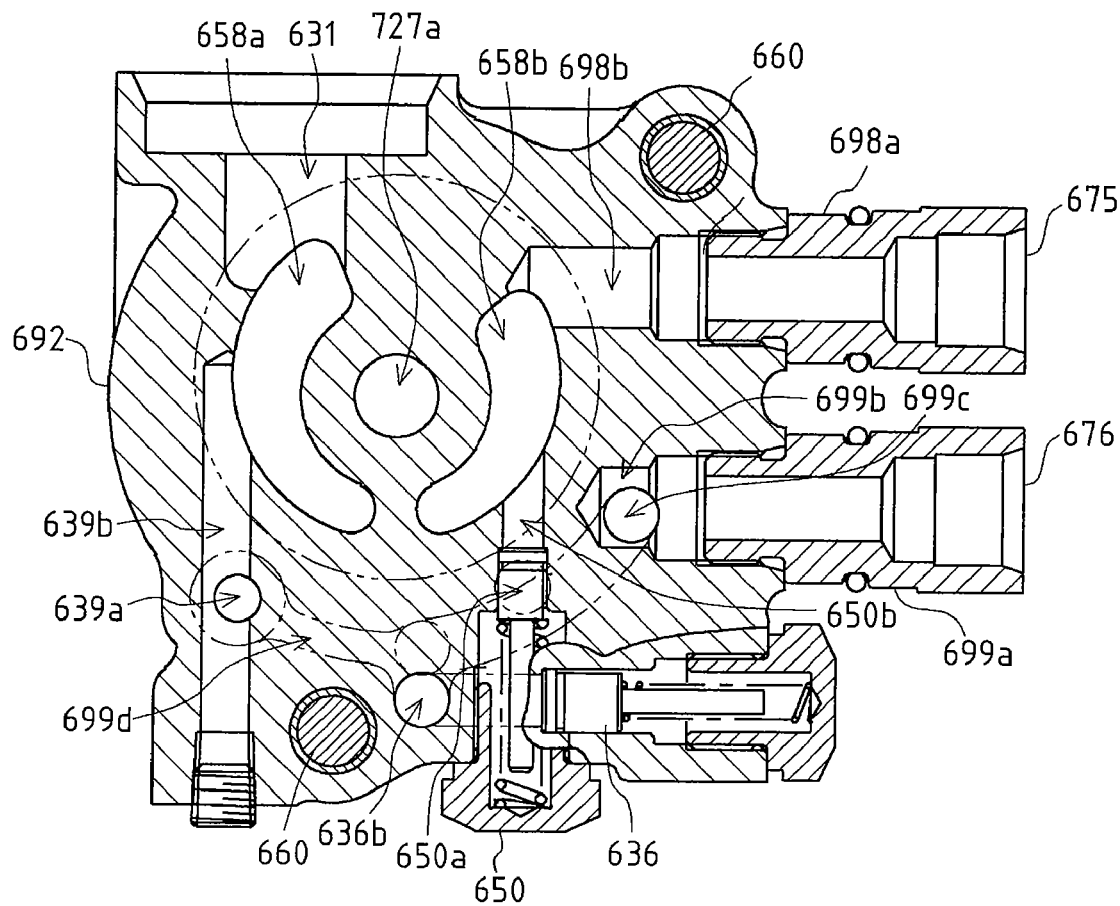
FIG. 31(*a*) is a sectional plan view of the charge pump casing in the rear transaxle according to the sixth embodiment, and FIG. 31(*b*) is a sectional side view of the charge pump casing.
Figure 31:
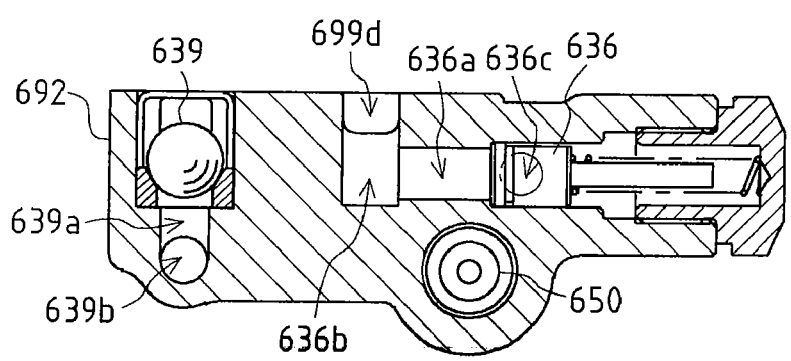
Figure 32:
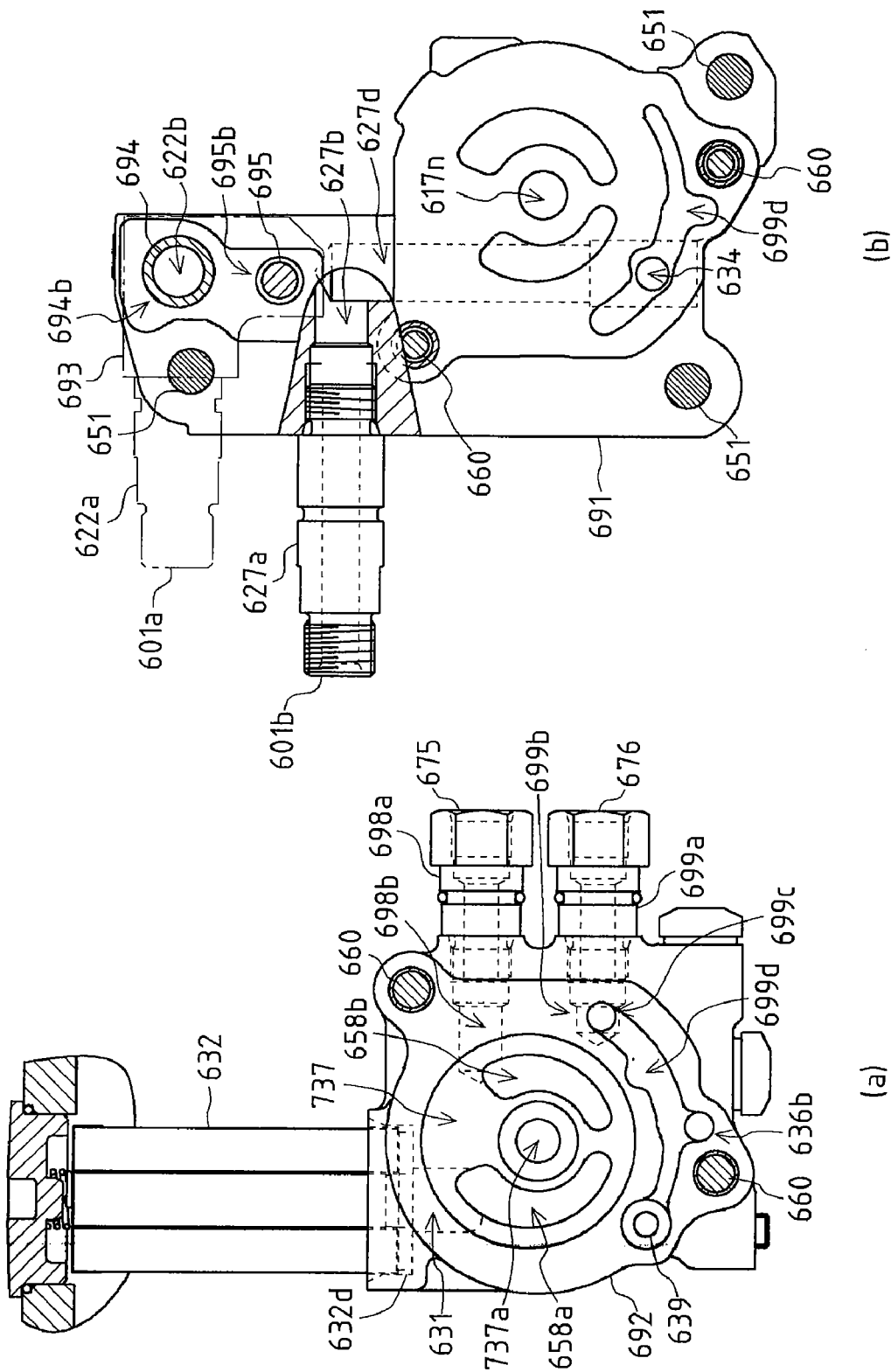
FIG. 32(*a*) is a plan view of a bottom surface of the center section joined to the charge pump casing, and FIG. 32(*b*) is a plan view of a top surface of the charge pump casing joined to the center section, wherein the center section and the charge pump casing are provided for the rear transaxle according to the sixth embodiment.

Referring to FIGS. 28, 30, 31(*a*), 31(*b*), 32(*a*) and 32(*b*), the structure charge pump 633 and charge pump casing 692 will be described. As shown in FIGS. 32(*a*) and 32(*b*), charge pump casing 692 is fastened to center section through bolts 660. As shown in FIG. 32(*a*), charge pump casing 692 is bored with a vertical circular cylindrical trochoid gear chamber 737 which is opened upward to face the bottom surface of center section 691. As shown in FIGS. 30 and 32(*a*), circular (in plan view) shaft hole 737*a*, into which the lower portion of input shaft 617 is rotatably inserted, is extended downward from a bottom center portion of trochoid gear chamber 737. Charge pump casing 692 is bored from the bottom surface of trochoid gear chamber 737 with a vertical suction port 658*a* on the left side of shaft hole 737*a*, and with a vertical delivery port 658*b* on the right side of shaft hole 737*a*. As shown in FIG. 30, a trochoid gear consisting of an inner gear 735 and an outer gear 736 is disposed in gear chamber 737. Inner gear 735 is fixed on input shaft 617 inserted in shaft hole 737*a*, so as to be rotatable integrally with input shaft 617.

As shown in FIG. 32(*a*), a fore-and-aft horizontal fluid suction passage hole 631 is bored in charge pump casing 692, connected at a rear end thereof to suction port 658*a*, and forwardly outward opened at a recess 632*d* formed on the front side surface of charge pump casing 692. A horizontal fluid filter 632 is fitted at a rear end thereof into recess 632*d* so as to be fluidly connected to suction passage hole 631.

Referring to FIGS. 30 and 32(*a*), a lateral horizontal fluid passage hole 698*b* is bored in charge pump casing 692, connected at a left end thereof to delivery port 658*b*, and connected at a right end thereof to a lateral horizontal joint plug 698*a* screwed into charge pump casing 692. A right end portion of joint plug 698*a* projects rightwardly outward from the right side surface of charge pump casing 692, and from the right side surface of rear transaxle housing 601H, so as to be provided with rightwardly outward opened port 675. In this way, a passage (coinciding to passage 98 of transaxle 1) interposed between the delivery port of charge pump 633 and port 675 is constituted by fluid passage hole 698*b* and joint plug 698*a*.

Referring to FIGS. 32(*a*) and 32(*b*), a downwardly opened groove of charge pump casing 691 and an upwardly opened groove of charge pump 692 along a rear side edge of trochoid gear chamber 737 coincide with each other so as to form a substantially lateral fluid passage hole 699*d*. Referring to FIGS. 31(*a*) and 32(*a*), a vertical fluid passage hole 699*c* is extended downward from a right end portion of fluid passage hole 699*d*, and connected at the bottom thereof to a lateral horizontal fluid passage hole 699*b*. Fluid passage hole 699*b* is opened rightwardly outward at the right side surface of charge pump casing 692. A joint plug 699*a* is screwed into fluid passage hole 699*b*. A right end portion of joint plug 699*a* projects rightwardly outward from the right side surface of charge pump casing 692, and from the right side surface of transaxle housing 601H, so as to be provided with rightwardly outward opened port 676 adjacent to port 675.

Referring to FIGS. 28 and 32(*b*), the bottom opening of vertical fluid passage hole 634 is connected to an intermediate portion of fluid passage hole 699*d*. As mentioned above, in center section 691, fluid passage hole 634 is connected to fluid passage holes 621 and 627*d* through respective charge check valves 635. In this way, joint plug 699*a* and fluid passage holes 699*b* and 699*c* constitute a passage (coinciding to passage 99 of transaxle 1) interposed between port 676 and either lower pressurized passage hole 621 or 627*d* connected to the suction side of hydraulic pump P6 through corresponding charge check valve 635.

Referring to FIGS. 31(*a*), 31(*b*) and 32(*a*), a check valve 639 is disposed at a left end portion of fluid passage hole 699*d*. A vertical fluid passage hole 636*b* is extended downward from an intermediate portion of fluid passage hole 699*d* to a relief valve 636. Further, a fore-and-aft horizontal drain hole 636*c* is extended from relief valve 636 and opened outward at the rear side surface of charge pump casing 692. Check valve 636 absorbs excessive fluid from fluid passage hole 699*d* through hole 636*c* and drains it to the fluid sump through drain hole 636*c*. Referring to FIGS. 28 and 31(*a*), a vertical fluid passage hole 650*a* is extended downward from fluid passage hole 699*d* to a relief valve 650. Further, a fore-and-aft horizontal fluid passage hole 650*b* is extended from relief valve 650 to delivery port 658*b* of charge pump 633. Relief valve 650 absorbs excessive fluid from fluid passage hole 699*d* and supplies it to delivery port 658*b* of charge pump. Further description of check valve 639 and relief valves 636 and 650 is omitted because they are similar to respective check valve 39 and relief valves 36 and 50 in transaxle 1.

When transaxle 601 replaces rear transaxle 1 in each of the foregoing vehicles 100 to 500, ports 601*a*, 601*b*, 675 and 676 are disposed on the respective right outer ends of joint plugs 622*a*, 627*a*, 698*a* and 699*a* projecting rightwardly outward from the right side wall of rear transaxle housing 601H. Therefore, pipes 23, 26, 81 and 82 can be compactly collected to be connected to respective ports 601*a*, 601*b*, 675 and 676. Alternatively, for the arrangement of vehicle 100 as shown in FIG. 5, transaxle 601 may be disposed so that ports 601*a*, 601*b*, 675 and 676 are provided on the respective left outer ends of joint plugs 622*a*, 627*a*, 698*a* and 699*a* projecting leftwardly outward from the left side wall of rear transaxle housing 601H.

As shown in FIG. 26, front axle-driving hydraulic fluid port 601*a* is disposed higher than rear axle-driving hydraulic fluid port 601*b*. As shown in FIGS. 27 and 32(*b*), port 601*b* is disposed rightward from port 601*a*. Due to this arrangement of ports 601*a* and 601*b*, pipes 23 and 27 connected to respective ports 601*a* and 601*b* are can be smoothly extended forwardly upward without stressing bend, thereby being further compactly collected. Front and rear auxiliary (power steering) device driving hydraulic fluid ports 675 and 676 are disposed at the same height.

A mechanism for controlling the tilt angle and direction of movable swash plate P6*a* of hydraulic pump P6, including speed control arm 614, is omitted because it is similar to that of transaxle 1. Additionally, as shown in FIG. 26, transaxle 601 is provided with a shock absorber 614*a*, pivotally interposed between a tip of speed control arm 614 and a right rear portion of transaxle housing 601H. When depressed speed control pedal 13 is suddenly released from the depression force, shock absorber 614*a* slows down the neutral-returning motion of movable swash plate P6*a*, causing abnormal stress onto engine 10 and the traveling power transmission system, against the neutral-biasing force of a spring (coinciding to spring 115).

In transaxle 601, control lever 614 and center section 691 may be provided with a mechanism for expanding a neutral dead zone of hydraulic pump P6 relative to the tilt angle of swash plate P6*a* similar to the mechanism including the orifice members having orifices 171*a*, 172*a* fitted in center section 101 and groove 114*a* formed in arm 114 as shown in FIG. 21.

Referring to FIG. 26, transaxle 601 is provided with a forcible relief valve mechanism for draining fluid from the HST circuit when the vehicle is towed or for another purpose, similar to that shown in FIG. 19. In this regard, as shown in FIG. 26, a forcible relief lever 761 is pivoted on housing 601H so as to operate the forcible relief valve mechanism.

The flow of fluid in HST circuit HC1 (for driving axles 6 and 8 and for driving power steering cylinder 79) where transaxle 601 replaces rear transaxle 1, whether the vehicle travels forward or backward, is omitted because it is similar to the foregoing flow referring to FIG. 2, on the assumption that hydraulic pump P6 with swash plate P6a and hydraulic motor M6 serve as hydraulic pump P with swash plate Pa and hydraulic motor M1, respectively; fluid passage hole 621 serves as passage 21; the fluid passage formed by center section 691, adapter 693 and fluid passage plug 694 serves as passage 22; joint pipe 627a and fluid passage holes 627b, 627d and 627e constitute passage 27; fluid passage hole 698b and joint plug 698a constitute passage 98; joint plug 699a and fluid passage holes 699b and 699c constitute passage 99; and suction fluid passage hole 631, fluid filter 632, charge pump 633, fluid passage hole 634, check valves 635, relief valve 636, check valve 639 and relief valve 650 serve as respective components 31, 32, 33, 34, 35, 36, 39 and 50.

The drive train from hydraulic motor M6 to axles 6 in transaxle 601 is similar to that from hydraulic motor M1 to axles 6 in transaxle 1, on the assumption that motor shaft 727, gear 727b, brake disc 740, deceleration gear train 637 and differential gear unit 638 including a bull gear 638a and a differential side gear 638b serve as respective components 127, 127b, 140, 37, 38, 38a and 38b. Additionally, in transaxle 601, differential gear unit 638 is provided with a differential lock mechanism, as shown in FIG. 27. The differential lock mechanism comprises a differential lock pin 638d and a shifter 638e. Shifter 638 is manually operated from the outside of transaxle housing 601H, so as to slide along (right) axle 6. Differential lock pin 638d integrally movably engages with shifter 638d and is axially slidably fitted in (right) differential side gear 638b. When shifter 638e is operated for differential locking, shifter 638e slides (leftward) so as to push differential lock pin 638d into a hole of bull gear 638a through (right) differential side gear 638b, as shown in FIG. 27, thereby locking (right) axle 6 to bull gear 638a, whereby left and right axles 6 become rotatable integrally with each other. When shifter 638e is operated for canceling the differential locking, shifter 638e slides rightward so as to withdraw differential lock pin 638d from the hole of bull gear 638b, thereby allowing differential rotation of left and right axles 6.

It is further understood by those skilled in the art that the foregoing description is a preferred embodiment of the disclosed apparatus and that various changes and modifications may be made in the invention without departing from the spirit and scope thereof defined by the following claims.

What is claimed is:

1. A hydraulically driven working vehicle comprising:
   a frame including a pair of left and right side plates extended in the fore-and-aft direction of the vehicle;
   a first transaxle supported by one of front and rear portions of the frame, the first transaxle including:
   a hydraulic pump,
   a first hydraulic motor fluidly connected to the hydraulic pump,
   a first axle driven by the first hydraulic motor, and
   a first transaxle housing incorporating the first hydraulic motor and the first axle, wherein the first transaxle housing is provided with a pair of outwardly opened first ports fluidly connected to the hydraulic pump and the first hydraulic motor, respectively;
   a second transaxle supported by the other rear or front portion of the frame, the second transaxle including:
   a second hydraulic motor fluidly connected to the hydraulic pump,
   a second axle driven by the second hydraulic motor, and
   a second transaxle housing supported by the other rear or front portion of the frame, and incorporating the second hydraulic motor and the second axle, wherein the second transaxle housing is provided with a pair of second ports fluidly connected to the second hydraulic motor;
   a prime mover supported by the frame between the first and second transaxles;
   a traveling power transmission system supported by the frame between the prime mover and the first transaxle so as to drivingly connect the hydraulic pump to the prime mover;
   a working device disposed under the frame between the first and second transaxles;
   a working power transmission system supported by the frame between the prime mover and the working device so as to drivingly connect the working device to the prime mover; and
   a pair of axle-driving hydraulic pressure fluid pipes interposed between the pair of first ports and the pair of second ports so as to fluidly connect the second hydraulic motor to the hydraulic pump, wherein the pipes include respective fore-and-aft extended portions which are extended in the fore-and-aft direction of the vehicle between an inside surface of at least one of the left and right side plates of the frame and the traveling and working power transmission systems.

2. The hydraulically driven working vehicle according to claim 1, wherein the fore-and-aft extended portions of both of the pipes are extended along the inside surface of one of the left and right side plate.

3. The hydraulically driven working vehicle according to claim 1, wherein the fore-and-aft extended portion of one of the pipes is extended along the inside surface of one of the left and right side plates, and the fore-and-aft extended portion of the other pipe is extended along the inside surface of the other right or left side plate.

4. The hydraulically driven working vehicle according to claim 3, at least one of the pipes including:
   a first rigid pipe portion connected to one of the first ports;
   a second rigid pipe portion connected to one of the second ports; and
   a flexible pipe portion interposed between the first and second rigid pipe portions, wherein the flexible hose is extended along one of the left and right side plates of the frame.

5. The hydraulically driven working vehicle according to claim 4, the at least one of the pipes further including:
   a swivel joint disposed between the flexible pipe portion and at least one of the first and second rigid pipe portions.

6. The hydraulically driven working vehicle according to claim 1, at least one of the pipes including:
   a rigid pipe portion connected to one of the first ports and extended along one of the left and right side plates of the frame; and
   a flexible pipe portion interposed between the rigid pipe portion and one of the second ports.

7. The hydraulically driven working vehicle according to claim 1, the first transaxle housing being provided with a pair of outwardly opened third ports, further comprising:

a hydraulic power steering valve disposed on the frame; and a pair of power steering hydraulic pressure fluid pipes interposed between the hydraulic power steering valve and the pair of third ports and extended along at least one of the axle-driving hydraulic pressure fluid pipes.

8. The hydraulically driven working vehicle according to claim 7, wherein the pair of first ports and the pair of third ports are disposed on the same side surface of the first transaxle housing.

9. The hydraulically driven working vehicle according to claim 1, the first transaxle, in which the first transaxle housing incorporates the hydraulic pump, further including:

a center section disposed in the first transaxle housing and interposed between the hydraulic pump and the first hydraulic motor, the center section being provided with a pair of first and second pump ports fluidly connected to the hydraulic pump, a pair of first and second motor ports fluidly connected to the first hydraulic motor, and a passage interposed between the first pump port and the first motor port, wherein the pair of first ports are fluidly connected to the second pump port and the second motor port, respectively.

10. The hydraulically driven working vehicle according to claim 9, the first transaxle further including:

a charge pump disposed in the first transaxle housing so as to be driven together with the hydraulic pump by the power from the prime mover through the traveling power transmission system, wherein one of the third ports is fluidly connected to the charge pump, and wherein the other third port is fluidly connected to a fluid-suction side of the hydraulic pump.

11. The hydraulically driven working vehicle according to claim 10, the first transaxle further including:

a charge pump casing incorporating the charge pump, the charge pump casing being disposed in the first transaxle housing and connected to the center section, wherein the charge pump casing is provided with a passage directly connected to the pair of third ports.

12. The hydraulically driven working vehicle according to claim 11, wherein the charge pump casing is provided with another passage directly connected to the pair of first ports so as to fluidly connect the passage in the center section to the pair of first ports.

13. The hydraulically driven working vehicle according to claim 11, further comprising:

an adapter attached onto the center section and provided therein with a passage through which the pair of first ports are fluidly connected to the center section.

14. A hydraulically driven working vehicle comprising:

a frame extended in the fore-and-aft direction of the vehicle;

a first transaxle supported by one of front and rear portions of the frame, the first transaxle including:

a hydraulic pump, a first hydraulic motor fluidly connected to the hydraulic pump, a first axle driven by the first hydraulic motor, and a first transaxle housing incorporating the first hydraulic motor and the first axle, wherein the first transaxle is formed therein with a first fluid sump, and wherein the first transaxle housing is provided with a pair of outwardly opened first ports fluidly connected to the hydraulic pump and the first hydraulic motor, respectively;

a second transaxle supported by the other rear or front portion of the frame, the second transaxle including a second hydraulic motor fluidly connected to the hydraulic pump, a second axle driven by the second hydraulic motor, and a second transaxle housing incorporating the second hydraulic motor and the second axle, wherein the second transaxle is formed therein with a second fluid sump, and wherein the second transaxle housing is provided with a pair of second ports fluidly connected to the second hydraulic motor;

a pair of hydraulic pressure fluid pipes interposed between the pair of first ports and the pair of second ports;

a prime mover supported by the frame between the first and second transaxles;

a traveling power transmission system supported by the frame between the prime mover and the first transaxle so as to drivingly connect the hydraulic pump to the prime mover; and a reservoir tank fluidly connected to the hydraulic pump and the first and second hydraulic motors, wherein the reservoir tank is disposed so that a fluid level in the reservoir tank is higher than levels of the first and second fluid sumps.

15. The hydraulically driven working vehicle according to claim 14, wherein the reservoir tank is disposed just behind a rear end surface of the frame.

16. The hydraulically driven working vehicle according to claim 14, further comprising:

a fuel tank joined to the reservoir tank.

17. The hydraulically driven working vehicle according to claim 14, further comprising:

a first wheel provided onto the first axle; and a second wheel provided onto the second axle, wherein the reservoir tank is disposed between the first and second wheels.

* * * * *